(12) United States Patent
Johnson et al.

(10) Patent No.: US 10,589,354 B2
(45) Date of Patent: Mar. 17, 2020

(54) SYSTEMS AND METHODS FOR DEPOSITING CHARGED METAL DROPLETS ONTO A WORKPIECE

(71) Applicant: 3DAM Technologies, LLC, Phoenix, AZ (US)

(72) Inventors: Wayne L. Johnson, Phoenix, AZ (US); Lawrence Murr, Mesa, AZ (US); Mike Halpin, Scottsdale, AZ (US)

(73) Assignee: 3DAM Technologies, LLC/3DAM Holdings, LLC, Phoenix, AZ (US)

( * ) Notice: Subject to any disclaimer, the term of this patent is extended or adjusted under 35 U.S.C. 154(b) by 340 days.

(21) Appl. No.: 15/460,172

(22) Filed: Mar. 15, 2017

(65) Prior Publication Data

US 2017/0266728 A1 Sep. 21, 2017

Related U.S. Application Data

(60) Provisional application No. 62/308,821, filed on Mar. 15, 2016.

(51) Int. Cl.
| | |
|---|---|
| *B33Y 30/00* | (2015.01) |
| *B33Y 10/00* | (2015.01) |
| *B22F 3/115* | (2006.01) |
| *B22F 3/105* | (2006.01) |
| *B33Y 50/02* | (2015.01) |
| *C23C 4/123* | (2016.01) |
| *B22D 23/00* | (2006.01) |
| *C23C 4/18* | (2006.01) |

(52) U.S. Cl.
CPC ............ *B22F 3/115* (2013.01); *B22D 23/003* (2013.01); *B22F 3/1055* (2013.01); *B33Y 10/00* (2014.12); *B33Y 30/00* (2014.12); *B33Y 50/02* (2014.12); *C23C 4/123* (2016.01); *C23C 4/185* (2013.01); *B22F 2003/1056* (2013.01); *B22F 2999/00* (2013.01); *Y02P 10/295* (2015.11)

(58) Field of Classification Search
CPC .......... B33Y 50/02; B33Y 30/00; B33Y 10/00
See application file for complete search history.

(56) References Cited

U.S. PATENT DOCUMENTS

| | | | |
|---|---|---|---|
| 6,764,168 B1 * | 7/2004 | Meinhold | ................ B41J 2/125 347/81 |
| 2017/0087632 A1 * | 3/2017 | Mark | ................... B22D 31/002 |
| 2017/0266728 A1 * | 9/2017 | Johnson | ................ B22F 3/1055 |

OTHER PUBLICATIONS

Van Hoeve, W., Gekie, S., Snoeijer, J., Versluis, M., Brenner, M., and Lohse, D.; "Breakup of Diminutive Rayleigh Jets"; Physics of Fluids 22, 122003 (2010).
http://www.thorlabs.com/NewGroupPage9.cfm?objectgroup_id=6430.
http://www.shanghai-optics.com/products/f-theta-lenses/.

* cited by examiner

*Primary Examiner* — Scott R Kastler
(74) *Attorney, Agent, or Firm* — Jennings Strouss & Salmon PLC; Michael K. Kelly; Daniel R. Pote

(57) ABSTRACT

Apparatus and methods are described for performing additive manufacturing. The apparatus includes a vacuum chamber for fabricating a workpiece composed of deposited metal, a table positioned within the vacuum chamber, and configured to support fabrication of the workpiece on a substrate, and one or more multiple droplet emitters coupled to the vacuum chamber, and arranged to irradiate the workpiece with a stream of molten metal droplets during fabrication.

19 Claims, 33 Drawing Sheets

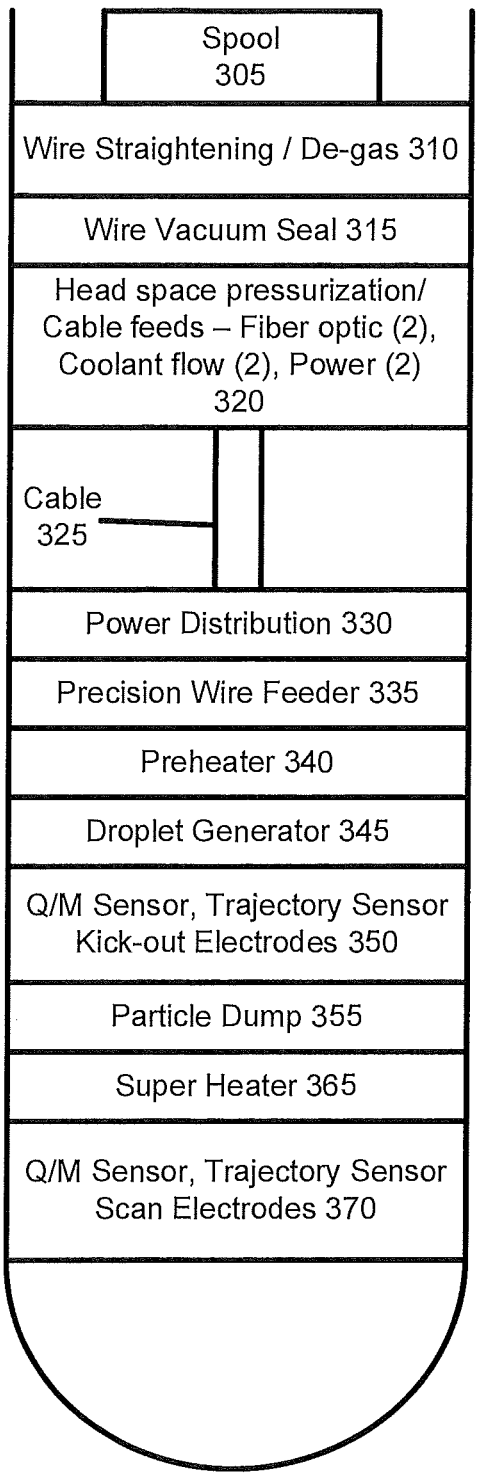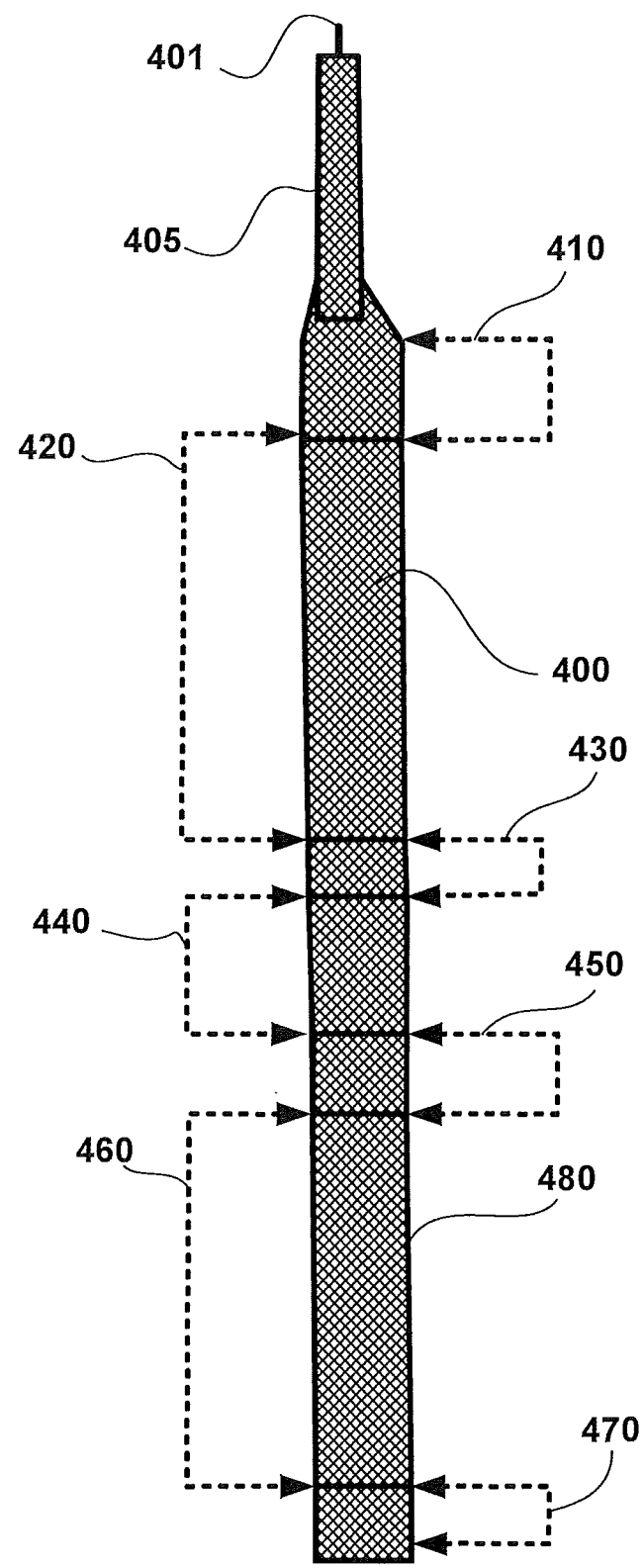
FIG. 3
FIG. 4

Discrete Electron Beam Melter Figures

Discrete Electron Beam Melter Figures

Discrete Electron Beam Melter Figures

Discrete Electron Beam Melter Figures

SYSTEMS AND METHODS FOR DEPOSITING CHARGED METAL DROPLETS ONTO A WORKPIECE

RELATED APPLICATION

This application claims priority to U.S. Provisional Application Ser. No. 62/308,821, filed Mar. 15, 2016.

FIELD OF INVENTION

The present invention relates, generally, to additive manufacturing and, more particularly, to systems, apparatus and methods for depositing metal onto a workpiece.

BACKGROUND

Additive manufacturing, sometimes referred to as 3D (three dimensional) printing, offers the capability of making parts involving complex geometrical configurations and shapes. Current additive manufacturing systems are essentially welding processes, wherein incrementally applied layers of material are successively fused to form the shape of the part. Current systems heat various amounts of material on multiple occasions to a temperature exceeding the melting temperature to fabricate the composite part. As a result, uneven heating and cooling, which is common in conventional systems, has the effect of providing non-uniform material phase. Oftentimes, voids are created in the part during manufacture. These voids are created by errors in the scanning beam, particle charging, or outgassing BLEVE (boiling liquid expanding vapor explosion) that launch particles dispersed in the melt bed. In addition, current technologies limit product/part manufacturing to a few cubic feet in build volume, and part complexity is limited to geometries that can allow un-melted powder removal. Therefore, an objective, among others, is to eliminate these deficits in current additive manufacturing methodologies.

SUMMARY OF THE INVENTION

Embodiments of the invention relate generally to additive manufacturing and, more specifically but not exclusively, relate to the apparatus and methods for performing additive manufacturing.

According to one embodiment, apparatus and methods are described for performing additive manufacturing. One such apparatus includes a vacuum chamber for fabricating a workpiece composed of deposited metal, a table positioned within the vacuum chamber and configured to support fabrication of the workpiece on a substrate, and one or more multiple droplet emitters coupled to the vacuum chamber and arranged to irradiate the workpiece with a stream of molten metal droplets during fabrication.

BRIEF DESCRIPTION OF THE DRAWINGS

The present invention will hereinafter be described in conjunction with the accompanying drawing figures, in which like numerals denote like elements, and:

FIG. 3 is a schematic block diagram of an exemplary set of operations of the droplet emitter according to an embodiment;

FIG. 4 shows a schematic cross-section diagram of a droplet emitter assembly according to an embodiment;

DETAILED DESCRIPTION OF SEVERAL EMBODIMENTS

Figure 1A:
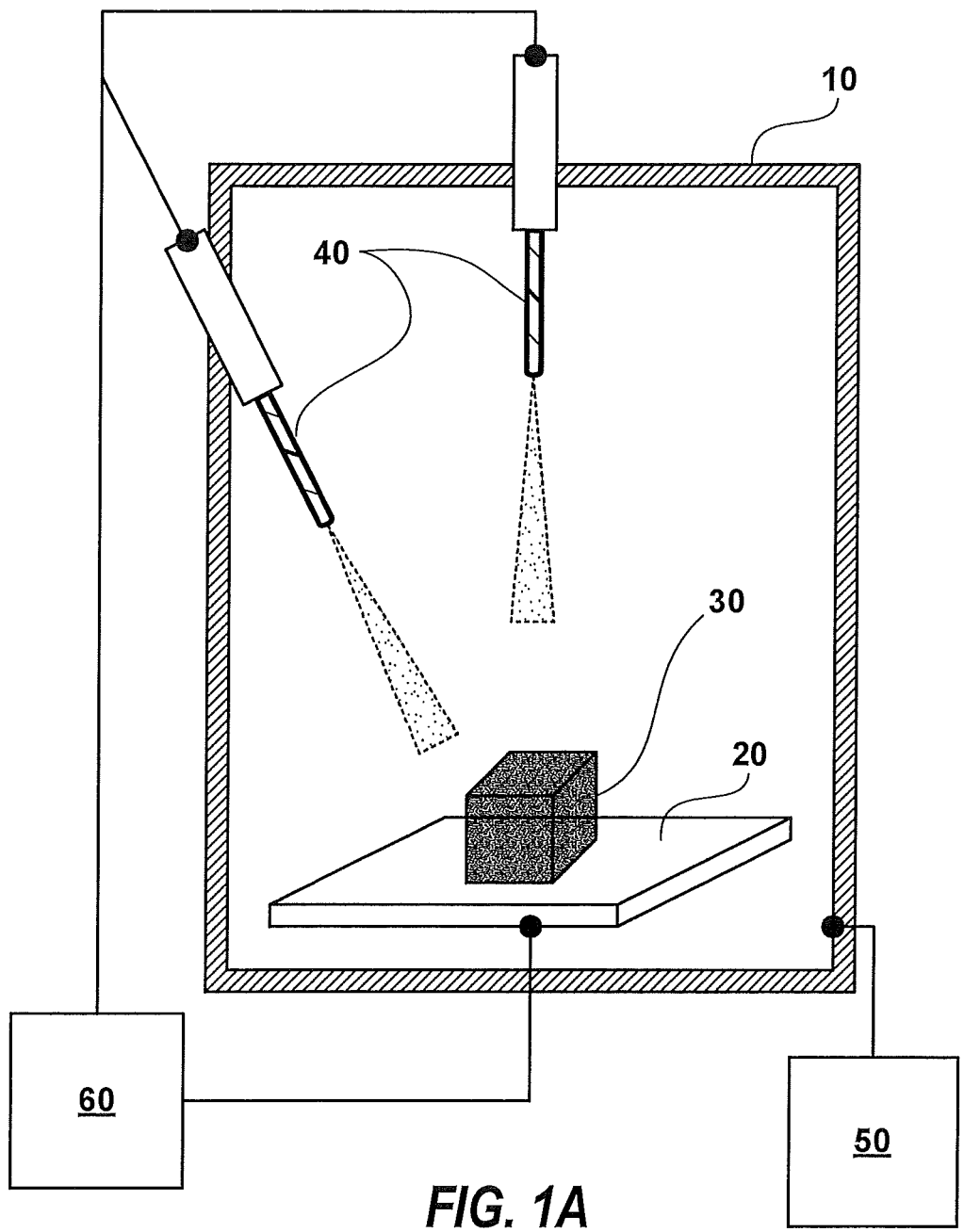
FIGS. 1A and 1B illustrate front elevation views of an additive manufacturing system and a melt droplet generator, respectively, according to various embodiments.

Methods and systems for performing additive manufacturing of a workpiece are described in various embodiments. One skilled in the relevant art will recognize that the various embodiments may be practiced without one or more of the specific details, or with other replacement and/or additional methods, materials, or components. In other instances, well-known structures, materials, or operations are not shown or described in detail to avoid obscuring aspects of various embodiments of the invention. Similarly, for purposes of explanation, specific numbers, materials, and configurations are set forth in order to facilitate this description. Nevertheless, the invention may be practiced without specific details. Furthermore, it is understood that the various embodiments shown in the figures are illustrative representations and are not necessarily drawn to scale.

Reference throughout this specification to "one embodiment" or "an embodiment" suggests that a particular feature, structure, material, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention. Furthermore, the particular features, structures, materials, or characteristics may be combined in any suitable manner. Various additional layers and/or structures may be included and/or described features may be omitted in other embodiments.

"Workpiece" as used herein generically refers to the object being fabricated in accordance with the invention. The workpiece may include any material portion or structure of a device. Thus, workpiece is not intended to be limited to any particular structure, but rather, is contemplated to include any structure, and any combination of material layers and/or structures. The description below may reference particular types of workpieces, but this is for illustrative purposes only and not in a limiting sense.

According to various embodiments, direct write droplet deposition additive manufacturing converts a metal source into a series of droplets. As a result, the deposited part is grown by addition of the series of droplets, which can be composed of metal, that are accelerated and electrostatically steered and scanned to specific locations under the direction of a computer program. These droplets can be superheated to temperatures that enable them to melt portions of the existing workpiece and generate full density material. These droplets or particles are of a very small diameter, and modeling their impact on the workpiece shows that they cool from the melting temperature to a temperature below which little crystallization occurs at rates exceeding $1\text{-}10 \times 10^6$ centigrade (degrees C.) per second. This capability enables one to directly fabricate amorphous materials, as well as a range of other crystal structures and crystalline phases, through variations in scan strategies using the Additive Manufacturing Direct Droplet Emitter head design described herein, as well as auxiliary beam scan components (including laser and electron beams).

Amorphous (typically non-crystalline) materials tend to be brittle, very hard and difficult to fabricate into useful components. They tend to have their amorphous properties easily disrupted through heating and stress generated during fabrication. The use of direct deposition allows one to make final shaped parts while mitigating or avoiding these problems, among others, with the amorphous materials.

This droplet generation methods described herein also facilitate making parts with buried cavities and passages. In addition, partially or fully isolated volumes are enabled and may be generated under vacuum. With these methods there are no (or relatively few) particles to remove from passages and the surface finish of cavities and passages are similar to that of the outer walls, for example, in the range of approximately 10 microns RMS (root-mean-square) roughness using 20 micron droplets, allowing better surface finish with smaller droplets, but with lower growth rate with buried cavities, passages and other geometrical complexities. Such structures include closed-form cellular foam and related structures which can be fabricated using the techniques described herein, along with the advantages of powder replacement strategies, and the ability to reduce waste and extensive post fabrication processing.

Amorphous material has been a subject of technical interest since the early 1960s. The current status of amorphous materials, including amorphous metals, is to melt the metal in a crucible and emit the liquid onto a chilled wheel rotating at high surface velocity. This method generates ribbons a material. The maximum ribbon thickness for which the amorphous cooling rate can be achieved is less than 0.001 inch. Some material is limited to 2 inch ribbon width, while others are able to be approximately 12 inches wide. Conversely, the metal can be emitted into the interior of the wheel, which is textured to produce short lengths of wire.

Amorphous materials are used for transformers, motors and sensors. Transformers consume about 2% of the power grid in the world. Power magnetic cores made of amorphous materials have 20% of the core loss of standard core materials. The use of amorphous materials in stators and rotors of motors reduces losses to enable 96% motor efficiency over wide operating ranges. Measurement of permeability of the wires adhered inside the composite material allows us to deduce the static or dynamic stress in that material. More complex assemblies enable motor analysis, strain of dynamic structures, and measure low magnetic fields.

FIG. 1A illustrates an apparatus for performing additive manufacturing according to an embodiment. The apparatus includes a vacuum chamber 10 for fabricating a workpiece 30 composed of deposited metal or other material. Additionally, the apparatus includes a table 20 positioned within the vacuum chamber, and configured to support fabrication of the workpiece 30 on a substrate. The apparatus further includes one or more droplet emitters 40 coupled to the vacuum chamber, and arranged to irradiate the workpiece 30 with a stream of molten metal droplets during fabrication. A pumping system 50 is connected to the vacuum chamber 10 to exhaust vacuum chamber 10 and maintain a vacuum environment during processing. A controller 60 is coupled to the one or more droplet emitters 40 and the table 20, and configured to exchange various electrical control signals and data streams to effectively control, position, and process workpiece 30. Other systems (not shown in FIG. 1A) can include droplet emitter diagnostic systems and workpiece inspection systems, among others.

Figure 1B:
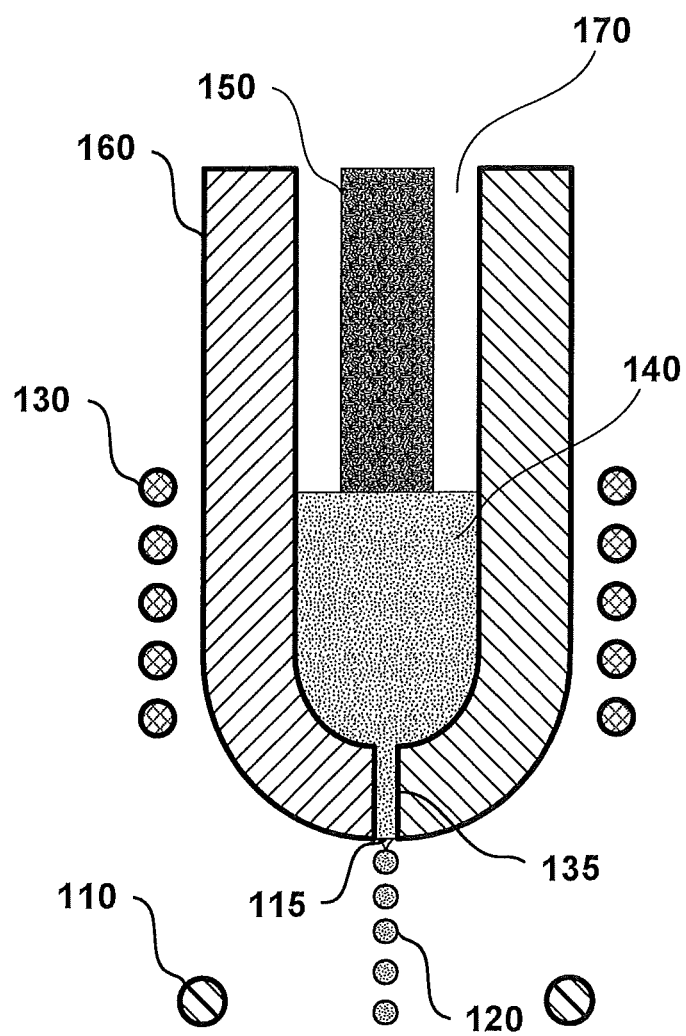

FIG. 1B illustrates a melt droplet generator according to an embodiment. The melt droplet generator, which can include an inductive melt droplet generator, converts a continuous, or semi-infinite, supply of metal wire 150 to droplets 120. The wire 150 is fed toward the end of a mostly closed end crucible 160. Multiple sensors and a control circuit, described below, assures the wire 150 remains in contact with the melted metal 140, and that the melt level is substantially constant during normal operation.

The wire may be melted with heat supplied from an inductive coupled heating source 130. Other methods of heating are described below. As described above, the melt level control also controls the power input into the melt volume to keep the melt level substantially constant.

In the near spherical end of the mostly closed ceramic crucible 160, an orifice 135 is machined that controls the Rayleigh jet diameter of jet (and Taylor cone) 115. Jet 115 quickly disperse as droplets due to Rayleigh instabilities. (See Hoeve, Gekle, Snoeijer, Versluis, Brenner, and Lohse, "Breakup of Diminutive Rayleigh Jets," Physics of Fluids 22, 122003 (2010) and available at www.stilton.tnw.utwente.nl, the entire contents of which are hereby incorporated herein by this reference). These instabilities can be stabilized by generating magnetic field with the inductive melting coils of the inductive coupled heating source 130. A component of the magnetic field is tuned to a frequency in the range of the droplet rate instability, and it provides a regular vibration to the melt volume. Special care is taken to choose a ceramic material for the ceramic crucible 160 that is wetted by the melted metal 140 material, and that the edges of the orifice 135 are smooth and continuous. Suitable ceramic materials may include alumina, mullite, steatite, lava, forsterite, quartz, silica, magnesia, silicon carbide, zirconia, yttria, rare earth materials, and refractory materials such as cordierite, alumina titanate, fused silica, sillimanite, and corundum.

The supply of metal wire 150 is connected to a target voltage potential or electrically grounded, and a charging electrode 110 has a specific voltage that charges the droplet to a fraction of the Rayleigh limit as the drop forms on the end of the melt jet 115, and before it breaks loose and is no longer in contact with the melt jet 115.

This subsystem results in a regular linear array of droplets 120 close in spacing and almost exactly the same mass and charge.

Figure 2:
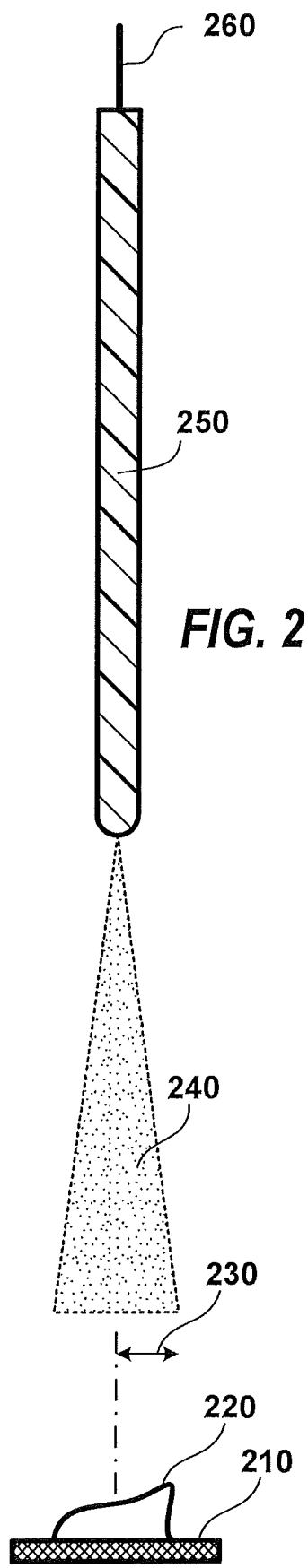
FIG. 2 depicts a front elevation view of a droplet emitter assembly according to an embodiment.

FIG. 2 depicts a droplet emitter assembly 250 according to an embodiment. Droplet emitter assembly 250 manages the ingestion of input material 260, such as metal wire, manages the droplet generator, and directs the droplets to target location(s) needed to form the workpiece or part being fabricated. The computer control manages the scan voltages to optimize deposition. The scan range 240 is characterized by a scan angle 230 found to accurately deflect the stream of particles. The second condition is the angle of attack of the particle at the workpiece surface. The present inventors have observed this angle to be about 7.5 degrees with respect to normal. However, other angles of attack can be utilized.

The part or workpiece 220 being fabricated is grown on a substrate 210. As the surface grows nearer to the source, the substrate 210 is lowered to keep the scan angle 230 that allows the scan range 240 for deposition needed to achieve the optimum deposition rate.

Multiple emitters may be assembled into clusters that have special purposes including increased growth rates. The computer program or other control modality to determine which emitter contributes what element of each part, and in what sequence, involves complex computations for the control system, and the choreography is suitably computed prior to the deposition process to reduce the computational burden/power of the control system during run time. Multiple emitters enable coverage for any heads which may be rendered inoperable during manufacture, facilitated by onboard computing power to maintain continued optimum growth. Multiple emitters may be configured to emit different metal compositions, and different droplet sizes and frequencies.

FIG. 3 provides an exemplary set of operations of the droplet emitter according to an embodiment. A spool 305 is the source of wire. The straightening and de-gas system 310 heats the wire under tension and feeds the wire towards the head through a wire vacuum seal 315. This heating is performed in a vacuum and the wire may be cooled after being heated. The wire proceeds into a conduit 325 to the emitter. This conduit 325 provides a means to conduct wire material, information, data, status and/or control signals along a fiber optic pair, electrical power along a pair of wires, coolant, and the head pressure to the drop generator. A head space pressurization/cable feed 320 provides the interface between the electronics, flow control elements, pressure control elements, master power supply and the conduit, among others.

The emitter assembly includes a power supply and distribution module 330. In the power supply and distribution 330, data from the fiber optics and data from other elements of the power supply control the power for the droplet emitter.

A precision wire feeder 335 supplies wire to the droplet emitter with high degree of axial position accuracy. Capacitive and inductive sensors, described in detail below, sense the wire position above the melt volume. Also, as described below, load cells may be coupled to the crucible to limit the amount of pressure exerted by the wire on the crucible end.

A preheater 340 allows the design to spread out the area needed to input heat to the wire. The wire can be preheated within 50-100 degrees C. of the melt temperature. This function is very useful in reducing the amount of heat needed to control accurate melting in systems without crucibles.

Figure 12A:
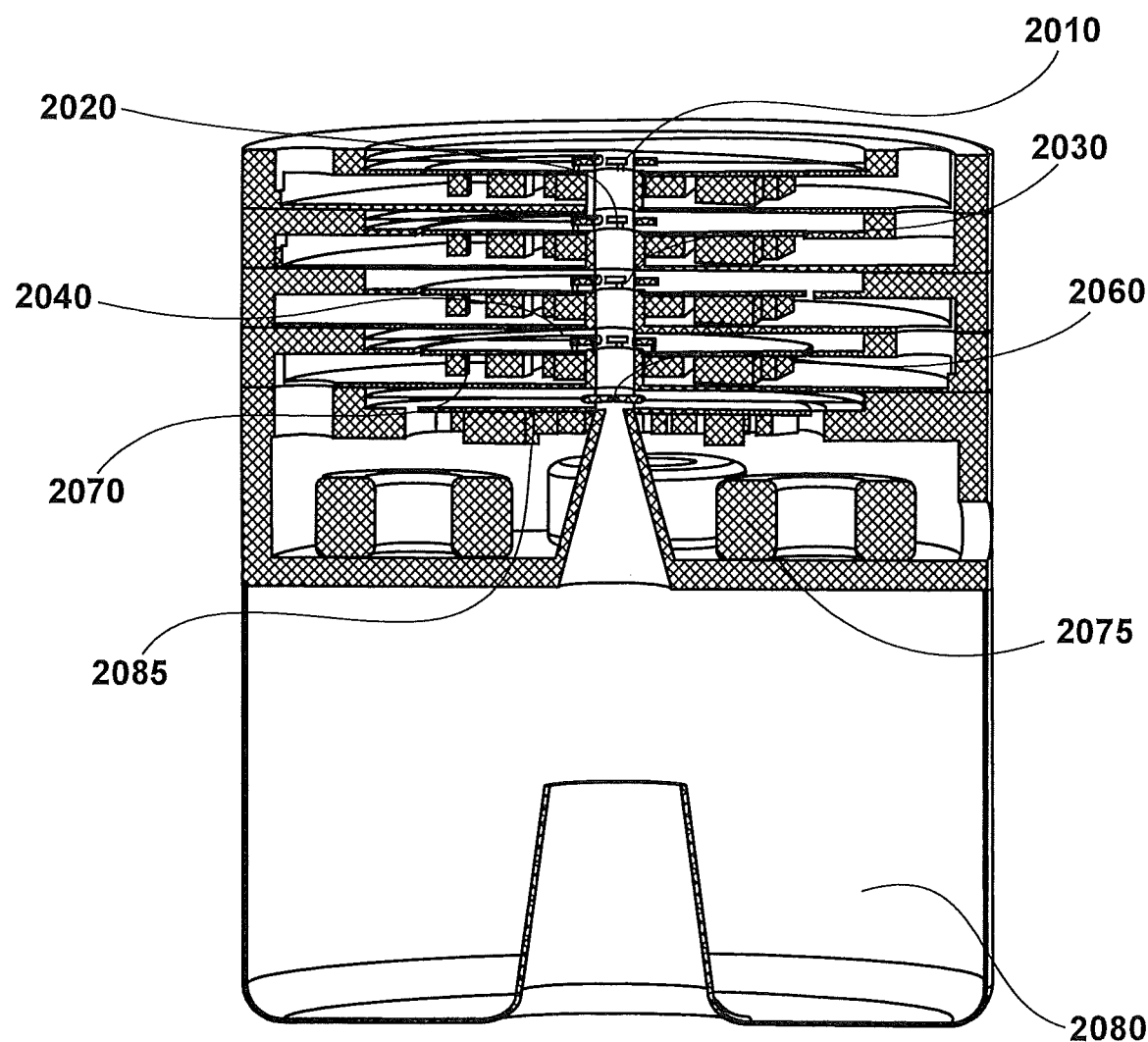
FIG. 12A depicts a cross-section view of a droplet sensor assembly according to an embodiment.

A droplet sensor assembly is shown in FIG. 12A. The sensor assembly can measure various properties of emitted droplets, including the charge and velocity of each droplet/particle. Sensed information is used to assure whether the droplets/particles are charged properly, and whether measured charge and mass values are within target ranges (parameters) so that the droplets can be incorporated into the growing workpiece surface and accurately scanned to a specific position. The droplet sensor assembly can also measure various metrics used to assess the status or "health" of the droplet generator. Various patterns of charge variation, position variation, and velocity variation may indicate problems associated with the source (the droplet generator).

Each sensor within the sensor assembly can include a trajectory sensor in the form of a ring electrode segmented into arcs as described below in connection with FIGS. 12A through 12F. The signal on each arc electrode is amplified and digitized by a circuit commonly called chip-on-board to minimize space. The amplifiers may be of a special charge amplifier design often used to amplify signals for charged particle detectors. The difference in signal values between respective arc segments (3-12) indicates the distance off-center that the particle traversed the sensor. Calculations have shown that droplet position tracking can be resolved to within 10 microns. Multiple sensors can provide multi-point measurements that mitigate errors and facilitate reliable sensor operation.

In addition to passively sensing charged droplets, the electrodes can also be powered such that they can deflect charged particles. Referring again to FIG. 3, the system 350 (Q/M sensor, trajectory sensor, and kick-out electrodes) may also be configured to deflect the particles found to be out of controllable specification into the 'Off Specification Droplet Bin' or particle dump 355 for later disposal. This particle dump 355 may also be used to store deflected particles during start up and shut down.

The next operation is supercharging the particle. Liquid droplets are able to be charged to near the Rayleigh Limit defined by:

Sphere $$q^2 = 64\pi^2 \varepsilon \sigma r^3$$

where:
  $\varepsilon$ is the vacuum permittivity.
  $\sigma$ is the surface tension of the liquid.
  r is the radius of the droplet.

Practically, a droplet generator can stably produce droplets charged up to about 44% of the charge limit. This number varies considerably with the smoothness of the droplet production. Once a charged droplet has been formed the droplet stabilizes in shape and can be charged to a higher level. As a practical matter, it is difficult to charge droplets after formation, even when using a charged particle beam or x-rays to photo-charge the droplet.

In various embodiments, the droplets are charged to a positive potential because the droplets are at a temperature where they readily emit electrons. If they were charged negatively, then positive potential in the beam line would tend to discharge the particles. Since the droplets are charged positively, passing the droplets through more positive electrodes causes the droplets to emit electrons and become more positive. This process can be accomplished by biasing any set of electrodes to a desired positive voltage.

It is generally desirable to achieve full density material upon deposition. PVD (physical vapor deposition) and CVD (chemical vapor deposition) processes have shown how energy is delivered to the growing surface. With microscopic droplets of a few tens of microns in diameter, the energy distribution is significantly different from atom-by-atom deposition. The physics of atomic deposition includes the energy of condensation and the kinetic energy of the depositing atoms/ions. Sputtering and CVD have shown the value of using this kinetic energy to improve the properties of the deposited material.

In the micro-droplet deposition systems described herein, the energy delivered to the growing workpiece surface by condensation is a small fraction of that observed in atom-by-atom (PVD and CVD) condensed material. Surface collision effects such as splattering, bouncing and surface spreading also limit the energy that can be delivered to the workpiece by kinetic energy. The methods to deliver energy to the growth interface include substrate growth temperature and the heat capacity and heat of fusion. Significant efforts in deposition of tin (Sn) droplets have exhibited tradeoffs in a simple system with low relative temperature. Those skilled in the art will appreciate that material-specific data can facilitate a more thorough understanding of this aspect of the deposition process.

With continued reference to FIG. 3, the droplet superheater 365 may comprise a heated tube through which the droplets are passed to thereby absorb heat, as explained in further detail below in connection with FIG. 13. In a preferred embodiment, this is done without appreciably changing the charge on the droplet.

A distal portion 370 of the droplet emitter measures the charge-to-mass ratio (Q/M), Velocity, and/or trajectory of the emitted droplets. Based upon these measurements and previous measurements, the voltage needed to scan each individual droplet to a desired target position on the growing part/workpiece may be derived, as described in greater detail in connection with FIGS. 12A through 12F.

FIG. 4 shows a cross section of a droplet emitter assembly 400 including sub-assemblies 410 to 470. The droplet emitter sub-assemblies may be configured to implement the following functions: (1) Inputting a feed wire 405 as the source of material for the droplet formation. For example, wire 401 is delivered from a coil, straightened and degassed, and fed through a cable to the droplet emitter assembly 400; (2) Power distribution module 410 provides plug space and current protection for the various elements of the droplet emitter assembly 400; (3) Precision wire feeder 420 feeds the wire to keep the tip in position as the wire tip is melting and used for droplet formation; (4) Wire preheater 430 preheats the wire to a measured temperature near the melting point. Preheaters can be omitted in crucible-type systems; (5) Droplet generation source 440 generates droplets by heating the wire to produce a liquid metal flow/jet in the presence of an electric field. As the metal flow/jet breaks up, the electric field extracts and charges droplets from the emanating jet. Various embodiments of this droplet generator are contemplated and described below; (6) The Q/M, velocity, trajectory sensor and cast off system 450 measure the charge, mass, velocity and trajectory of each droplet. Any droplet not within specifications may be diverted into a storage compartment and removed from the system; (7) Super-heater sub-assembly 460 heats the droplet above the melting point to provide energy to melt the surrounding volume when the droplet lands on the workpiece, allowing the droplet to coalesce into a solid material without voids; (8) The droplet sensor assembly, e.g., Q/M, velocity, trajectory sensor, and scan/cast-off systems 470 measure the charge, mass, velocity and trajectory of each droplet. The droplets are electrostatically directed to the position where they impact and become part of the growing part/workpiece; and (9) The system is housed in a specially shaped (e.g., substantially cylindrical) volume 480 that isolates the vacuum from a majority of the assembly, contains cooling/dielectric fluid, registers the beam line elements to be collinear, and allows for high beam density when the beams are clustered to provide high deposition rate, among other functions.

With continued reference to FIG. 4, it should be noted that sensor modules 350 and 370 may comprise discrete systems or an integrated system. To facilitate this discussion, the sensor module 350 may be configured to direct ("kick out") out-of-range droplets away from the workpiece, whereas sensor module 370 may be configured to direct droplets which are within range to the workpiece.

Figure 5:
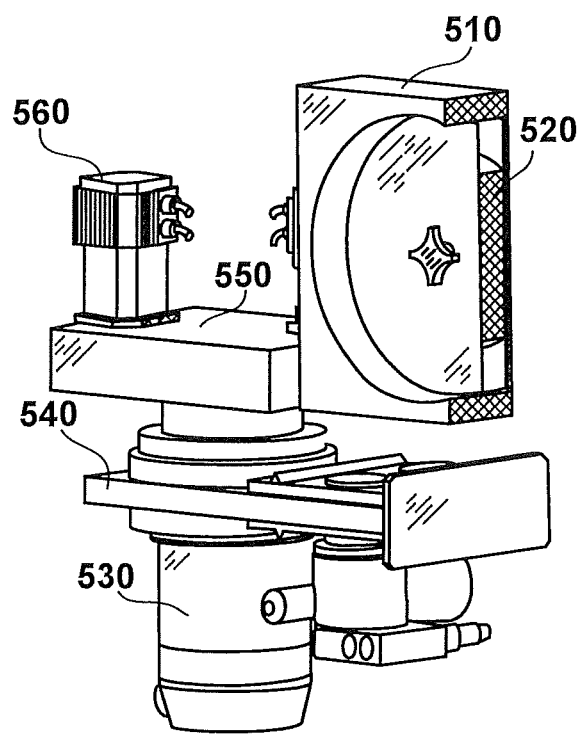
FIG. 5 illustrates a perspective view of a wire spool assembly according to an embodiment.

FIG. 5 illustrates an exemplary wire spool assembly. In one embodiment, a wire spool 520 and a wire spool box 510 are connected directly the wire straightener box 550, and in turn, the wire straightener box 550 is connected to the vacuum system. The vacuum system can include a turbomolecular pump 530 and a gate valve 540 for isolation. Not shown in FIG. 5 are vacuum gauges and roughing valves and roughing pumps. The wire spool box 510 may include a system that measures the presence of wire and detects the termination of the wire from the wire spool 520, and provides corresponding indications to the operator. Referring still to FIG. 5, a capstan drive motor 560 pulls wire through the system through pinch rollers shown in FIG. 9.

Figure 6:
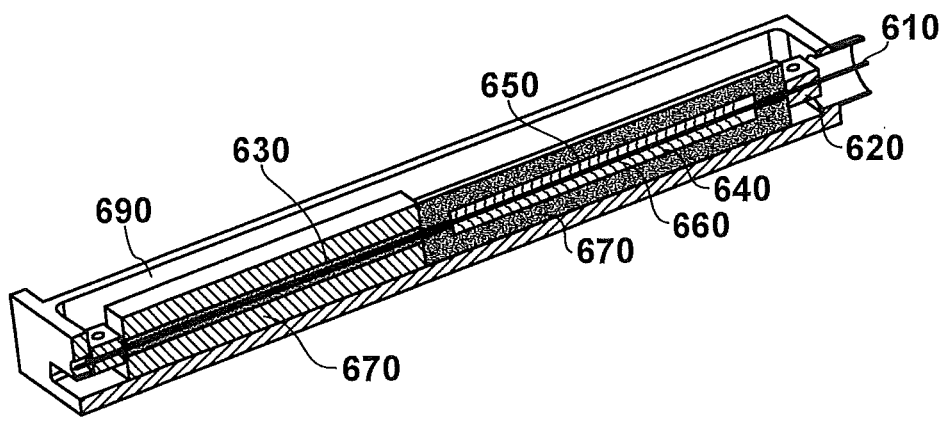
FIG. 6 illustrates a perspective view of a wire straightener according to an embodiment.

FIG. 6 depicts a wire straightener including a section that heats the feed wire 610 and holds the feed wire under tension using two capstan blocks 620. The feed wire 620 may be heated in an assembly by electron bombardment to a temperature near $T_{melt}/2$ of the feed wire 610 material. The tension can be variable and is controlled by measuring the torque on the capstan blocks 620. Electrons are generated from a filament cathode 650 and accelerated by a differential potential maintained between the feed wire 610 and the filament cathode 650. The filament cathode 650 is supported and isolated from a refractory can 660 by ceramic isolation rods 640. The refractory can 660 is biased more negative than the filament cathode 650 so that most of the electron energy is deposited in the feed wire 610.

The wire straightener may also include a controlled cooling block 680 for the feed wire 610. The degree of cooling is determined by the length of the cooling block 680 and the insulating properties of insulation 630. This entire system can be located in a vacuum box 690.

Figure 7A:
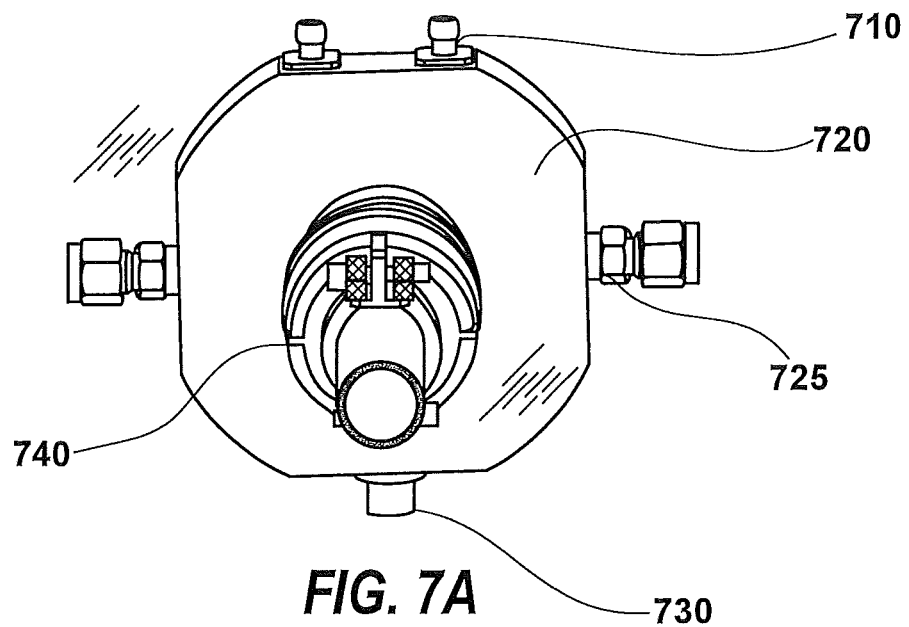
FIGS. 7A and 7B are perspective views of a cable header assembly and wire feed cable assembly, respectively, according to an embodiment.

FIG. 7A depicts a cable header assembly and wire feed cable assembly according to an embodiment. The cable header assembly (air side) shows where the connections are made to the wire feed cable shown in FIG. 7B. Also shown in FIG. 7A, two (2) fiber optic connectors 710, two (2) cooling fluid connections 725, a dual power connector 730, and a custom connector 740 for the wire, the connector 740 configured to be connected to the output of the wire straightener (see FIG. 6) described above. The cable head housing 720 includes a machined part with cross-bored areas to make the electrical and fiber optic connection, and an O-ring to seal against the surface of the vacuum wall 795.

Figure 7B:
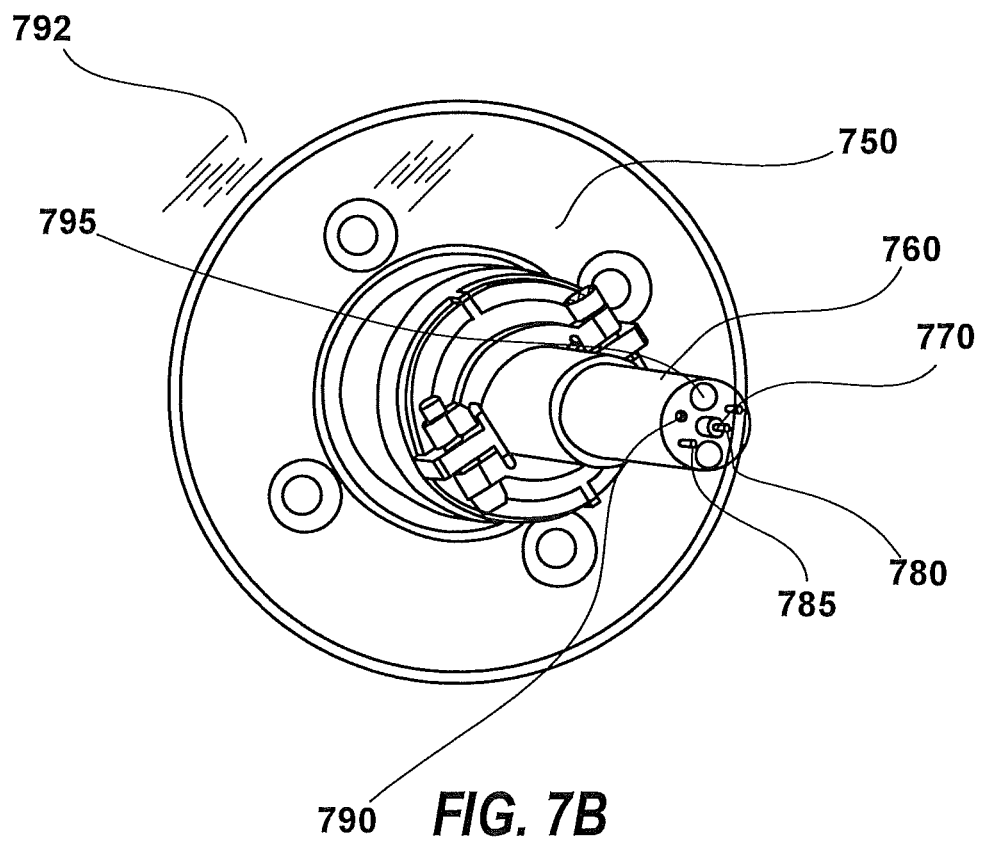

FIG. 7B shows the vacuum side of the feed-through and the vacuum wall 795. The cable head housing 720 is retained against vacuum by a vacuum side retainer 750. The wire feed cable assembly or conduit 760 is configured to deliver information through the fiber optic cable 790, electrical power through power wire 785, cooling fluid through the cooling fluid channel 795, and feed wire 780 through a feed wire guide 770.

Figure 8:
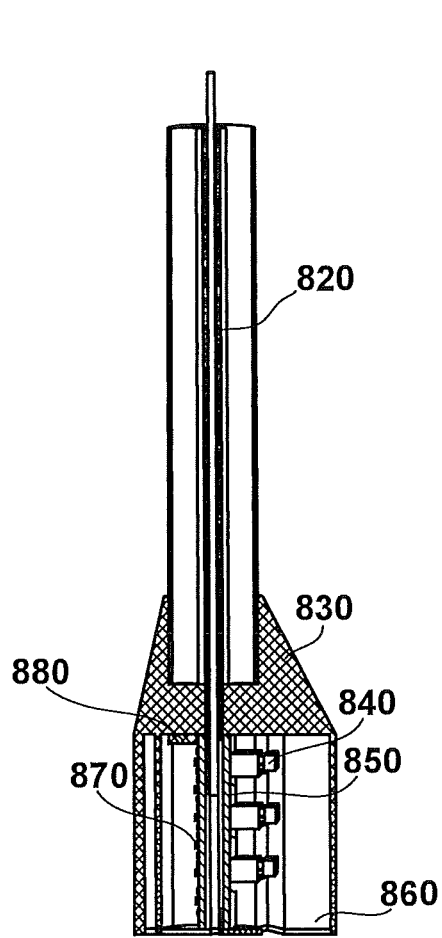
FIG. 8 illustrates a cross-section view of the power distribution section for a droplet emitter according to an embodiment.

FIG. 8 illustrates a power distribution section for a droplet emitter according to an embodiment. Power distribution housing 830 seals on the wire feed cable assembly 760, and routes the elements on the cable to appropriate locations in the system. Fluid input (not shown) may be supplied to the power side of the assembly. The fluid cools and insulates the power distribution circuit 850, which protects the individual circuits (6) with a circuit that is remotely resettable. Data is collected in the power distribution circuit 850 to monitor power usage. A power wire to the power distribution housing 830 is not shown. A region 860 is provided for cabling and fluid passage to the system.

The power distribution circuit 850 provides distribution connectors 840 for each of the segments (6 each) below. The odd shaped shank of the power distribution housing 830 enables space for fluid and power distribution as will be described below. The feed wire guide 820 delivers feed wire down the center of the housing. On the fluid return path side of the power distribution housing 830, a data handling board 870 is mounted, which receives data and transmits data to the remote controls via the dual fiber optic cable 880. This board disperses and collects information from the other elements of the system and generally coordinates data transmission.

Figure 9:
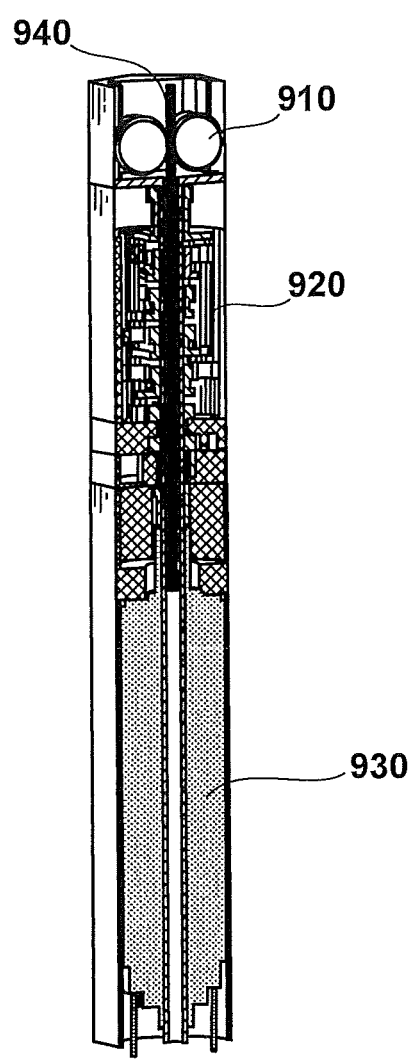
FIG. 9 illustrates a cross-section view of a precision wire feeder according to an embodiment.

FIG. 9 illustrates a precision wire feeder according to an embodiment, which moves the feed wire 940 via pinch rollers 910. Pinch rollers 910 are rotated using a hollow shaft motor 930 through a gear box reduction module 920. The feed wire 940 is pushed through the center of the hollow shaft motor 930, which provides force (e.g., several Newtons) on the wire on the order of up to 1 inch in diameter.

Figure 10:
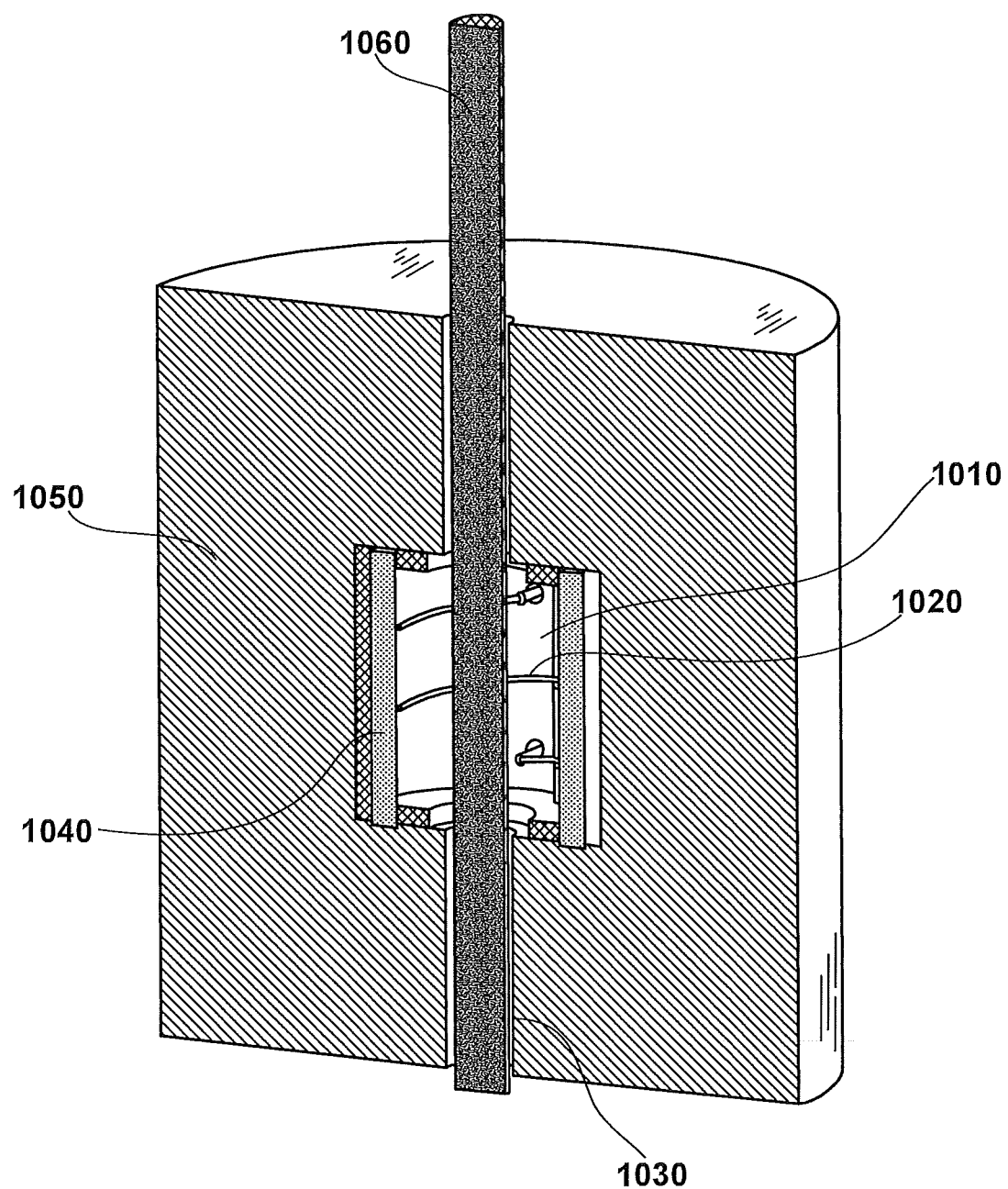
FIG. 10 illustrates a perspective cross-section view of a preheater according to an embodiment.

FIG. 10 shows the wire preheater according to an embodiment. The preheater generates electrons from a filament cathode 1020 and directs them to the wire using voltage bias. A refractory metal can 1010 is biased negative with respect to the filament cathode 1020 and the feed wire 1060. The cathode is kept centered in the system with 6 ceramic rods 1040 that protrude through the ends of the can for registration. The refractory metal can 1010 may be enclosed within fiberboard refractory insulation 1050 to reduce thermal losses. This fiberboard refractory insulation 1050 is designed to fit tightly around the feed wire 1060 to reduce thermal losses between the preheater and the melt section described below. The feed wire is contacted electrically in the precision wire feeder described above. The preheater may be omitted in crucible systems, for example.

Figure 11A:
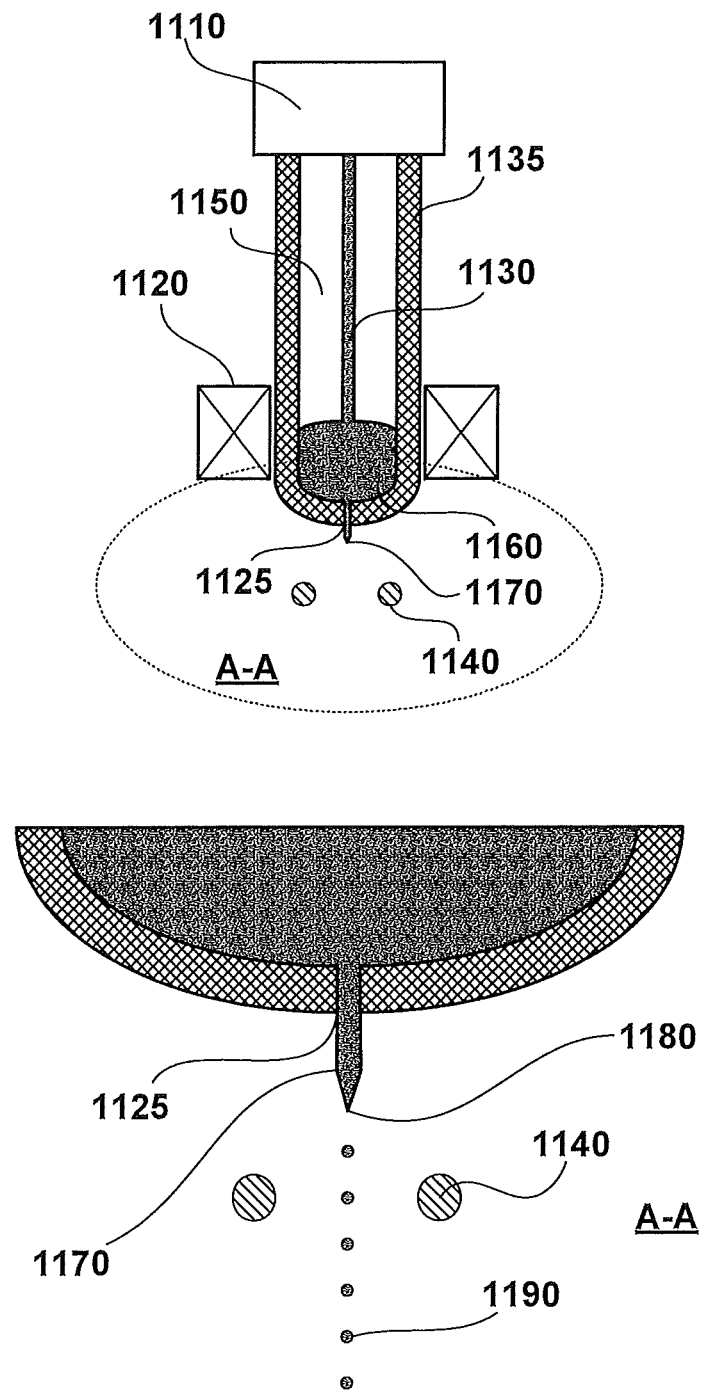
FIG. 11A illustrates a schematic cross-section view of a crucible droplet generator including an enlarged view A-A according to various embodiments.

FIG. 11A illustrates a crucible droplet generator including a mini-crucible 1135 according to various embodiments. This crucible receives material from a feed wire 1130 which is fed through a progression including a wire spool, wire straightener-outgas, feed cable, precision wire feeder, and preheater 1110, and emits molten material (droplets) through an orifice 1125. The material is forced through the orifice 1125 by pressure in the volume 1150 at a velocity in the order of 1 to 100, and preferably about 10 to 30, and most preferably about 20 m/sec. The cross section (e.g., diameter) of the orifice 1125 is in the range of 25% to 75%, and preferably about 50% of the diameter of the droplets 1190 to be formed.

The liquid exiting the orifice 1125 forms a jet 1170, which breaks up into droplets 1190 within a short distance due to instabilities in the jet 1170 as described by Rayleigh. Those skilled in the art will appreciate that the materials used in the crucible 1135 as well as the shape and size (e.g., diameter) of orifice 1125 should be selected to reduce the effects of wear over time. For many materials alumina is sufficient for long crucible/orifice life; other materials such as yttrium-stabilized zirconia may also be used.

Still another concern is the molecular attraction between the ceramic and the liquid or the wettability of the ceramic by the liquid metal. It is important that the ceramic is adequately wetted, but not overly so by the liquid metal. Excessive wettability often suggests that the ceramic is dissolved by the liquid metal, resulting in material degradation of the crucible. Each metal, alloy, ceramic, and ceramic process method should therefore be evaluated for optimum operation.

Figure 11B:
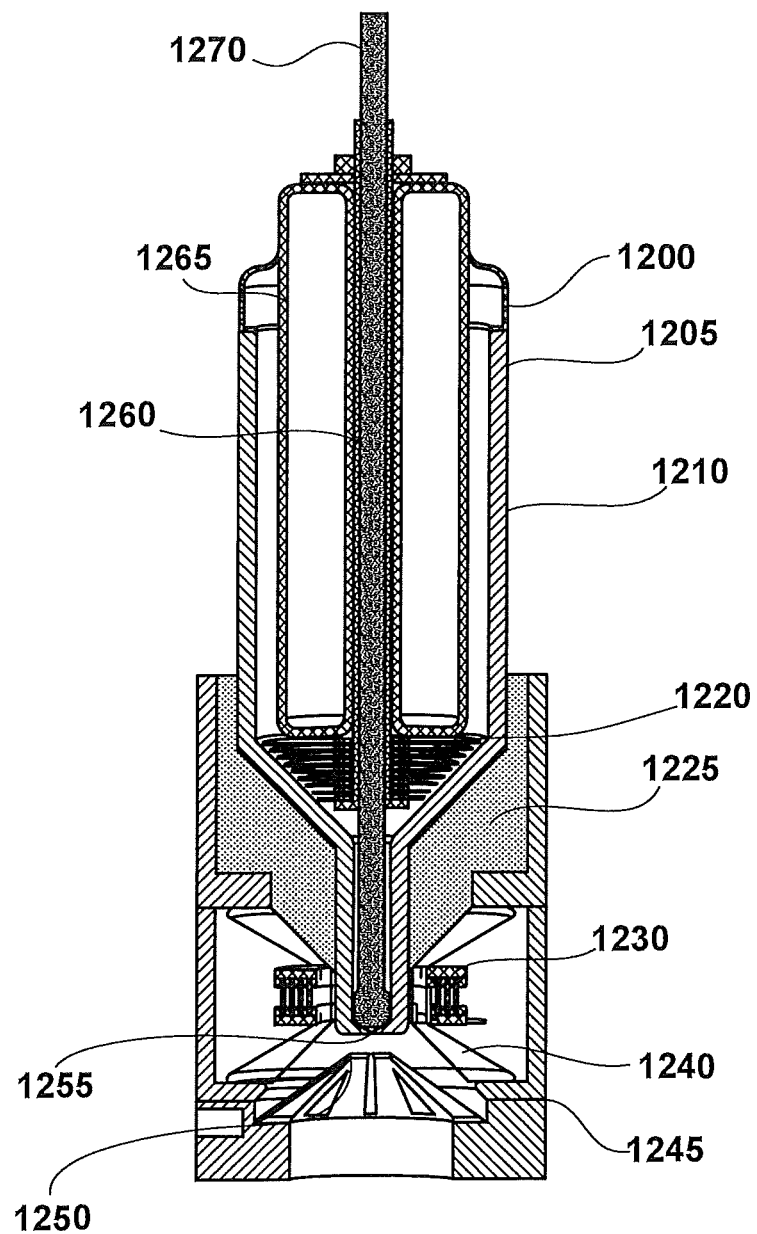
FIG. 11B depicts a cross-section view of an inductively heated crucible according to an embodiment.

FIG. 11B depicts an inductively heated mini-crucible according to an embodiment. The mini-crucible 1210 has a small tip barely larger than the feed wire 1270. A high throughput droplet emitter would have a crucible 1210 with an OD (outer diameter) in the range of 2 to 6 mm, and preferably approximately 4 mm, and an ID (inner diameter) in the range of 1 to 3 mm, and preferably approximately 2 mm. This crucible 1210 may be attached to the wire feed system through a ceramic metal braze joint 1205. The metal side of this joint suitably comprises a thermal expansion ring 1200 and a fluid cooling chamber 1265 configured to protect the ceramic braze joint from excessive temperatures (e.g., in the range of 400 degrees Celsius (C)) and limits heat transported to the precision wire feeder section. The hot side of the fluid cooling chamber 1265 may be protected from direct radiation by use of a stacked radiation shield 1220, which includes a stack of polished refractory metal sheets separated by thin spaced insulators and vacuum between each sheet. The refractory metal radiation shield 1220 is held securely in place by a refractory metal tube 1260 which doubles as a flow bushing for the feed wire. This refractory metal tube 1260 is secured by a refractory nut or star nut and washer to assure high temperature operation of the system. The radial exterior environment may be protected from the intense temperature (approximately 1500 degrees C.) of the crucible 1210 tip by refractory insulation 1225.

Around the tip of the crucible 1210 is a quartz, bubble quartz, or ceramic isolation hourglass 1240. The quartz isolation hourglass 1240 provides the vacuum-liquid wall interface element and is sealed top and bottom with a high temperature metal or elastomer O-ring. Outside the quartz isolation hourglass 1240 is positioned a spiral coil 1230. This spiral coil 1230 is positioned in the direct flow of a cooling fluid of perhaps 3M Flourinert™ or any suitable low viscosity fluid with high heat capacity, dielectric strength and boiling temperature. Although spiral coil 1230 is shown, a flat coil can also be used.

An extraction electrode 1250 is advantageously disposed proximate the crucible orifice 1255. The extraction electrode 1250 is isolated electrically from the stainless steel outer vacuum/fluid container 1245, and across this spacing is imposed the droplet charging potential. This extraction electrode 1250 may comprise hollow nickel, copper or other material that can be plated to be strong against fluid pressure, vacuum tight and thin to have a high flow to maintain structural integrity and performance in the high heat flux environment. The extraction electrode 1250 comprises a relatively thin component close to the crucible, and may be made by plating on a mandrel followed by etching to provide the finished part. This thin member is then brazed to the cooling manifold to finish the assembly.

The coil circuit (not shown) may be implemented as a free running oscillator. The frequency of operation is dependent upon the load of metal in the crucible and is used to control the melting operation. Increased melt is indicated by lower frequency and the control circuit reduces the melt power. Conversely, less melt raises the frequency and the control circuit responds by increasing melt power. The control circuit is housed next to the power circuit (not shown) and is also fluid cooled.

Figure 11C:
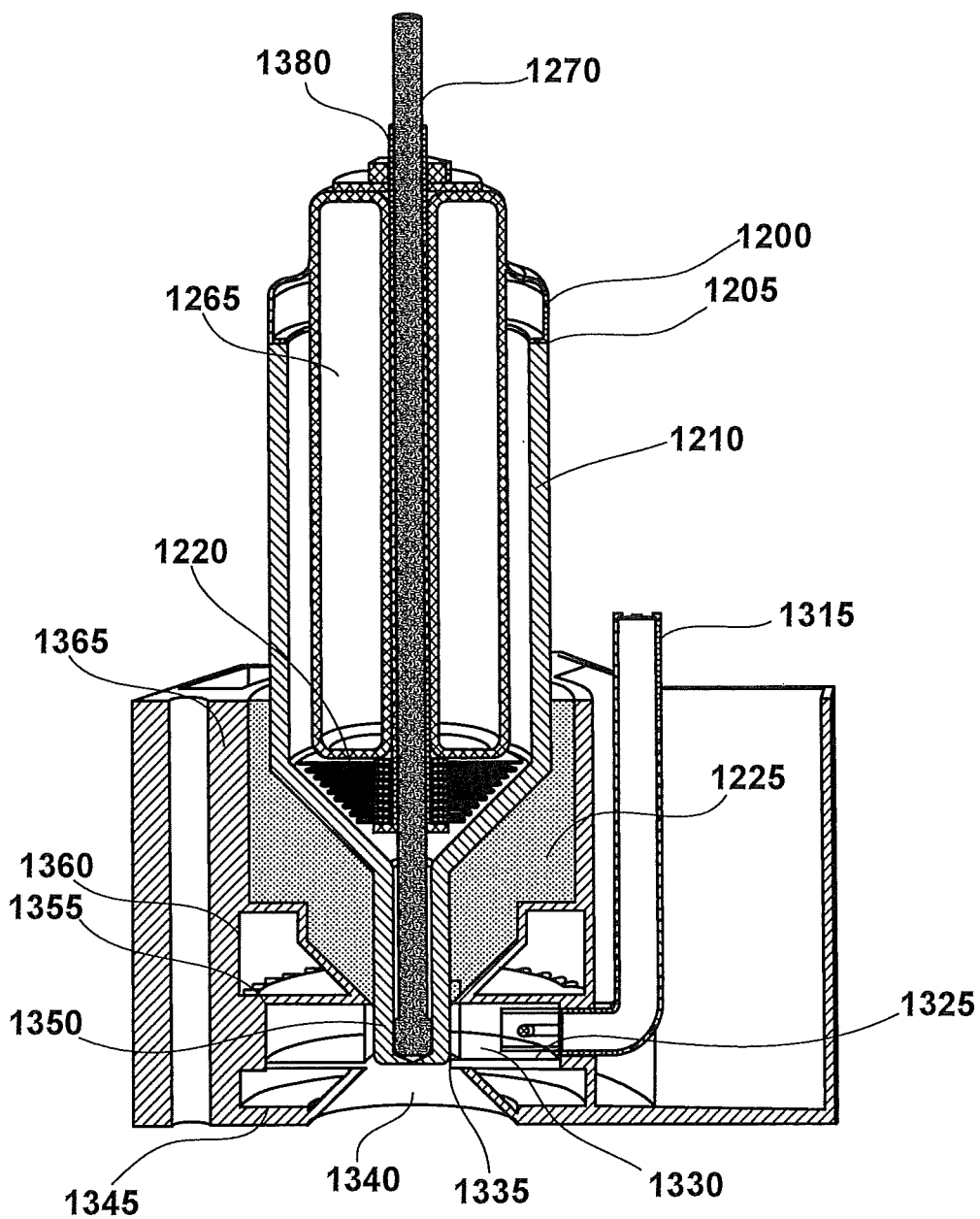
FIG. 11C depicts a cross-section view of a microwave cavity heated crucible droplet generator according to an embodiment.

FIG. 11C depicts a microwave cavity heated mini-crucible droplet generator according to an embodiment. This system is similar to the inductive heated system described above, and only the difference will be described. Around the crucible is affixed a quartz loaded microwave cavity 1330 which may be fabricated as part of the housing, or as a multicomponent brazement 1365. A quartz replaceable shield 1335 surrounds the ceramic mini-crucible 1350 and provides more thermal isolation.

A plurality of cavity cooling fins 1355 may be disposed outside of the quartz loaded microwave cavity 1330. The cavity cooling fins 1355, the lower cooling fluid manifold 1345, and the upper cooling fluid manifold 1360 exhibit a robust capability to remove heat from the cavity.

The micro-stripline feed to source 1315 supplies RF power to the cavity. The source circuit is constructed on the micro-stripline and may include fluid cooling. The micro-stripline feed to source 1315 has loop coupling to cavity 1325 on the cavity end of the micro-stripline. The entire micro-stripline assembly may be adjusted within the cavity to vary coupling using motorized micro positioners (not shown).

Figure 11D:
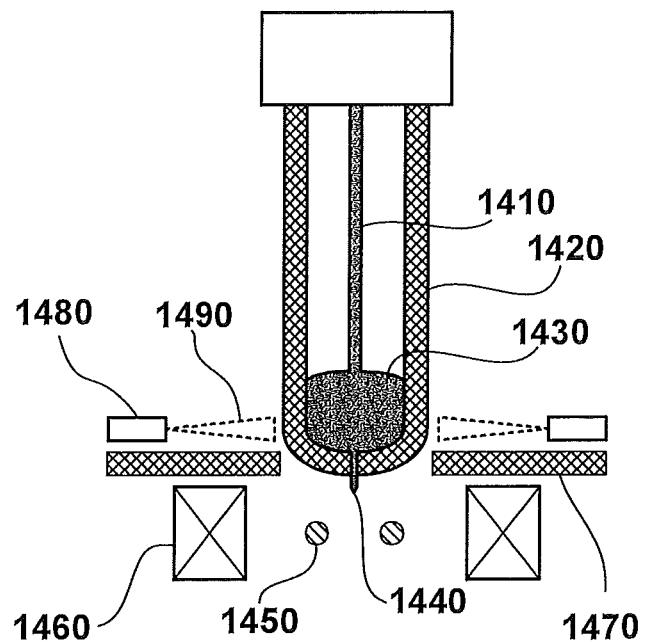
FIG. 11D depicts a schematic cross-section view of a diode or laser heated crucible droplet generator according to an embodiment.

FIG. 11D depicts a diode heated crucible droplet emitter according to an embodiment. The droplet emitter includes at least one LED/laser diode 1480 focused upon a ceramic mini-crucible 1420. The wire feed 1410, ceramic mini-crucible 1420, liquid melt volume 1430, jet 1440, and extraction electrode 1450 elements are similar to those described above.

Some LED/laser diodes 1480 have reasonable beams at a few millimeters and can be used without added optics. An evaporant shield 1470 may be positioned to protect the output optic surfaces from being coated with evaporating metal. A cooled surface evaporant trap 1460 may be positioned close to (but not interfering with the optics) to provide a reservoir for condensing metal vapor between surfaces. The evaporant shield 1470 reduces metal vapor transport into the diode light beam 1490 volume. The system can be fitted with a magnetic field coil (not shown) around the beam lines to stabilize Rayleigh breakup and to deduce melt level as described above, but at much lower power.

Figure 11E:
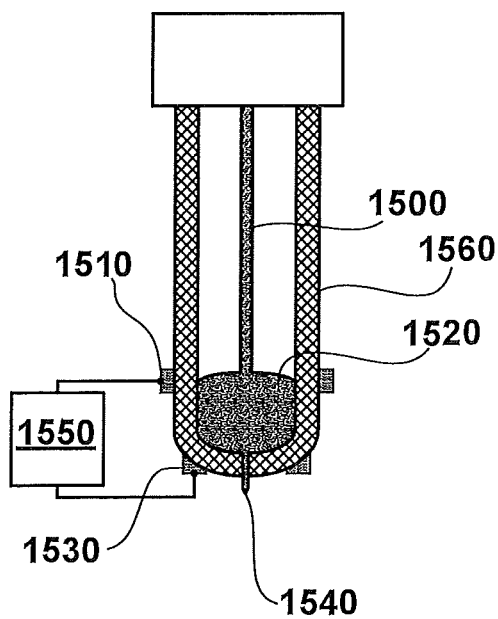
FIG. 11E depicts a schematic cross-section view of a crucible droplet emitter with capacitive level sense according to an embodiment.

FIG. 11E depicts a crucible droplet emitter with a capacitive level sense according to an embodiment. Wire feed 1500 is inserted, heated to form liquid melt volume 1520, and emitted as a jet 1540 from the crucible droplet emitter. Two cylindrical electrodes, melt ring electrode 1510, and a crucible tip ring electrode 1530 are connected to a capacitance meter 1550. The capacitance value increases as the level of liquid melt volume 1520 rises, and vice-versa. These electrodes can be deposited on the ceramic mini-crucible 1560, and contacted or connected to the surface with a close spaced electrode.

Figure 11F:
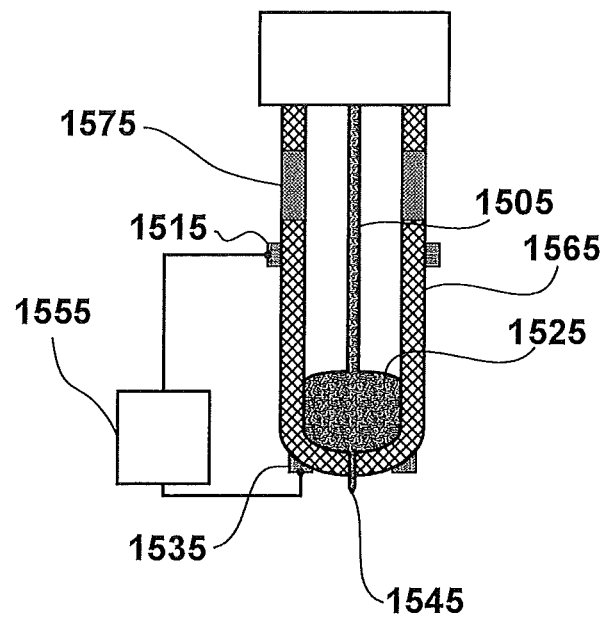
FIG. 11F depicts a schematic cross-section view of a crucible wire position sense and pressure measurement according to an embodiment.

FIG. 11F depicts a crucible wire position sensor and pressure measurement sensor according to an embodiment. Wire feed 1505 is inserted, heated to form liquid melt volume 1525, and emitted as a jet 1545 from the crucible droplet emitter. A rod ring electrode 1515 positioned about the outside of the crucible has a desirable view factor for the feed wire 1505. This configuration can detect the approach of the feed wire 1505 to the melt volume 1525. Rod ring electrode 1515 and crucible tip ring electrode 1535 are connected to a capacitance meter 1555. The system can be calibrated cold by running the feed wire 1515 until some pressure is indicated on the strain gauge 1575, which measures the pressure in the ceramic mini-crucible 1565.

In several embodiments, crucible-type droplet emitters have been described, wherein material is melted within a crucible. In a crucible-type system, the design of the orifice is an important factor influencing performance. For example, to produce 20-micron droplets, an orifice diameter of 10 microns is appropriate. Many metals have material in the melt that remain un-melted until temperatures several hundred degrees above the melt point of the metal or alloy are achieved. Ceramic walls tend to shed particles continually even with stringent initial cleaning due to the nature of pressed powder materials. As a result, it is possible that the crucible orifice can become clogged.

With inks, solvent diluted plastic forming solutions, and glass forming solutions it is possible to use approximately 0.5 micron filters, such that only very small droplets pass through the filters and become potentially problematic. Typically, the filtering of liquid metals can be even more challenging.

Some materials cannot be effectively melted in a crucible, such as titanium and many of its alloys. Crucible life can be impacted, for example, because titanium can dissolve the crucible.

Some materials are too hot to melt in ceramics such as various refractory materials, i.e., molybdenum, tantalum, platinum, rhenium, tungsten, and their alloys. These materials are attractive because of the value of intricate parts fabricated using these materials.

The search for methods to make controlled size and charge droplets of useful materials at high rates suggests extracting liquid metal from a cone.

A pressurized crucible can yield approximately 20 m/sec (meters per second) velocity of the jet out the crucible prior to applying the electrostatic field and beginning the Taylor cone process. This suggests that 20-micron particles can be generated at rates of 500,000 Hertz as evidenced by tin droplets used as targets in advanced lithography systems.

According to several embodiments, liquid is accelerated down a cone formed on the tip of an approximately 1.5 mm diameter wire end so that without extraction electrodes the liquid metal streams off the tip at approximately 20 m/sec.

Figure 11G:
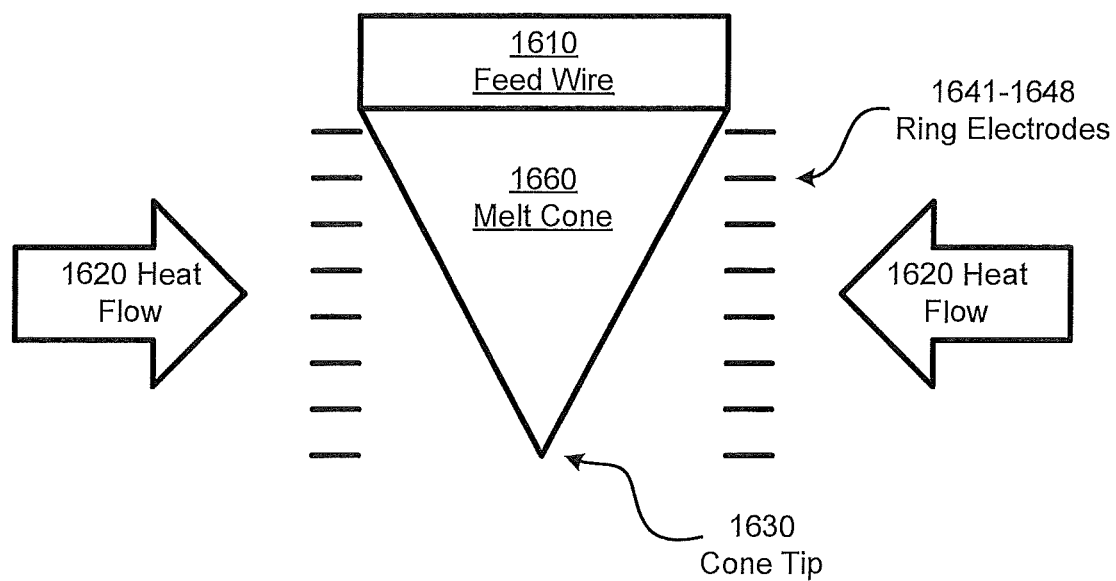
FIG. 11G provides a schematic illustration of electrostatic stripping of molten metal from a feed wire source according to an embodiment.

FIG. 11G provides a schematic illustration of electrostatic stripping of molten metal from a feed wire source according to an embodiment. The stripping of molten metal occurs through heating 1620 of a surface melt cone 1660 at the terminal end of feed wire 1610 under different types of electrostatic stress. One method is to put such a field on the ring electrodes 1641 to 1648 such that any liquid that forms is electrostatically dragged to the cone tip 1630.

Another method is to pulse the flow at the rate of the droplet emission from the cone tip 1630. A traveling wave on the ring electrodes 1641 to 1648 can result in material arriving at the tip in pulses.

With electrostatic stripping, precise control of the melting process is important. The ring electrodes or inductive/microwave capacities provide accurate measurement of the cone diameter at each of the 8-10 zones of cone melting. These zones can be very small, e.g., approximately 0.5 mm each.

Figure 11H:
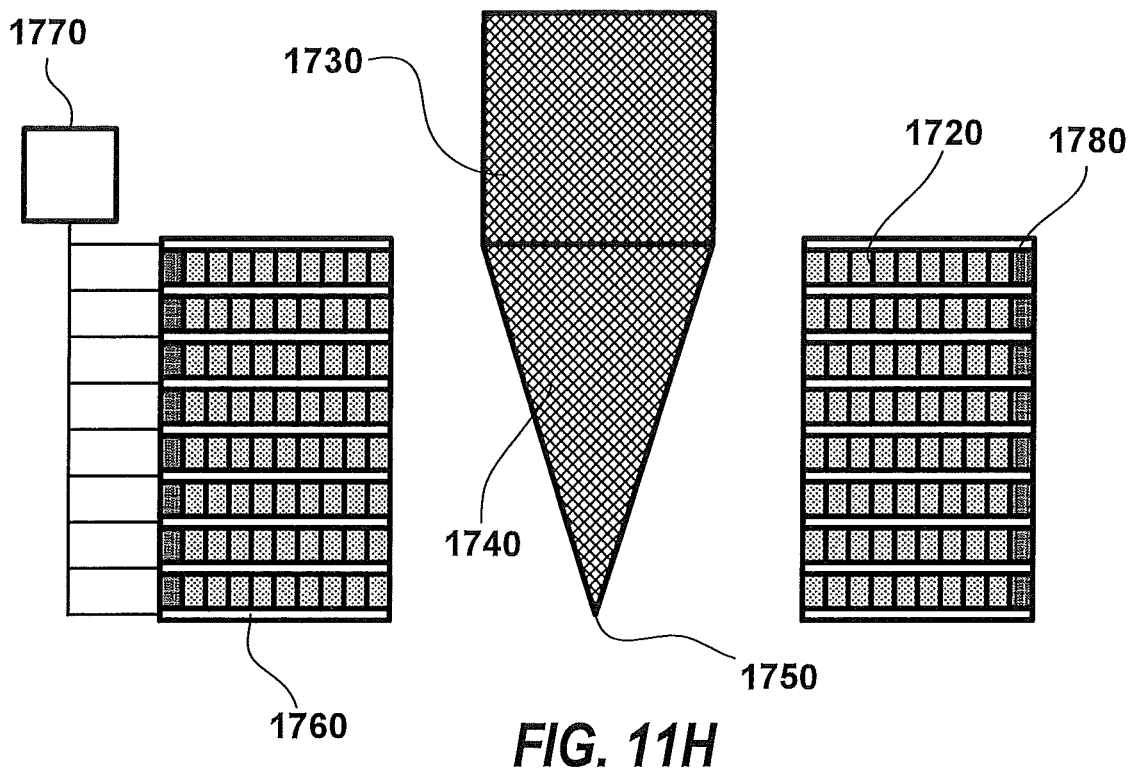
FIG. 11H depicts a schematic cross-section view of a multi-zone inductive heated cone droplet emitter according to an embodiment.

FIG. 11H depicts a multi-zone inductive heated cone droplet emitter according to an embodiment. A series of inductive RF (radio frequency) coils 1720 are spiral wound and stacked with insulated electrodes 1760 between each coil, with either a static or dynamic voltage 1770 applied to each ring. The voltage achieves a tip flow 1750.

The coils can be flat coils and stacked. Each inductive RF coil 1720 may be configured to run as a free running oscillator. The frequency depends upon the diameter of the melt cone 1740. The RF power 1780 can be adjusted to stabilize on a desired frequency.

As the end melts, more feed wire 1730 is fed into the system. The profile diameter of the melt cone 1740 is determined by analyzing the resonance frequencies of the inductive RF coils 1720.

Figure 11I:
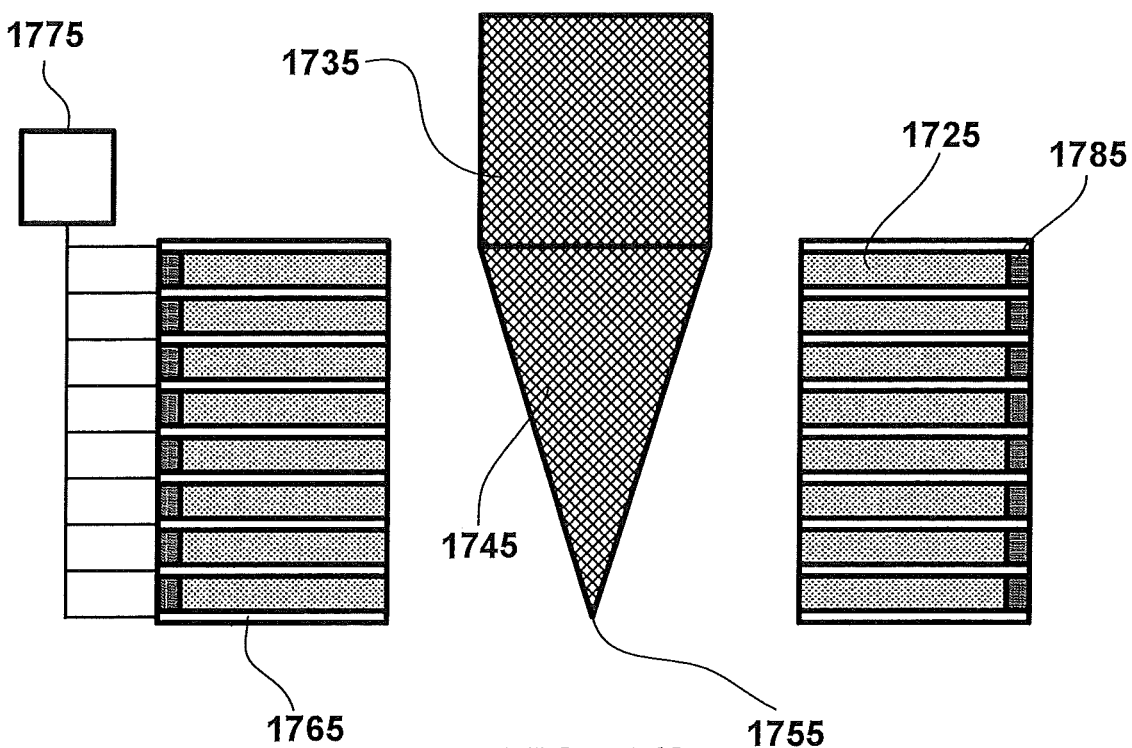
FIG. 11I depicts a schematic cross-section view of a multi-zone microwave heated cone droplet emitter according to an embodiment.

FIG. 11I depicts a multi-zone microwave heated cone droplet emitter according to an embodiment. A series of microwave cavities 1725 are stacked with insulated electrodes 1765 between each cavity, allowing either a static or dynamic electrostatic voltage 1775 on each ring that. The voltage achieves a tip flow 1755.

The microwave cavities 1725 may be filled with quartz or another high temperature, low loss ceramic material. Each microwave cavity 1725 may be configured to operate as a free running oscillator. The frequency depends upon the diameter of the melt cone 1745. The microwave power 1785 can be adjusted to stabilize on a desired frequency.

As the end melts, more feed wire 1735 is feed into the system. The profile diameter of the melt cone 1745 is determined by analyzing the frequencies of resonance of the microwave cavities 1725.

Figure 11J:
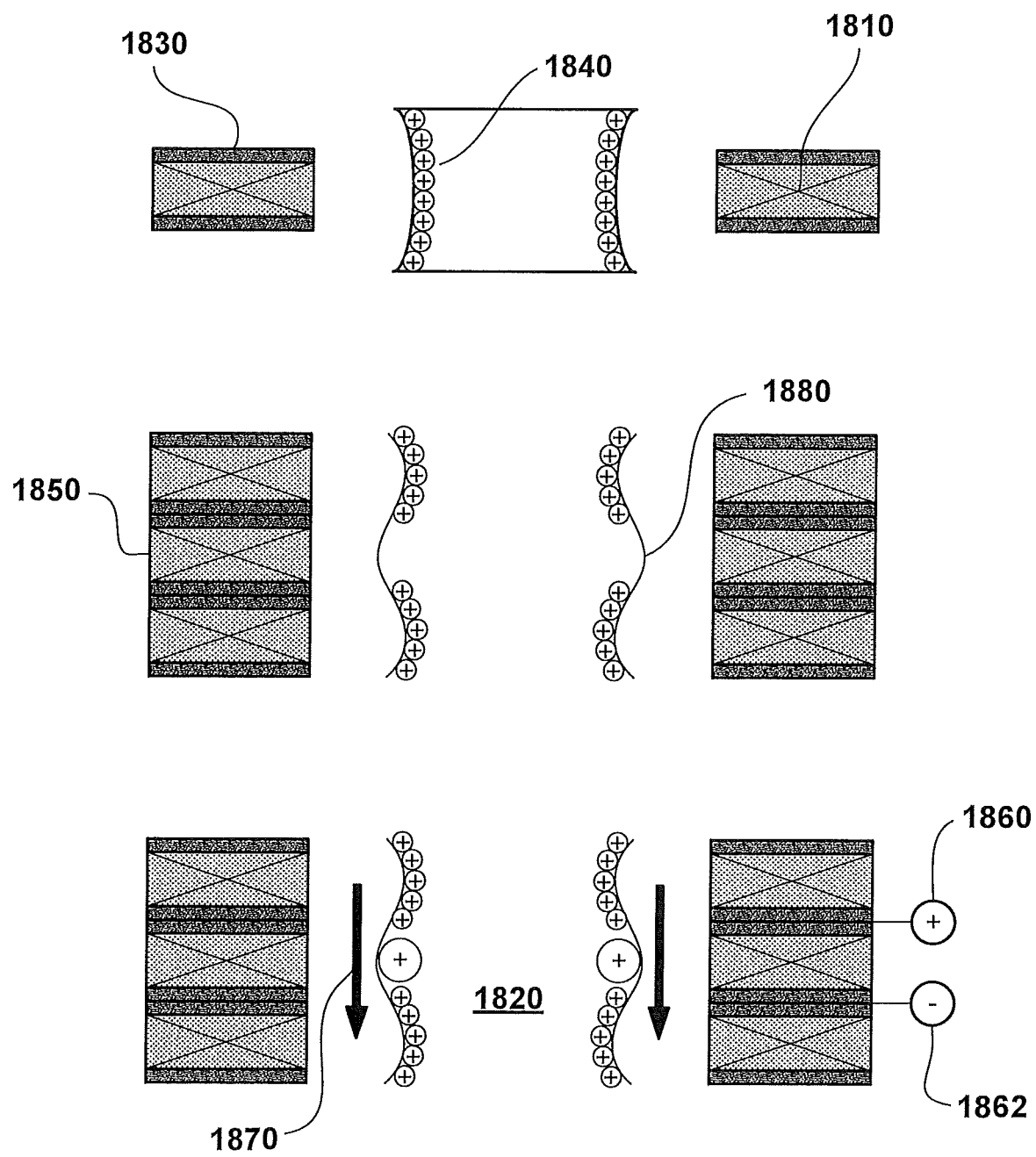
FIG. 11J provides a schematic cross-section view of a schematic illustration of a method and apparatus for magnetically stripping of molten metal from a feed wire source according to an alternative embodiment.

FIG. 11J provides a schematic illustration of a method and apparatus for magnetically stripping molten metal from a feed wire source according to an alternative embodiment. As shown, the forces acting on the liquid metal cylinder due to axial RF magnetic fields are considered. Flat coils 1810 generate a high magnetic field in the small central area. A wire placed in this area is heated by inductive heating similar to a levitation furnace. The induced current penetrates into the wire wall a distance of the current sheath skin depth 1840. The thickness of the melt may be deeper depending upon a balance of the power input, power loss and thermal conductivity of the wire being melted. The inventors surmise that the layer is thin allowing surface tension and molecular forces to be strong compared to gravity. As shown above, a single coil 1810 presses the liquid metal inward in the presence of the magnetic field of the flat coil 1810 and the focusing of the pole piece electrodes 1830. This concave feature has been observed with the inductive levitation of a melt sample.

Triple coil effects 1820 demonstrate expected behavior with three (3) coils that are assembled around a surface melted wire. The center-off coil 1850 enables an outward melt protrusion 1880 due to minimal inductive force on the melt in that region.

The inventors further surmise that a voltage potential between the wire and the pole pieces causes the melt protrusion 1880 to become locally, more highly charged due to a shape increase electric field. If this field is high, the electrostatic forces can pull on the protrusion and disrupt the surface. This run away effect is caused because more protrusion tends to increase the electric field in the vicinity of the protrusion.

But, as shown in FIG. 11J, an electrostatic field (imposed between levels 1860 and 1862) can exert a force on charge protrusion 1870 and move the protrusion. If the electric field is switched to another electrode before the melt protrusion 1880 can run away with the force and the current in the magnetic field is also switched, the liquid is effectively pumped downwardly along the surface. The apparatus shown in FIG. 11H can be used to achieve the magnetic stripping of molten metal as described in FIG. 11J.

Figure 11K:
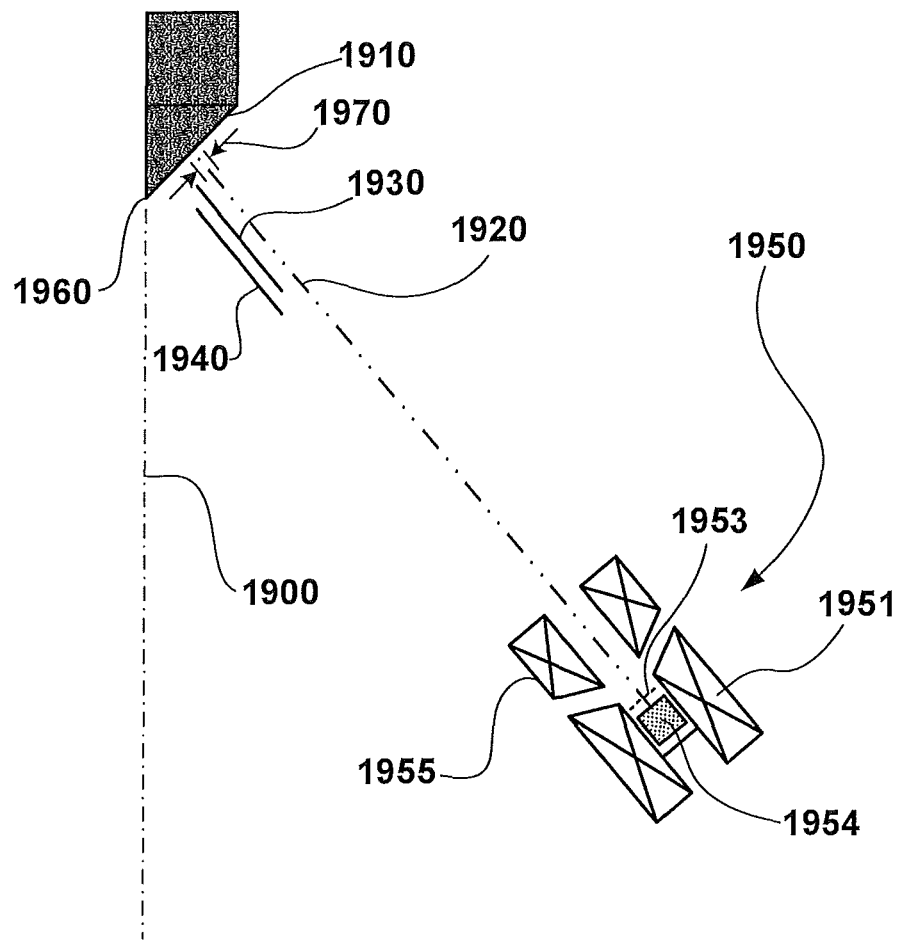
FIG. 11K depicts a schematic cross-section view of an electron beam heated cone droplet emitter according to an embodiment.

FIG. 11K depicts an electron beam heated cone droplet emitter according to an embodiment. The wire feed cone end 1910 is heated with a scanned and focused beam 1920. In this chase this beam is described as an electron beam emitted from a ring electron beam emitter "gun" 1950. This ring electron gun 1950 is envisioned as symmetrical about the center line 1900 generally coincident with the wire axis. The ring electron gun 1950 generates electrons using a heated cathode 1954, but could also be comprised of a field emission or heated field emission electron source. The current emitted from the heated cathode 1954 is dynamically regulated by the current modulation grid 1953, accelerated by the anode 1955, and scanned and focused using magnetic focusing and scanning coils 1951 and 1952.

The focused beam 1920 can perform several functions, namely: (1) The focused beam 1920 can be scanned up and down the cone rapidly (compared to the movement of liquid) and heat the cone; (2) The focused beam 1920 can be defocused to melt the entire cone region; (3) The focused beam 1920 can be scanned from the large diameter toward the cone tip 1960 at a speed that matches the velocity of liquid attraction caused by the electric field ensuing from a voltage difference between the shield electrode 1930 and the feed wire cone end 1910. This action produces a corresponding increase in liquid proximate the cone tip 1960 every scan; (4) The increase in liquid at the cone tip 1960 arrives with a velocity that can supply the common method of a velocity supplied by pressure flow through an orifice described above; (5) If the scan frequency is constructive to the natural frequency of the droplet emission from the Taylor cone caused mostly by voltage on the extraction electrode 1940, the system is coordinated and the scan supplies the function of the piezo-electric vibration described above. Other controls are available, namely: (a) Power in the beam controls the amount of liquid moved down the cone to the cone tip 1960; (b) The sweep velocity may be non-linear and the waveform shape may be another factor influencing the liquid velocity at the cone tip 1960 and volume delivered; (c) The focus width 1970 partially determines the shape of the wave flowing down the feed wire cone end 1910. This focus width 1970 may be tuned dynamically to affect the wave shape; (d) Bunch material as the wave appears to the cone tip 1960.

Discrete Electron Beam Melting

Figure 11L:
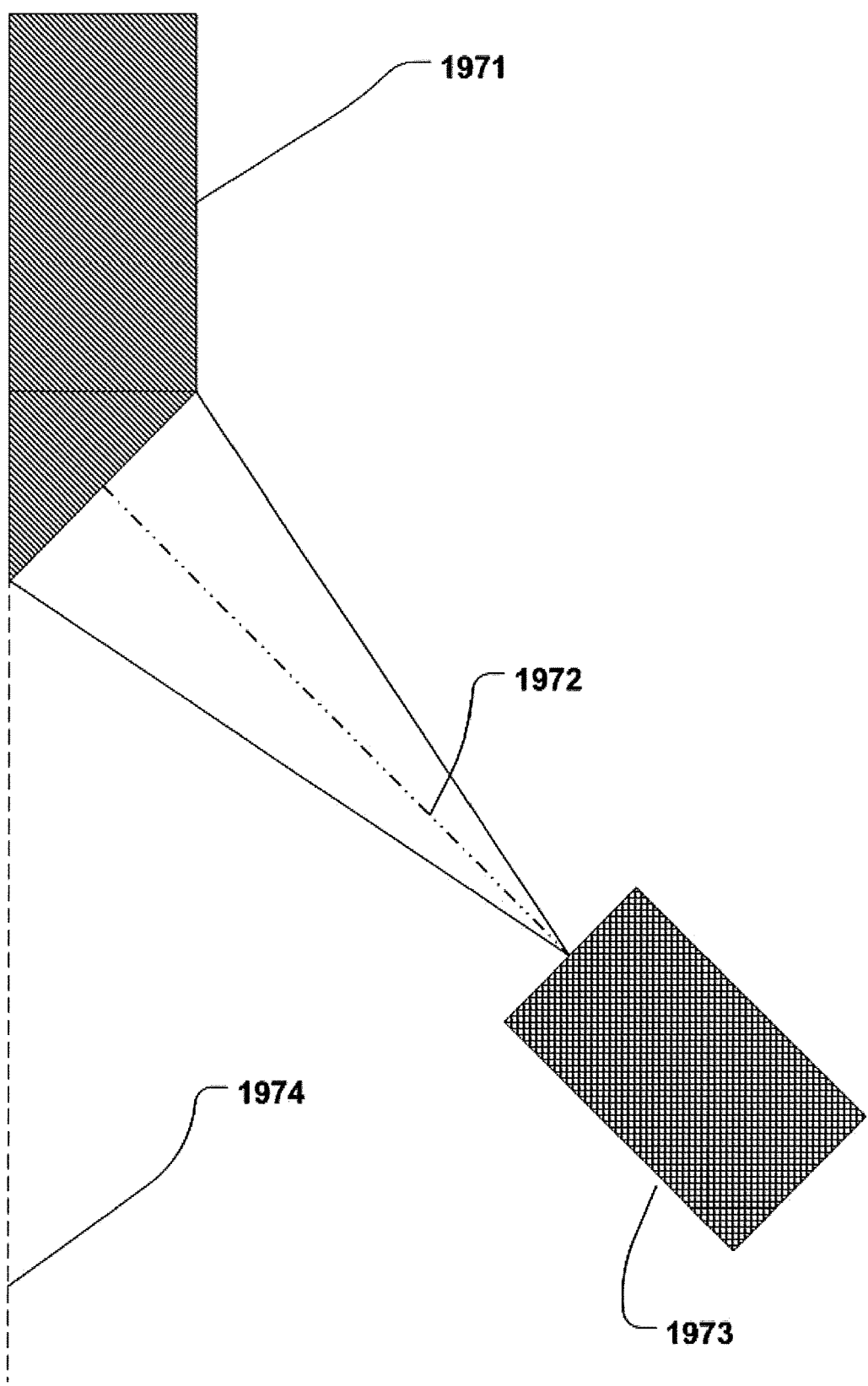
FIG. 11L is a schematic plan view of an electron gun directing an electron beam at a cone shaped wire tip according to an embodiment.

FIG. 11L shows an electron gun 1973 that produces an electron beam whose breath of scan is part of the area of the tip of a wire 1971. This wire 1971 is about 1.5 mm in diameter and is shaped with a conical end here shown in half cross section. The centerline of the device is line 1974. The individual guns 1973 number 3-8 and are arranged in a circle around the tip of the wire 1971. These guns are scanned over the tip of the wire to heat and melt the tip.

Figure 11M:
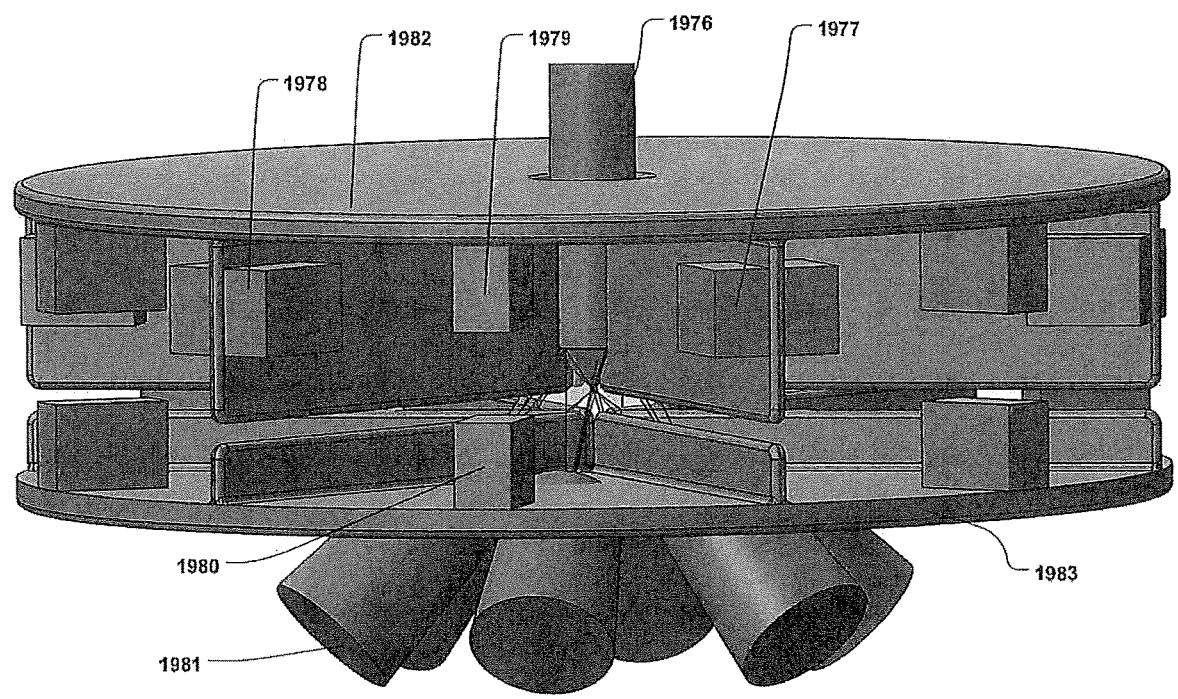
FIG. 11M is a perspective view of a plurality of electron guns directing respective electron beams at a wire tip according to an embodiment.

FIG. 11M shows 6 electron guns 1981 arranged around the wire 1976. One electrode plate 1982 separates the circumference of the gun into sections. The dividers between the cells are electrodes that tune the voltage on the circumference of the wire tip. A second flange 1983 with raised electrodes applies an axial field to extract droplets from the liquid jet that forms at the tip. These elements are described in more detail in FIG. 11N. A multiple of secondary electron detectors 1977, 1978, 1979, and 1980 enables the system to see the shape of the wire tip under operation and detect any texture that develops on the tip.

Figure 11N:
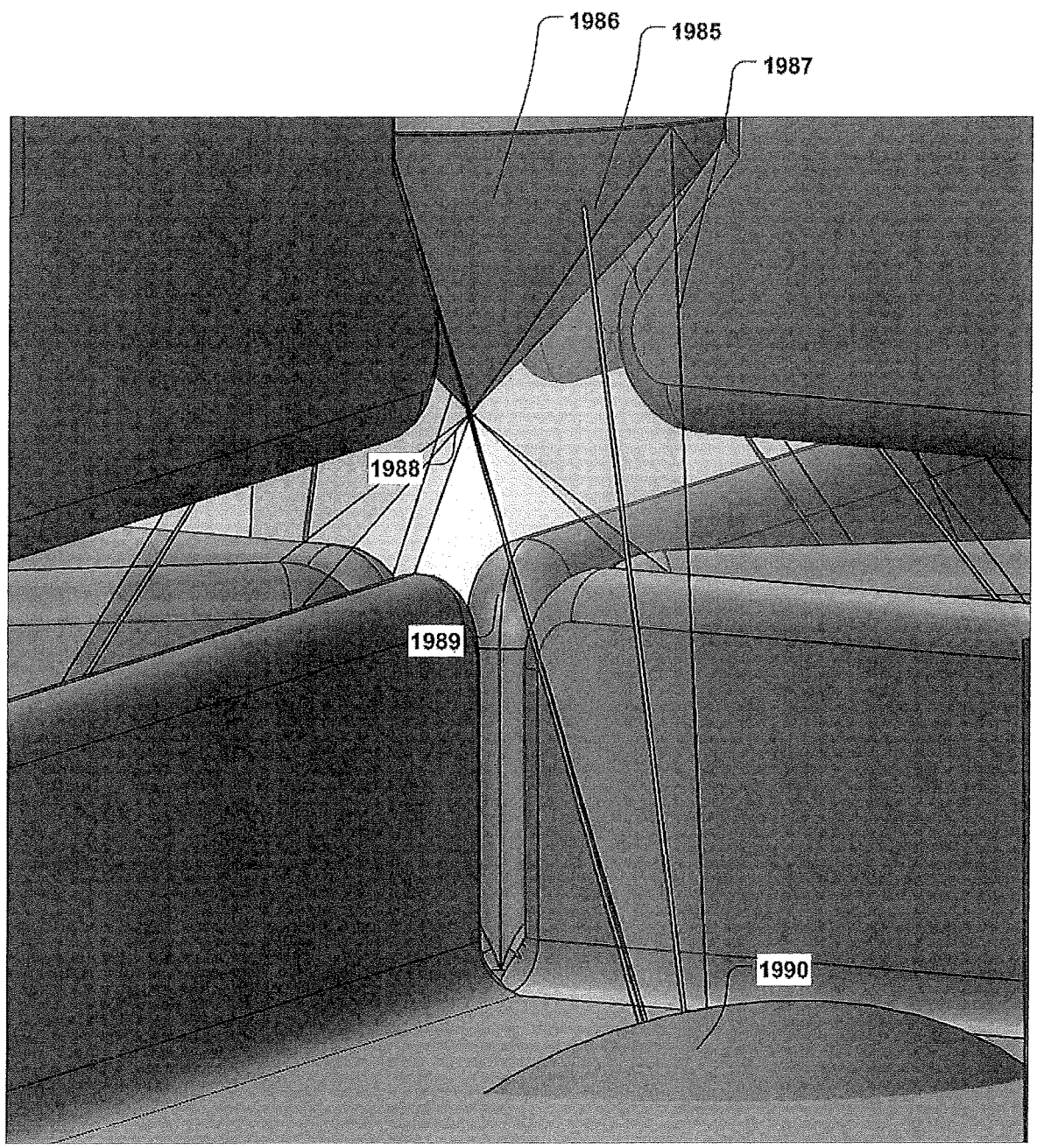
FIG. 11N is a close up view of an electron beam scanning a section of a wire tip according to an embodiment.

FIG. 11N shows a close up of the tip 1988, one sixth of which is a conical section 1986. One position of the electron beam is frozen in time described by the ~10 micron rod 1985. The part 1990 describes the part of the electron gun that protrudes though the lower extraction electrode. The ghosted area 1987 describes the volume of space that the electron beam traces out while delivering energy to the part of the cone 1986.

Figure 11O:
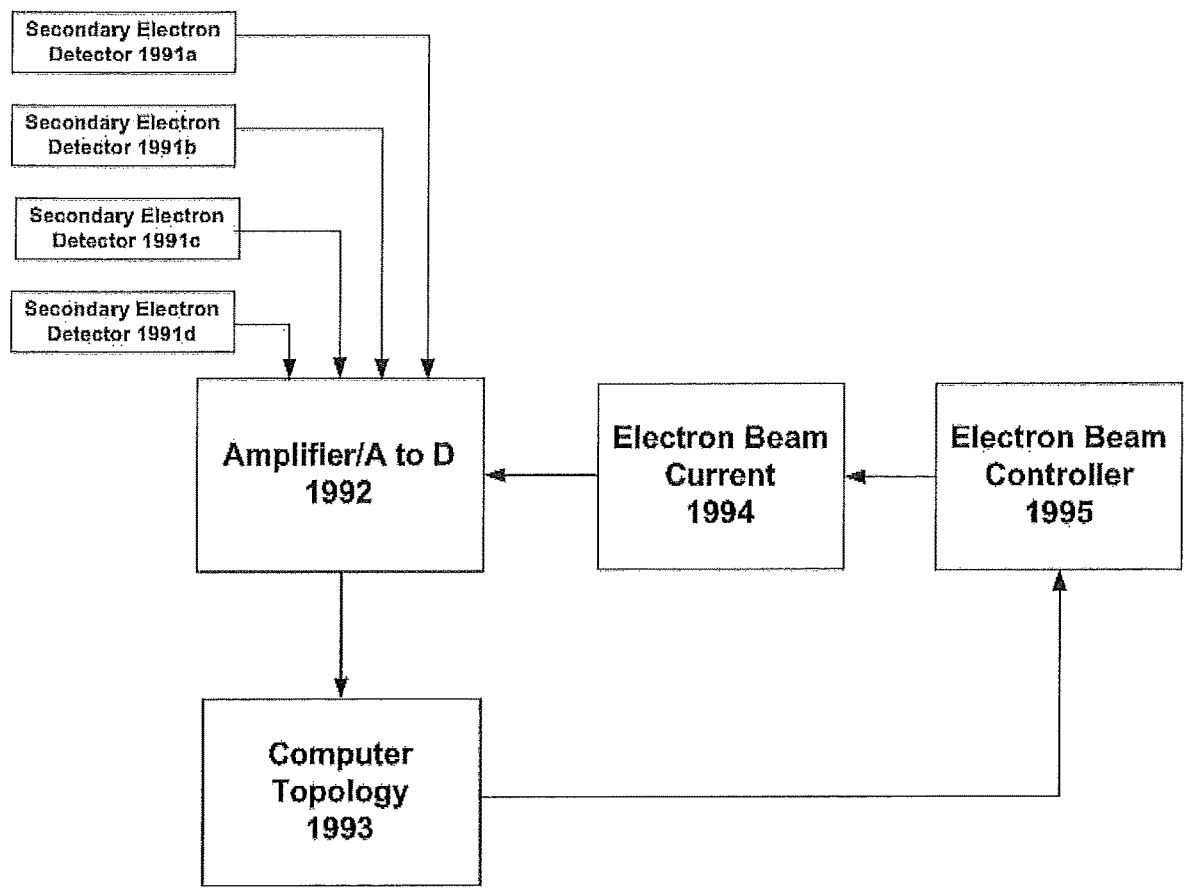
FIG. 11O is a schematic block diagram of a control system for an electron gun according to an embodiment.

FIG. 11O shows the system to control a single electron gun. The Secondary Electron Detectors 1991 $a$, $b$, $c$, and $d$ supply signal to the amplifier and A/D 1992. The gain is modulated conversely with the beam current to provide a stable intensity signal. These signals are then converted into topology maps in the dedicated Computer Topology 1993. The Electron Beam Controller 1995 compares to data to the required shape and adjusts the beam current to melt the high spots.

Figure 11P:
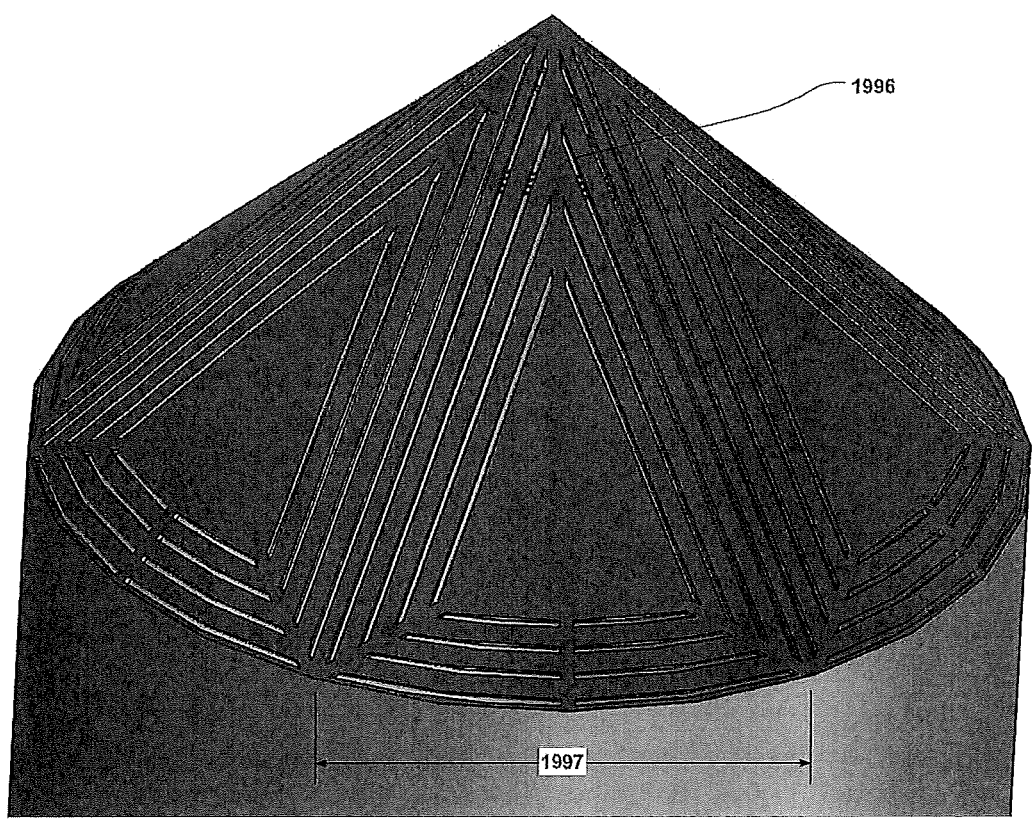
FIG. 11P is a perspective view of an instrument tip useful in calibrating electron guns according to an embodiment.

FIG. 11P shows an instrumented tip that is comprised of an electrode insulated from and inside the precision perforated conical shell 1996. This tip assembly is placed in the location of the wire tip and used to measure the position of the beam with scan voltages on the gun scan electrodes. This shell has a pattern for each of the six electron guns. The precision perforated conical shell may be measured in an SEM for a very precise location of each hole or slot. This map is used to determine where each hole is located and to calibrate the scan precisely. The inner electrode is biased positive to collect all electrons accurately and the capacitance between the two electrodes is kept to a minimum to increase frequency response. The secondary electrons are measured by the array of secondary electron detectors. The combination of primary electron through the holes in the multi-hole Faraday sensor allows simultaneous calibration of both the electron beam scan and the secondary electron detectors.

Embodiments involving multiple electron guns contemplate the ability to: vary the droplet diameter; vary the charge on each droplet; control droplet velocity; freeze the wire tip and terminate droplet generation between droplets; heat the droplet tip and re-start droplet generation in the droplet period; heat (with preheat) refractory materials, i.e., materials with temperature >2000 degrees C.

Various embodiments which use two electrodes that independently tailor the radial and axial electric fields contemplate: two or more electrodes divided into their respective view factors of the wire tip; multiple electrodes disposed radially symmetrical about the wire tip; multiple electrodes disposed radially asymmetrically about the wire tip and voltages tuned to stabilize instabilities that are of similar asymmetries; electrodes comprised of many radial electrodes each driven at different voltages to stabilize instabilities; and where the voltages are derived using an auto-tune system that learns coefficients for the terms of a series that describes the instability by observing the tip using a microscope camera with high frame rate under electrostatic excitation to detect the modes of wire tip shape change.

Various embodiments involving electron beam scan control for enabling precise control of the heating of a wire tip contemplate: modulating the current with a fixed scan voltage and fixed scan trace profiles; modulating the voltage with a fixed scan current and fixed trace profiles; modulating the trace profiles with fixed voltage and fixed current; modulating the voltage and current to obtain a best resolution beam, and keeping the scan trace profile constant; modulating the voltage and the scan trace profile and keeping the current constant; modulating the current and the scan trace profile and keeping the voltage constant; modulating the current, voltage and scan trace profile.

The control techniques contemplated by the present invention include: Control the heat on the tip to tune the heat at tip and rim of the cone to provide a smooth jet flow from the tip; The flow rate determines the jet diameter and thus the droplet diameter; The ability to heat rings of the cone and move the rings down the cone in a marching order to enable pulsed flow from the tip; using pulsed flow to regulate the droplet rate and/or to stabilize that rate; The ability to turn on the flow to start the gun and turn off the flow abruptly; Integration of the heating with the extraction voltage to mitigate or avoid overly charging the droplets to thereby reduce instability; Variation of extraction voltage with changes in droplet size to achieve proper droplet velocity as determined by diagnostics of the droplet impact; The topology output enables measurement of the ring heights and their control; Control of beam current, scan frequency, Scan path, and beam voltage to achieve accurate heating of cone surface; Dynamic control of beam current and voltage to minimize radial and axial field distortion of the focused beam; The control of modulating the preheat power abruptly to aid in controlling the tip temperature during start and stop processes; The control of using a 2 color microscopic camera with shutter speed short compared to the thermal time constant of the tip to measure the tip thermal response to controls and set parameters of the control; Use of a focused single point measurement to monitor temperature of the tip; using multiple points of measurement to provide a sufficient sensing point to provide adequate control; and using camera data in parameter variation experiments to determine placement of measurement points.

In an embodiment, a faraday electron sensor comprising two conductors insulated from each other sufficiently may be used to support the bias voltage. The inside electrode is essentially the same shape as the outside electrode, but preferably slightly smaller and biased positively to attract secondary electrons. The faraday sensor may include patterns of slots or holes between 0.25 and 0.95 the diameter of the electron beam to allow a scan in two orthogonal directions to measure beam profile as well as position. The holes and slots together with the scan profile may be configured to provide a signal indicating unique location data. Various diameters or widths of slots may provide measurement of beam diameters at various positions in the scan area. The conductive area of the inner electrode may be broken into sections to provide unique data as to location of the beam and to decrease capacitance of each circuit, thereby increasing the response time of the sensor. The conductive area of the inner electrode is close to the outer electrode only at the tip, reducing the capacitance and hence increasing the speed of scan that can be correctly analyzed.

Turning now to FIG. 12A, a droplet sensor assembly according to an embodiment may be configured to measure the charge, mass, velocity and/or trajectory of each particle/droplet. The assembly has a second section where scan electrodes 2060 are able to direct the individual particles/droplets to specific positions on the growing part/workpiece. The electrodes can rapidly sweep voltage and are also able to direct the droplets at a sharp angle relative to the vertical axis of the wire (not shown) so that the particle/droplet is captured in the off-specification (out of range) droplet bin 2080. Two assemblies, almost identical, may be used in each emitter assembly. This version is used just before the droplets leave the droplet emitter 2050. The Q, M, V, trajectory sensor, scan and off-specification droplet bin (input version) assembly connects to the droplet generator above and measures the droplet immediately following generation, and is described below.

A stack of four differential Q/M and V sensors 2010 to 2030 can be similar in their design, and incorporate differential amplifiers-digitizers 2070 that charge-amplify the signals on the electrodes described below. The boards include power supplies that derive the needed on-board power from a common buss in the power distribution that is current protected, and able to be disconnected for service or replacement of the individual sections. These power supplies are controlled by significant high speed computation in the scan voltage computation board 2085 to measure the parameters for each droplet and compute the scan voltages for each specific droplet. The commands from this computation may be used as the input to the scan voltage generator 2075 which supplies voltage to the ultra-low capacitance scan electrodes 2060. If a droplet cannot be satisfactorily scanned to the next position within the abilities of the system, the particle may be directed into the off-specification droplet bin 2080.

In the beamline design, optimum beam optics can be designed based upon brightness of the source. As described herein, parameters may be computed to re-tune the optics for each and every particle/droplet, as necessary. The quality of the beam is then dependent upon the ability to measure Q, M, V and trajectory of each particle/droplet.

Figure 12B:
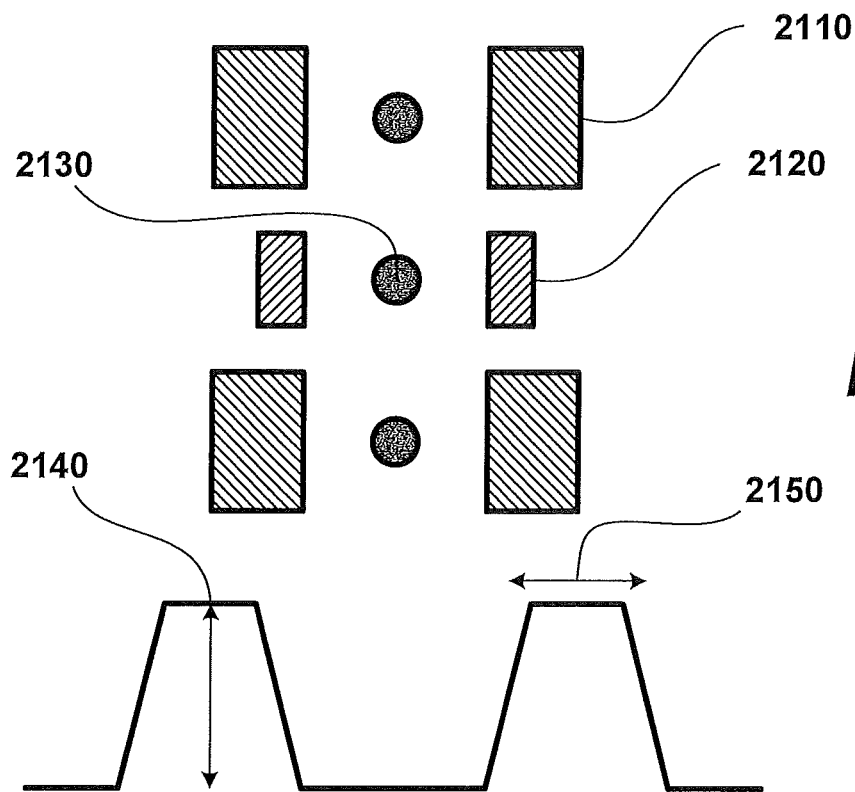
FIG. 12B provides a schematic cross-section view of an axial view of a schematic representation of a droplet sensor assembly according to an embodiment.

FIG. 12B provides an axial view of a schematic representation of a droplet sensor assembly according to an embodiment. The droplet sensor includes segmented sense electrodes 2120 and surrounding reference electrodes 2110. Shown in the middle is a string of charged droplets 2130. The design is such that the reference electrodes 2110 are close enough together to keep the charge of droplets not under measurement from impacting the voltage on the segmented sense ring 2120 and obtain the resolution required to accurately direct the droplets and fabricate the part.

Figure 12C:
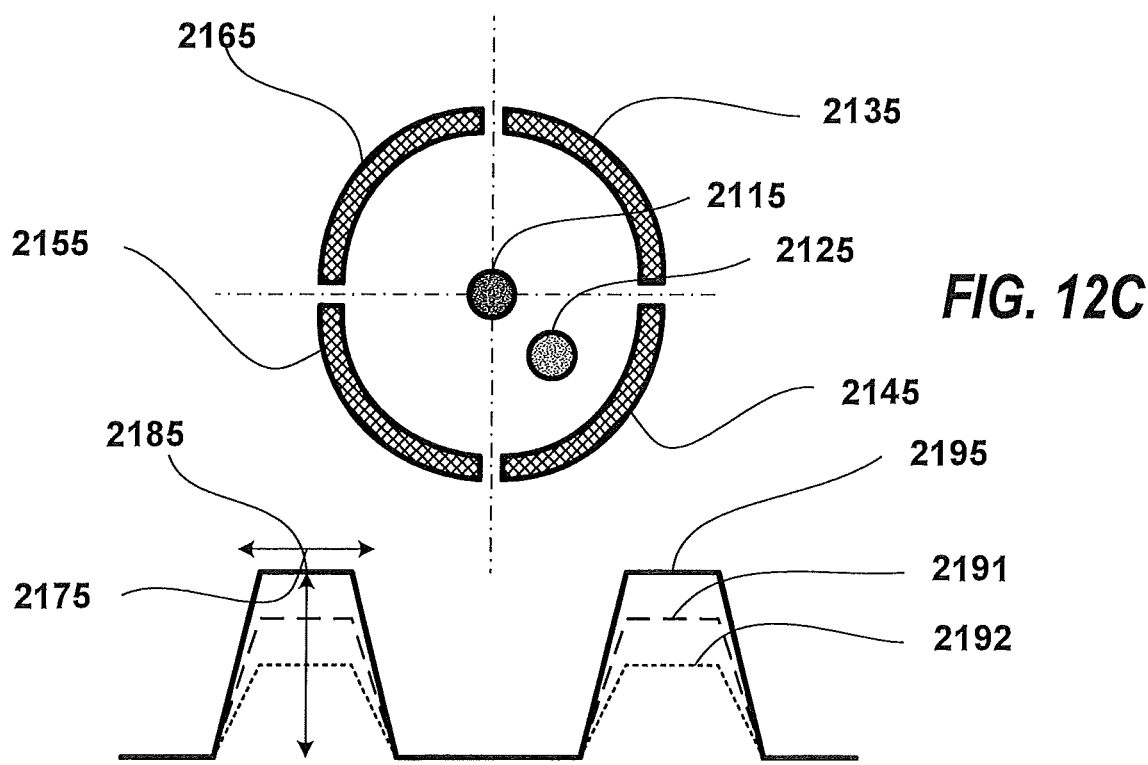
FIG. 12C provides a schematic plan view of a schematic representation of a droplet sensor assembly according to an embodiment.

FIG. 12C provides a plan view of a schematic representation of a droplet sensor assembly according to an embodiment. A summation 2195 of electrode voltage traces 2191, 2192 illustrate the output response of each ring summed to the passage of a pair of droplets 2115, 2125 through a single sensor. The pulse width 2175 is a measure of the time the droplet spent in the view of the segmented sense ring 2120 and is directly related to the droplet velocity. The pulse height 2185 is a measure of the charge on the droplet. Since the voltage that accelerates the droplet is controlled, the deduction of the droplet mass may be computed.

Also shown in FIG. 12C, the simplified geometry of a droplet and the segmented sense ring is split into 4 ring segments 2135, 2145, 2155, and 2165. An off-center displaced droplet 2125 is shown next to a droplet 2115 shown on center of the sensor. Electrode voltage traces exhibit time variations of the voltage (amplitude/height 2185, ranging from 2191, 2192, 2195, and width 2175) on the various sensor rings 2135-2165 in response to the passage of the displaced charged droplet 2125. The close ring segment 2145 has the highest pulse voltage and the farthest ring segment 2165 has the lowest pulse voltage. Tests show that an accuracy of +/−10 microns is possible with this method.

Figure 12D:
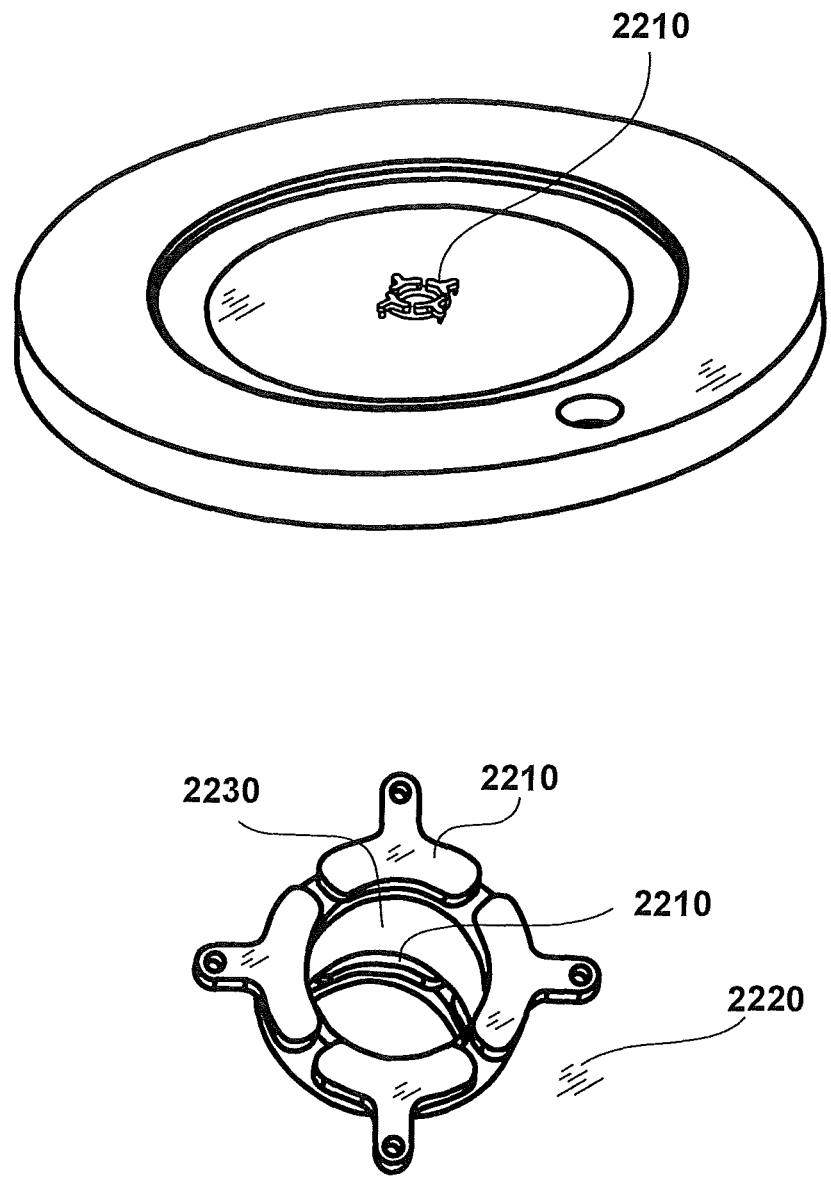
FIG. 12D provides a perspective view of an electrode structure of the droplet sensor assembly of FIG. 12A.

FIG. 12D provides a view, including an enlarged view, of an electrode structure of the droplet sensor assembly of FIG. 12A, including details of the design of the segmented sense electrode 2210 and the reference electrodes 2230. These electrodes may be sealed in quartz with only a small area exposed to the droplet. This configuration reduces dielectric leakage and improves thermal stability while reducing the capacitance of the sense electrode 2210.

Figure 12E:
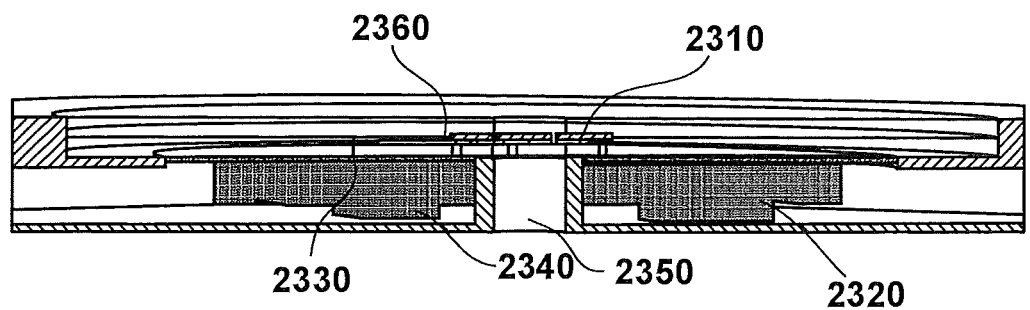
FIG. 12E provides a cross-section view of an enlarged view of the electrode structure in FIG. 12D.

FIG. 12E provides a cross-sectional view of the electrode structure in FIG. 12D. The electrodes 2310 are shown buried in quartz. Machined quartz thru-holes to circuit board 2360 allow a low inductance connection to the special charge amplifiers. One of two quartz plates 2330 indicates that the electrodes are sandwiched between two pieces of quartz. Shown also is the large reference electrode 2350 which is made integral to the system. The surface mount and chip-on-board circuit 2320 illustrates that chip-on-board methods are used where practical to reduce volume and shorten conductor line lengths. Flourinert™ may be used to provide the cooling of the fluid cooled electronics 2340, thereby stabilizing thermal drift and improving measurement resolution.

Figure 12F:
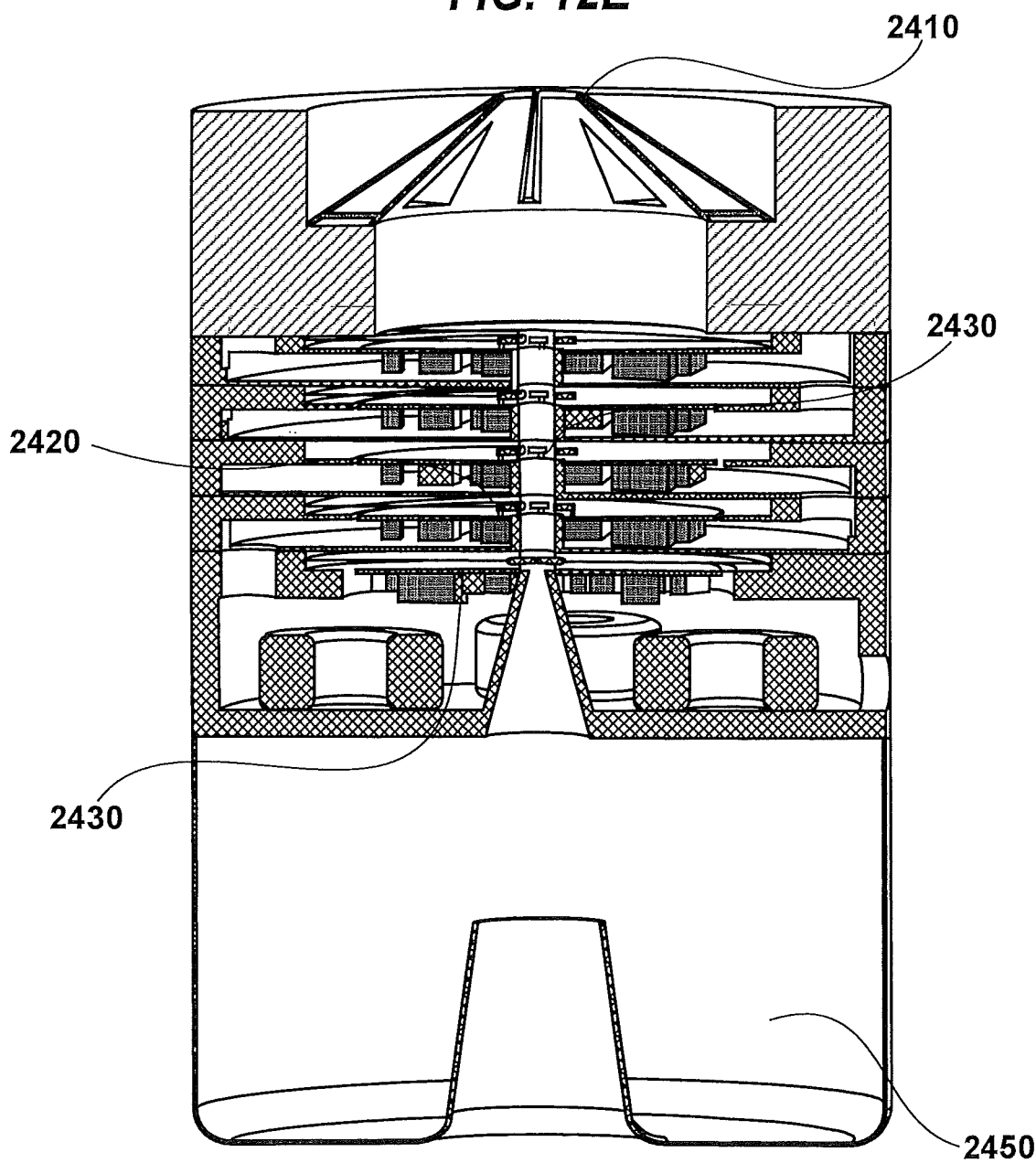
FIG. 12F depicts a cross-section view of an extraction electrode for a droplet emitter according to an embodiment.

FIG. 12F depicts an extraction electrode for a droplet emitter according to an embodiment. The Q, M, V, trajectory sensor, scan, and off-specification droplet bin (input version) are shown. The assembly is substantially identical to the unit described in FIG. 12A. One difference is the extraction electrode 2410 which is positioned close to the output and is part of the droplet generator. The impressed voltage between the extraction electrode 2410 and the liquid melt jet described above charges the droplets and provides the electric field to generate the Taylor cone. A 4-channel Q, M, V trajectory sensor 2420 functions the same as in FIG. 12A as do the scan electrodes and controls 2430, except this scan is not intended to position the droplet for deposition; rather, it straightens out the droplet trajectory or dumps the droplet in the Off Specification Droplet Bin 2440 if it cannot be saved. The Output Port to Super-Heater 2450 conducts the droplets to be heated as described below.

Figure 13A:
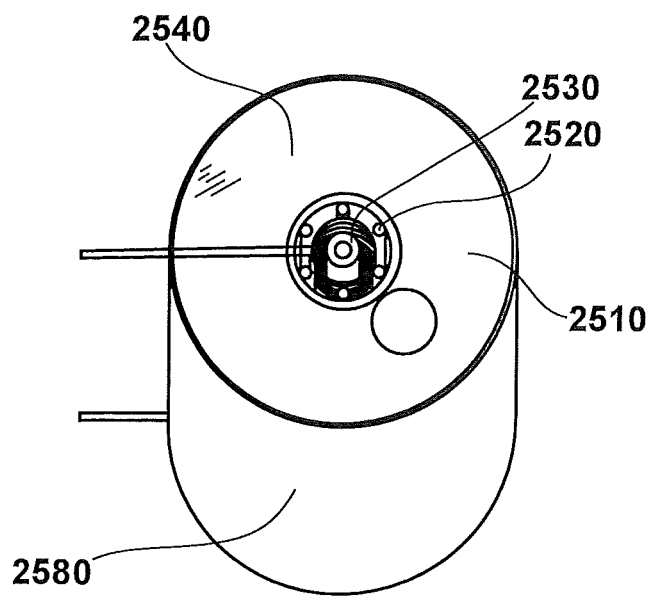
FIGS. 13A and 13B illustrate perspective and cross-section views, respectively, of a droplet super-heater according to an embodiment.
Figure 13B:
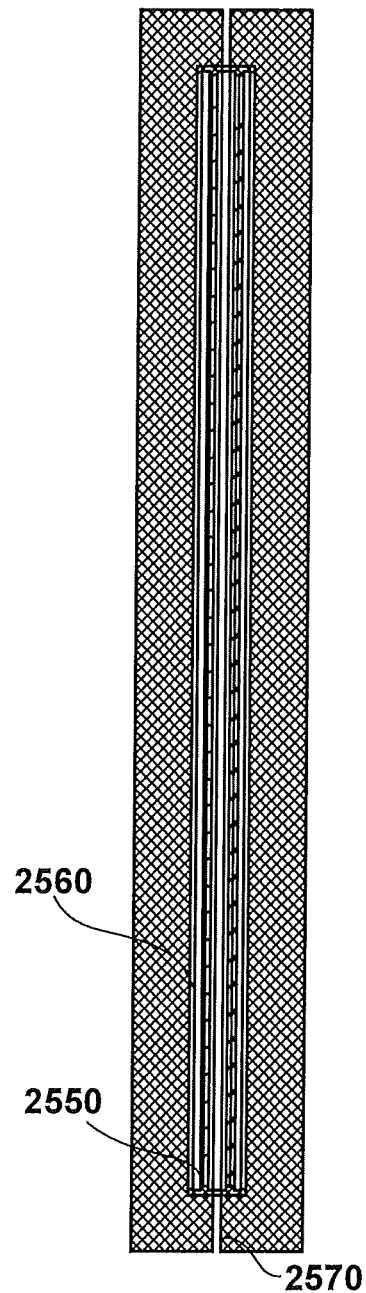

FIG. 13 illustrates a droplet super-heater according to an embodiment. Radiant heating from a carbon tube 2530, for example, is used to transfer heat to the droplets as they pass through the carbon tube 2530. The tube is advantageously maintained at the same surface potential as the droplet so as to avoid changing the charge on the droplet, because both the droplet and the carbon tube are strongly electron emissive at this temperature.

The carbon tube 2530 may be heated by electrons emitted from a filament cathode 2510 and accelerated to a potential to provide enough heat to keep the carbon tube 2530 at a sufficiently high temperature, for example, in the range of approximately 2800 degrees Celsius. Surrounding the filament cathode 2510 is a refractory metal tube 2560 that is biased to repel electrons, enabling them to efficiently deposit energy on the carbon tube anode 2530. The refractory metal tube 2560 also registers the refractory metal end caps 2550 that, in turn, define the position for 6 ceramic rod cathode supports 2520. Surrounding the refractory metal tube 2560 is fiber insulation 2540 to reduce energy needs. The exterior of the fiber insulation 2540 completes the design with fluid cooled exterior 2540 or metal tube mounted in the cooling fluid stream to reduce temperature build up.

The inventors have observed that a carbon tube anode 2530 having a length in the range of 100 mm to 300 mm, and preferably about 200 mm, is sufficient to heat 20 micron liquid metal droplets to a temperature in the range of 2650 degrees Celsius with a droplet speed in the range of 20 m/sec.

Direct deposition has specific advantages that can depend on the specific workpiece geometries being fabricated. One difference includes when the part is made of consolidated droplets, not from particles as is standard in additive manufacturing today, there are no particles to clean out of cavities. This feature alone enables closed structures and finer structures that are possible with particle bed melting.

The method of impact at the surface is very different in that instead of presently known methods of melting highly variable mass and geometry elements at each layer, the methods of direct deposition additive manufacturing described herein deposit with very small and precisely controlled elements that cool at high rates, thereby enabling deposition of amorphous and/or controlled nano-crystalline phase material, which can be annealed during or after the deposition process to a desired uniform or controlled non-uniform material phase.

Figure 14A:
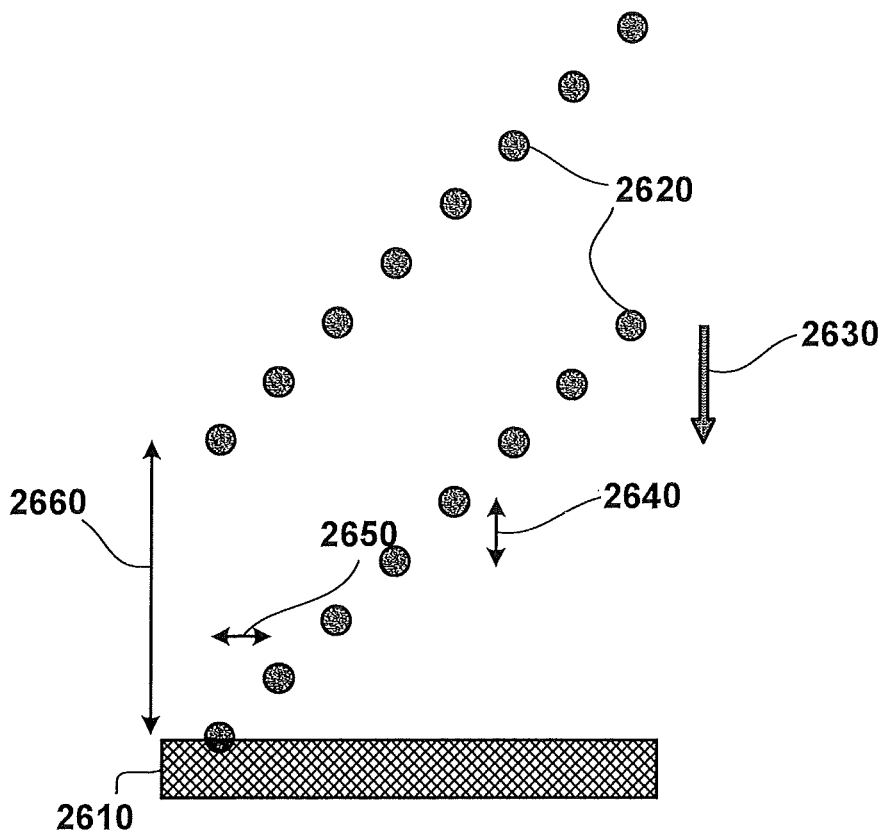
FIG. 14A illustrates direct deposition via droplet scanning according to an embodiment.

FIG. 14A illustrates direct deposition via droplet scanning according to an embodiment. The deposition of two strings or series of super-heated droplets 2620 is shown that are scanned to specific locations on the workpiece during fabrication. The droplet impact processes are determined by throw velocity 2630 and the temperature of the Super-heated droplets 2620, droplet spacing between coincident deposition 2660, droplet deposition spacing 2650 and the temperature controlled substrate 2610, all of which may be computer controlled analogous to the way G-Code plans the operation of a CNC machine tool. Those skilled in the art will appreciate that the computer code should contemplate controlled management of the temperature of the growing surface which, in turn, influences the material phase of the growing workpiece during manufacture.

Figure 14B:
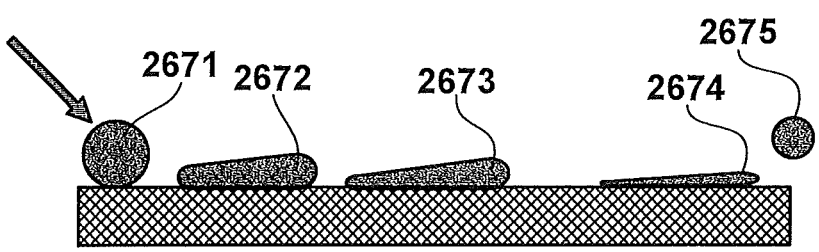
FIG. 14B illustrates droplet impact via direct deposition according to an embodiment.
Figure 14B:
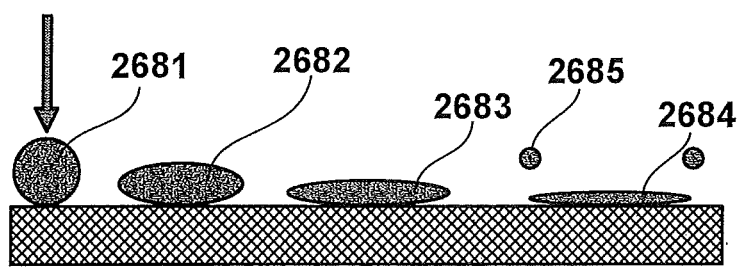

FIG. 14B illustrates droplet impact via direct deposition according to an embodiment. If the droplet arrives at the workpiece surface at an angle as shown, then upon impact the droplet tends to bulge to one side as shown in 2671 through 2674. Depending on factors including droplet material composition, impact energy (velocity), droplet size, and impact angle, one or more smaller droplet 2675 may be re-emitted from the surface following initial impact.

Also shown in FIG. 14B, if a droplet or impacts at normal incidence, then with sufficient impact energy and droplet size as shown 2681 to 2684, then upon impact the droplet may re-emit smaller droplets from the edges of the impact feature side(s) as shown at 2685.

Re-emission of droplets can be reduced or eliminated by controlling droplet size, impact energy and impact angle. It can also be mitigated by bathing the area in an electron beam of sufficient current density to charge during the bounce and biasing the substrate positive to attract the splatter particle back to the workpiece surface, albeit perhaps, not precisely at the prescribed deposition position and with less control of the impact. By far, the preferred solution is to limit droplet size and angle to obtain controlled impact and avoid the re-emission ("bounce") of smaller droplets. Impact control is discussed in greater detail below.

Figure 14C:
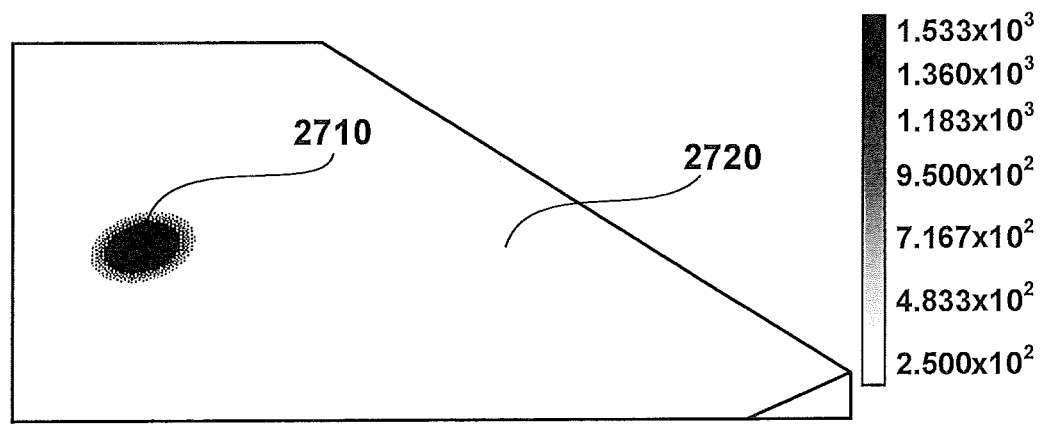
FIG. 14C shows simulation results illustrating the direct deposition of amorphous material.
Figure 14C:
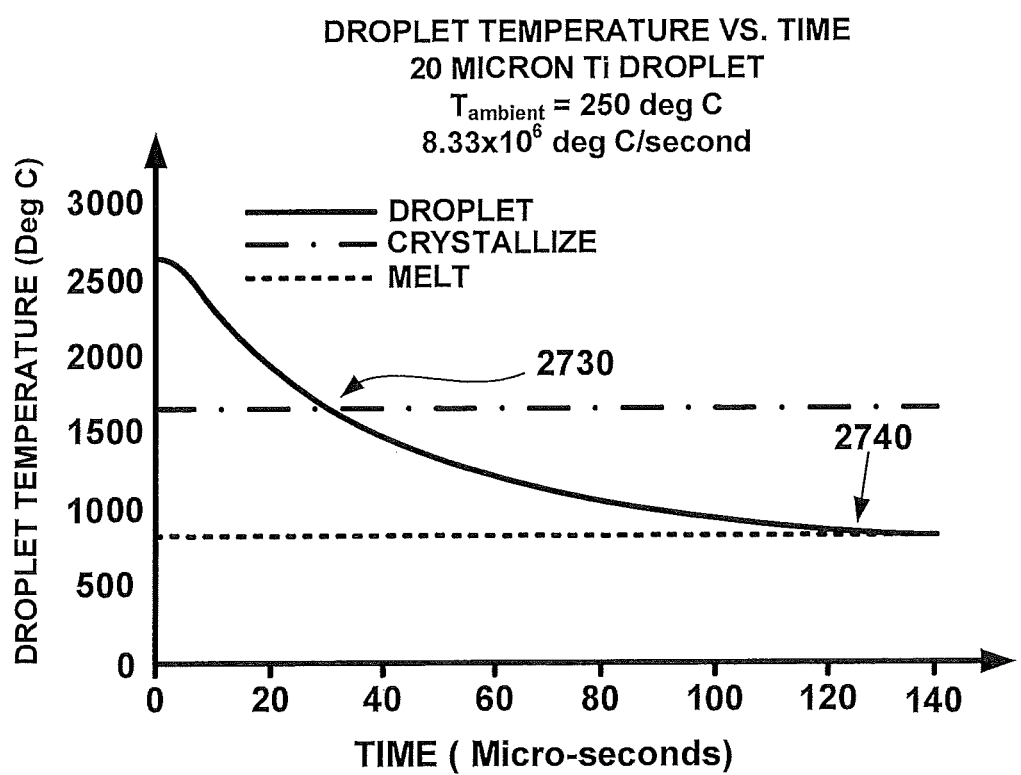

FIG. 14C illustrates simulation results for the direct deposition of amorphous material. A flattened sphere results upon impact on substrate 2710 that is in intimate contact with a temperature controlled substrate 2720. The color bar to the right indicates the temperature is early in the cooling cycle.

The results are described in the graph "Droplet Temperature versus Time", and suggests that the droplet solidifies 2730 in about 30 micro-seconds, and cools below 850 degrees C., where crystallization has become slow enough to ignore for these time scales, at the point marked Droplet Below Crystallization 2740, or about 128 microseconds. The computed cooling rate is approximately $8 \times 10^6$ degrees per second. Although this was modeled for Titanium, a material inherently difficult to grow in the amorphous state, the results generally correlate to other materials such as Fe—Si—B.

There is certain interest and value in the ability to deposit almost any shape of amorphous magnetic material. Motors, particularly those for transportation (e.g., vehicles), are an increasingly important commodity. The Additive Manufacturing of amorphous metals confirms that motors can be cooled more efficiently and lose up to 30% or more in mass and size while improving efficiency by approximately 4% over presently known manufacturing techniques.

Sensors are now generally limited to thin film techniques. Several 3-dimensional configurations can have significant commercial value.

Figure 14D:
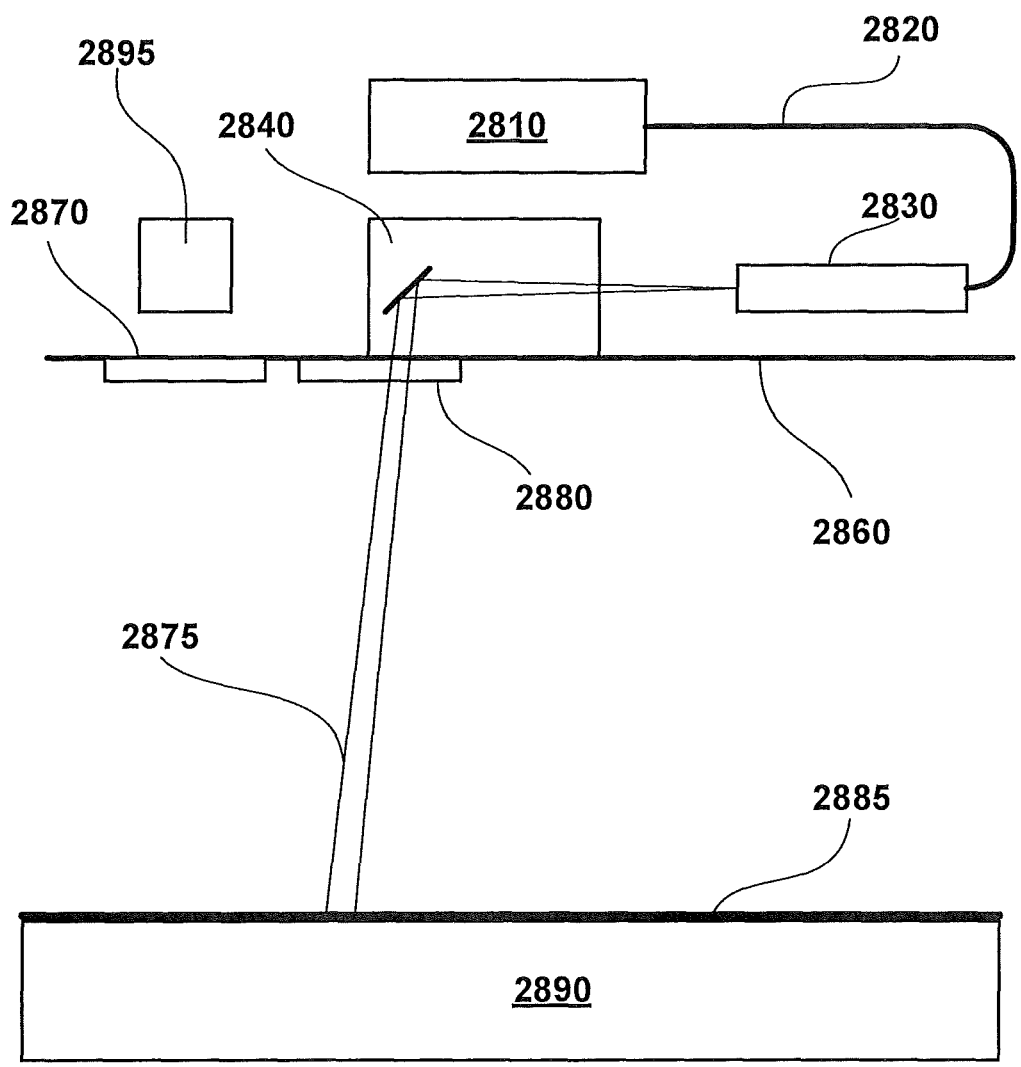
FIG. 14D illustrates a schematic block diagram of a method and apparatus for annealing directly deposited materials according to an embodiment.

FIG. 14D illustrates a method and apparatus for annealing directly deposited materials according to an embodiment. During direct deposition, annealing can be performed to create nano-crystalline materials. Rapid thermal processing can be implemented, wherein an intense heat source is applied for a short amount of time in an effort to affect only a thin layer of the surface. By incorporating the annealing system with the deposition systems described herein, layers can be generated and graded with different phases of material.

As shown in FIG. 14D, a vacuum chamber may be used to grow a part or workpiece 2890. Light from a pulsed fiber laser 2810 is transported to the beam expander 2830 by a fiber optic cable 2820 and then to an F-Theta lens assembly 2840, such as may be available from Thorlabs at http://www.thorlabs.com/NewGroupPage9.cfm?objectgroup_id=6430 or Shanghai-Optics at http://www.shanghai-optics.com/products/f-theta-lenses/. The F-Theta assembly 2840 may be configured to focus the light on programmed areas of the workpiece, and to scan under computer control. The pulsed light is able to produce a programmed intensity pulse that is sufficiently powerful to raise heated layer 2885 to grow nano-crystalline material, grow other crystal phases, melt, or to provide an impulse to otherwise ablate the surface to peen the area. The scanned pulsed beam 2875 enters the chamber through a wavelength filtered chamber wall window 2880 that provides the vacuum-air interface and prevents damage from deposition on the main window by employing sacrificial surfaces that can be cleaned or replaced as needed.

A second intrusion through the chamber wall 2860 is another chamber wall window 2870 that is optically filtered, includes sacrificial surfaces, and enables view for the two color thermal chamber 2895 for the growing part or workpiece 2890. This high resolution, high framing rate camera is able to 1) measure temperature during deposition and annealing operation to provide feedback, and 2) monitor the part during deposition to facilitate temperature control. Optical recognition software can integrate the data from this camera to deduce shape and temperature and compare with programmed instructions as part of process certification.

Figure 14E:
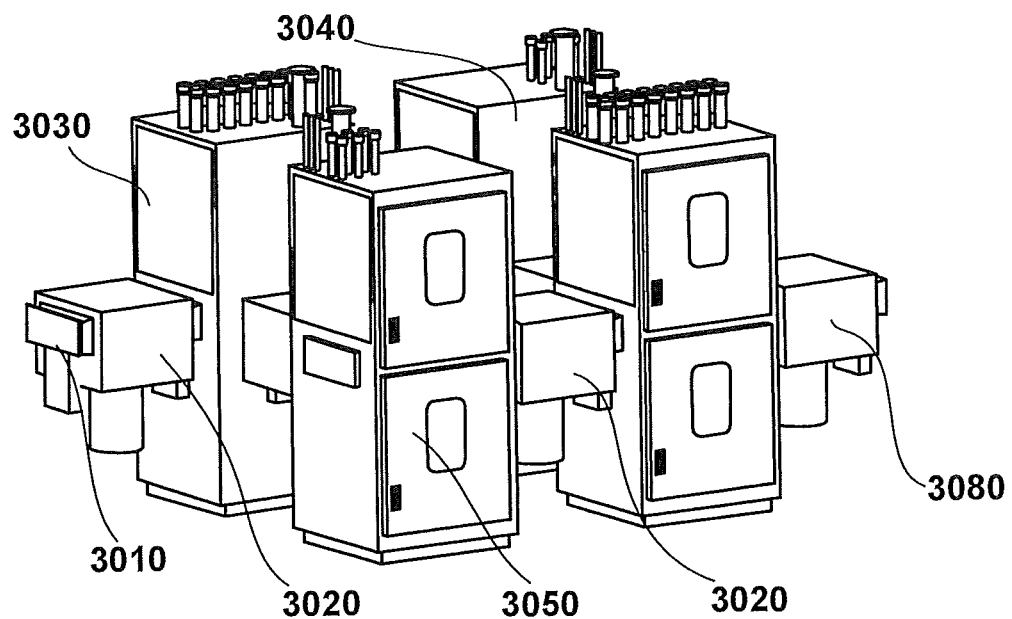
FIG. 14E is a perspective view of multiple chambers combined to produce a specific multilayer workpiece according to an embodiment.

FIG. 14E shows multiple chambers combined to produce a multilayer workpiece according to an embodiment. This part or workpiece may be comprised of Direct Deposition Additive Manufactured parts coated with a glass or ceramic in a PECVD (plasma-enhanced CVD) process. Each part may include multiple layers, e.g., approximately 50. A cassette cart (not shown) can transport the substrate to the input slot valve 3010 and take finished product from the output transfer storage section. The multiple droplet emitter chamber 3030 is one of two on opposite corners of the composite system. Between each chamber and on input and output are transfer stage chambers 3020 (e.g., 6) located between each chamber, and at input and output, that store substrates, keep them under vacuum, control temperature, and/or shuffle them to the next process when the chamber is available.

Figure 14F:
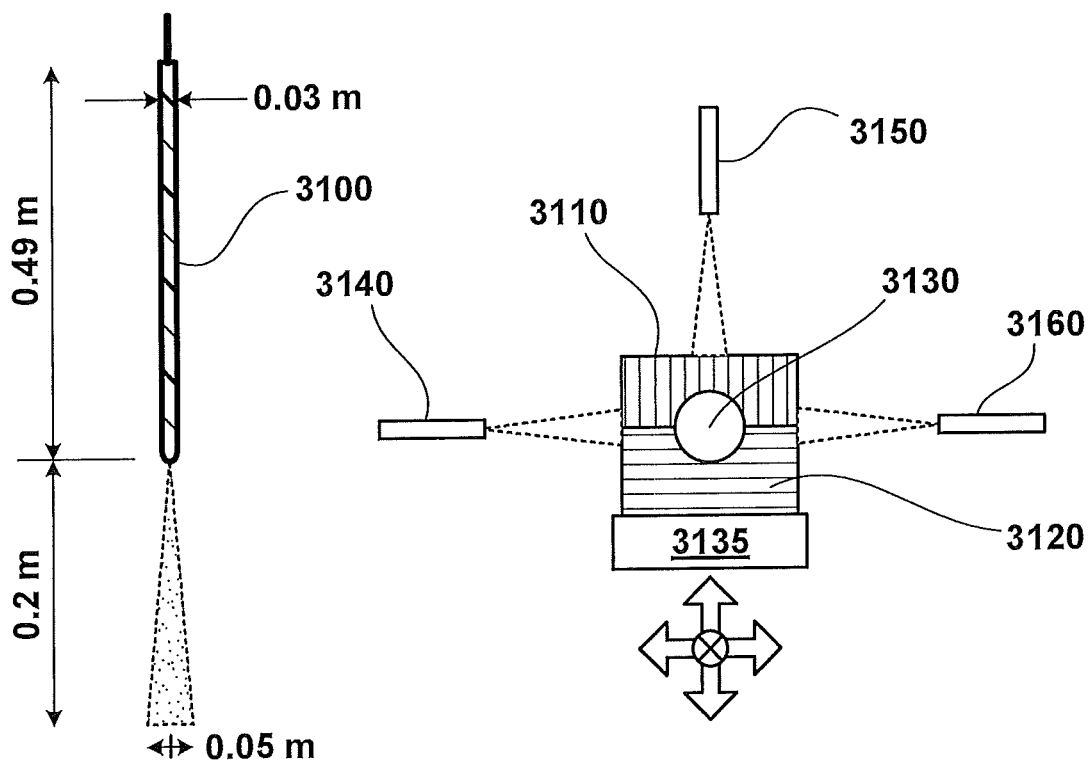
FIG. 14F is a schematic block diagram of a droplet emitter according to an embodiment.

FIG. 14F shows a droplet emitter according to an embodiment. The dimensions of the droplet emitter (in meters) 3100 are provided to roughly scale the other elements of the system. Cavities are defined as buried volumes intentionally left empty as an element of part being manufactured, as opposed to cavities and voids (which represent vacant volumes that occur in error). The issues of depositing material as a liquid droplet described in FIG. 14B makes the deposition of material on any significant angle from normal to the beam inherently problematic.

FIG. 14F also shows a substrate 3135 that can be translated in three directions. On that substrate 3135 has been grown a first portion 3120 of a workpiece that contains a first portion of a cavity 3130. A second portion 3110 (shown in vertical lines in FIG. 14F for contrast) completes the cavity and the rest of the part. Three separate droplet emitters 3140, 3150 and 3160, as shown, can complete the cavity and the part, as described more fully in connection with FIG. 14G.

Figure 14G:
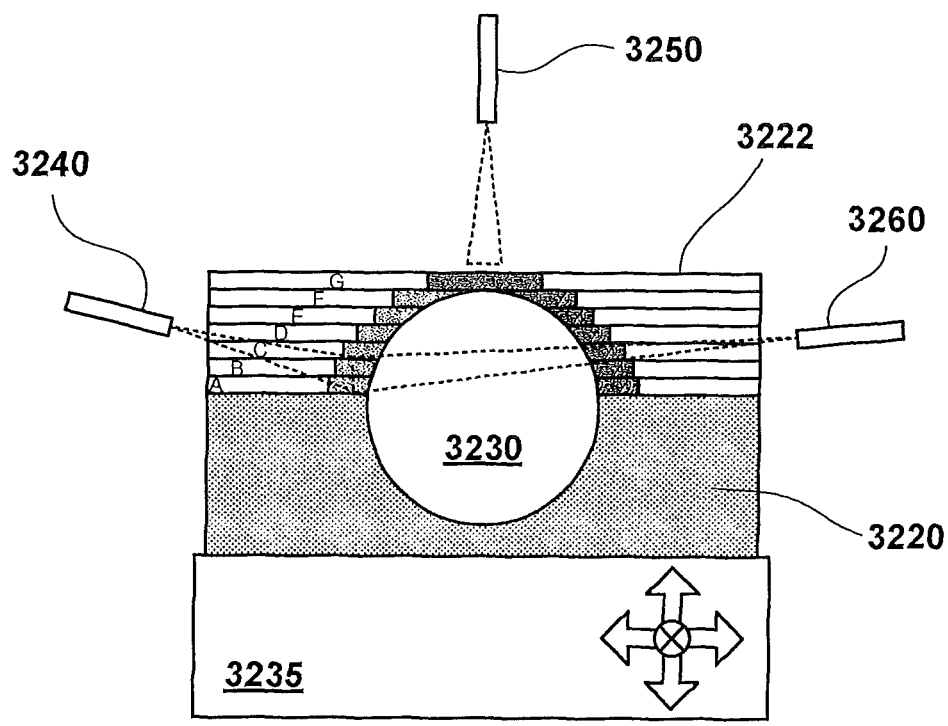
FIG. 14G is a schematic cross-section close-up view of cavity formation in a workpiece using direct deposition according to an embodiment.

More particularly, FIG. 14G shows a close-up view of cavity formation in a workpiece using direct deposition according to an embodiment. FIG. 14G depicts a previously built part 3220, a cavity 3230, and a part to be built 3222 comprised of layers A-G. The areas immediately surrounding the cavity are delineated by stippling to indicate which regions are deposited by respective droplet emitters 3240, 3250, and 3260, as described below. The process may involve some version of the following steps: (a) Vertically build the stippled portions of layer labeled A with droplet emitter 3250 on both sides of the cavity 3230; (b) Fill in from the right end of the layer labeled A with droplet emitter 3260; (c) Fill in layer A at the opposite (left) side of the cavity 3230 with droplet emitter 3240; and (d) Continue building thin layers with the vertical droplet emitter 3250, and then fill in left and right edges with the side droplet emitters 3240 and 3260 until a small volume at the top is left that may be filled by iterating between the emitters 3240 and 3260. It may be advisable to raise the droplet emitters 3240 and 3260 or lower the part as it grows. Once the small gap at the top of the cavity is closed using emitters 3240 and 3260, the final layer G may be filled in using all three emitters, as appropriate.

Figure 14H:
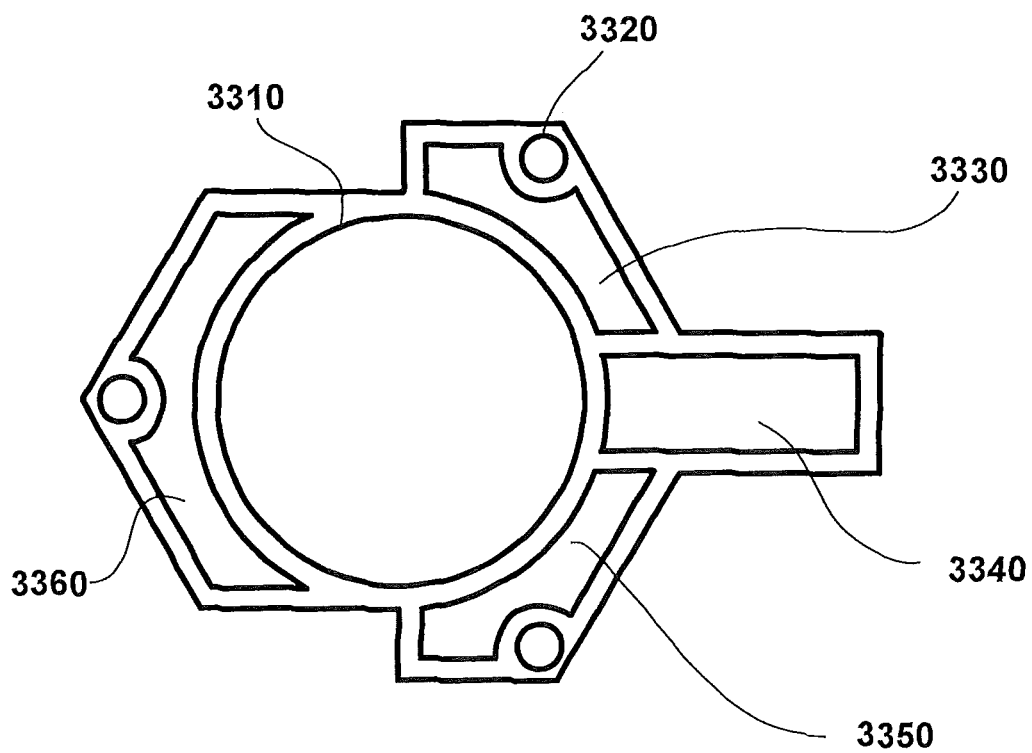
FIG. 14H provides a cross section view of a droplet emitter housing according to an embodiment.

FIG. 14H provides a cross section of a droplet emitter housing according to an embodiment. This housing may be odd shaped to provide hexagonal close packed spacing and accommodate a few elements that protrude past the basic hexagon shape. One element which may require deviation from a simple shape is the cooling fluid Inlet and cables 3340. The other regions are vacuum duct(s) 3330 and 3350, emitter assembly bolts (one of three being labeled) 3320, and fluid return 3360. Seal plates with sealing surfaces are compressed between sections by rods that run the length of the droplet emitter assembly. Cooling channels are integral to each section and the flow for each is determined by apertures that limit the flow in each section. The area cooling fluid input and cable conduit 3340 contains the cables from the power distribution to each section. Similarly, the fluid return conduit 3360 contains the fiber optic cables between each section and the data handling board in the power distribution, described previously.

In a cluster arrangement, the individual droplet emitter assembly can be manufactured in quantity and operated without requiring service for many days. The cluster concept enables backup against failure of any one droplet emitter assembly, as described below.

Scan errors tend to be amplified as the scan angle increases, and as the working distance between the emitter and workpiece is increased. These factors necessarily limit the field of deposition for any specified resolution. Accordingly, it is advisable that each droplet emitter assembly be as tightly packed as practicable so that they can backup each other and still achieve high resolution, where resolution in this context involves the precision of droplet placement.

Figure 15A:
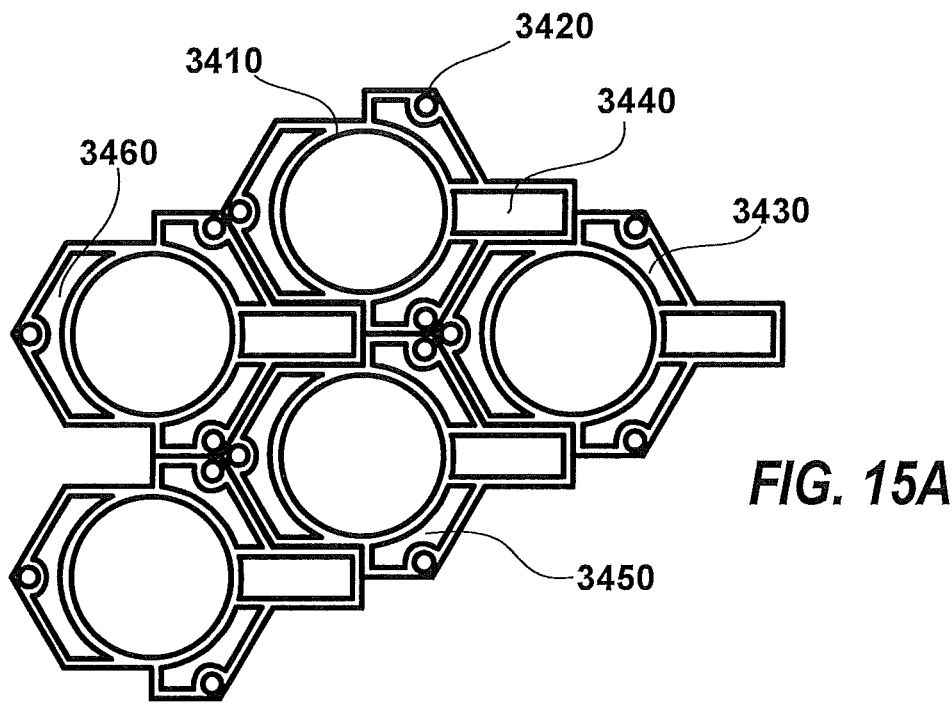
FIG. 15A illustrates a schematic view of an array of droplet emitters in a mosaic pattern according to an embodiment.

FIG. 15A illustrates an array of droplet emitters 3410 in a mosaic according to an embodiment. Utilities may be spread out on the chamber wall at the cable header assembly, as described previously. Assembly voids 3430, 3440, 3450, 3460 provide conduits for fluid input(s) and fluid return(s), and electrical power; data lines can be combined in a simple header that replaces the power distribution section and combines many droplet emitter assemblies 2050 into a cluster.

Figure 15B:
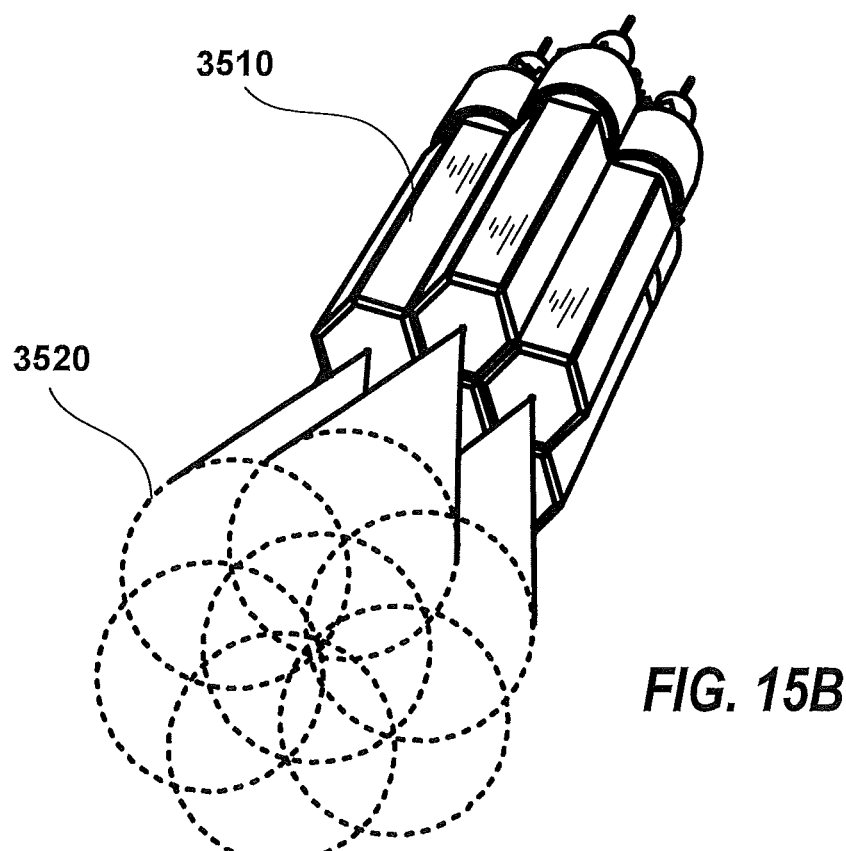
FIG. 15B shows a schematic perspective view of a cluster of droplet emitters and the field of coverage according to an embodiment.

FIG. 15B shows a cluster of droplet emitters and an exemplary combined field of coverage according to an embodiment. A cluster of droplet emitters 3510 can produce a field of coverage 3520 including overlapping coverage sub-regions, each attributable to a respective individual emitter. As seen, one emitter can be backed up by a combination of surrounding emitters to yield an effectively fail-safe assembly.

A number of other advantages are presented when combining multiple emitters into clusters. By way of non-limiting example: (a) Individual emitters can be combined on a spherical surface to focus on a common area thus increasing intensity and ability to back up each other at the loss of range of deposition (e.g., sharp deposition angles); (b) A cluster can be made of multiple materials to provide not just layered structure but continuous elements of one material interleaved with one or more other materials; (c) Thermal cameras and annealing integrated into the cluster; (d) Both large and small droplet emitters integrated within a single cluster. The large droplet emitter may be configured to fabricate relatively large and/or simple shapes, whereas the small droplet emitter may be configured to provide fabricate fine surface finishes and more detailed structures, for example at the edges of the workpiece; (e) Clusters of emitters may be configured to deposit stripes of different materials, or to generate a complex part in a single pass; (f) Clusters that emit droplets of specific sizes of different alloys simultaneously and at the same position for real time in situ alloying, or otherwise depositing complex material properties; (g) The cluster can be on a robotic arm and move in camber to generate specific or general parts; (h) The clusters can be arranged around a port through which a substrate is moved and the features (e.g., a variable extrusion) can be iteratively evolved, perhaps with complex embedded cavities.

Pre-deposition droplet coulombic fission is the process of adding charge to the droplet until the force from the charge disrupts the droplet. In the context of the present invention, this may involve directing larger droplets to the growing workpiece surface and bursting or exploding them (e.g., electrostatically) just above the workpiece surface. Calculations show that for every doubling of the droplet diameter, the droplet mass throughput increase on the order of 4 times.

The present inventors have determined that by charging a droplet with a beam or by self-charging, a large droplet can explode immediately prior to impact with the surface. Self-charging is the process where: (1) A heated electron emissive droplet gets close to a workpiece surface maintained at a voltaic potential relative to the surface potential of the droplet; (2) The charged droplet polarizes due to the increasing field as the droplet approaches the workpiece surface; (3) The charged droplet is either accelerated or decelerated by the field generated by the surface; (4) If the field is sufficient, the droplet with charge or discharge; (5) If the charge rate is high enough, the droplet will explode from the electric field pressure on the droplet; (6) The resulting daughter droplets produced as a result of the explosion arrive at the workpiece surface smaller in size than the original droplet, and impact like the workpiece with little or no splatter; and (7) The impact deposition area of the cluster of daughter droplets is determined by the distance from the surface where the explosion occurs and the energy of the explosion.

Figure 16A:
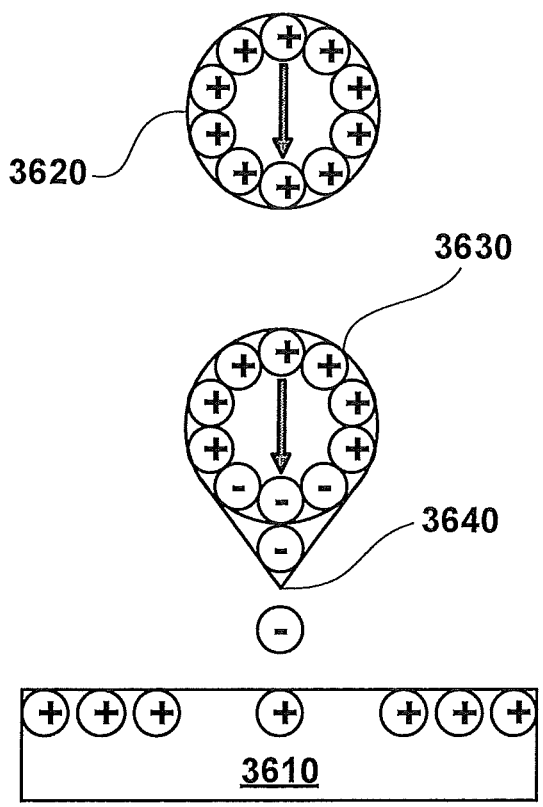
FIG. 16A provides a schematic illustration of Coulombic fission of a positively-charged droplet interacting with a positively-charged workpiece according to an embodiment.
Figure 16B:
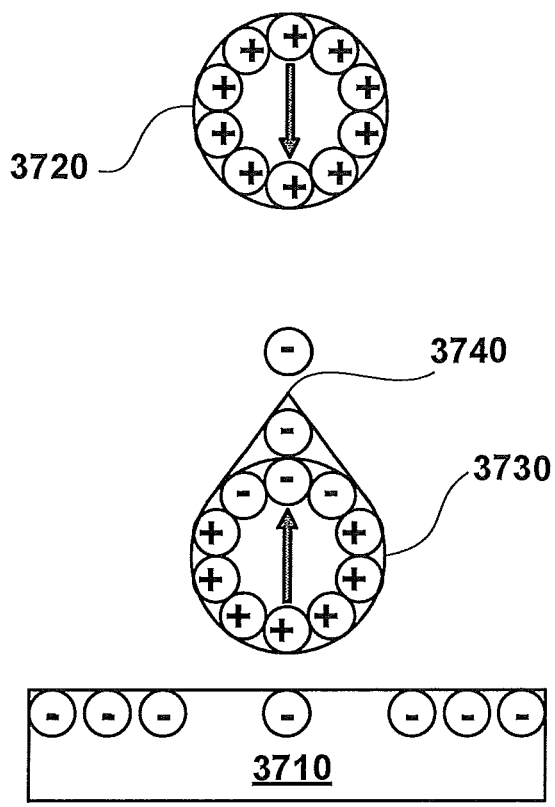
FIG. 16B provides a schematic illustration of Coulombic fission of a positively-charged droplet interacting with a negatively-charged workpiece according to another embodiment.
Figure 16C:
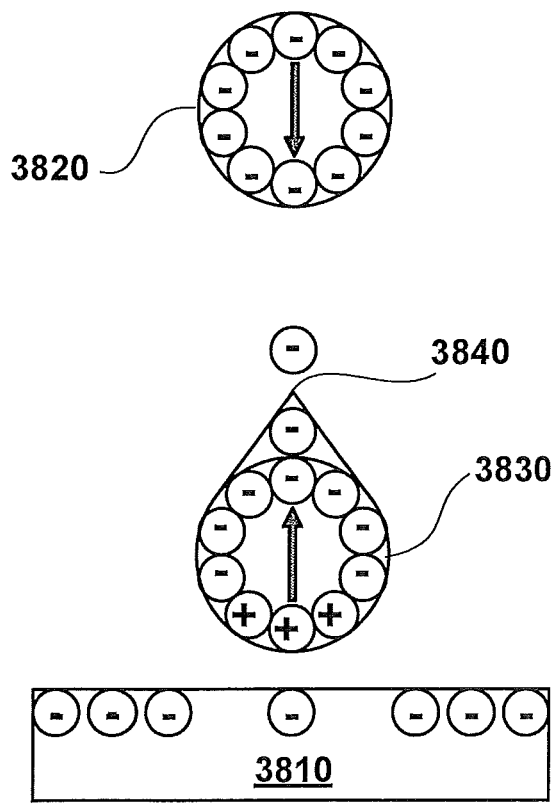
FIG. 16C provides a schematic illustration of Coulombic fission of a negatively-charged droplet interacting with a negatively-charged workpiece according to another embodiment.
Figure 16D:
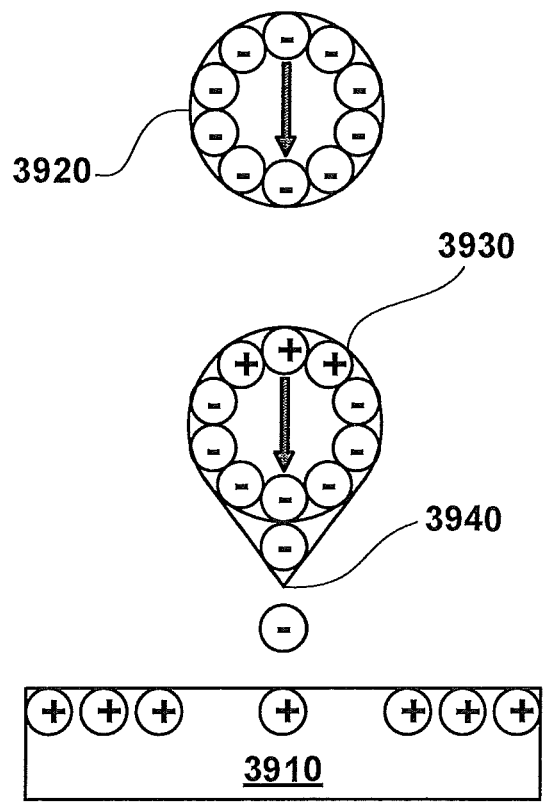
FIG. 16D provides a schematic illustration of Coulombic fission of a negatively-charged droplet interacting with a positively-charged workpiece according to another embodiment.

Prior art experiments are believed to have used an electron beam to charge explode levitated glass shells in a vacuum as a method to determine shell strength. In the context of the present invention, it is advisable to deliver the charge to the droplets in a short period of time relative to the instability frequency associated with the liquid droplet. Others have exploded charged droplets emitted from one or 2 opposed Taylor cone(s). A faster application of charge tends to promote particle disruption. Four exemplary cases A-D include: (A) Coulombic Fission-Positive Droplet-Positive Substrate case, as shown in FIG. 16A. The process occurs as follows: (1) The Positive Charged Droplet 3620 approaches a positively charge substrate 3610; (2) As shown, the destabilized droplet 3630 polarizes and the field between the substrate and the droplet causes the positive charges in the droplet to migrate away from the substrate and the droplet forms a Taylor cone and electron emission 3640 occurs. The substrate surface charge decreases locally as a result; and (3) The droplet overcharges above the Raleigh limit and disrupts; (B) Coulombic Fission-Positive Droplet-Negative Substrate case as shown in FIG. 16B. The process occurs as follows: (1) The Positive Charged Droplet 3720 approaches a negatively charged Substrate 3710; (2) As shown, the destabilized droplet 3730 polarizes and the field between the substrate and the droplet causes the positive charges in the droplet to migrate toward the substrate, and the droplet forms a Taylor cone and electron emission 3740 occurs. In this case the emission is located away from the substrate. The substrate surface charge density increases locally to decrease the field on the droplet; and (3) The droplet overcharges above the Raleigh limit and disrupts; (C) Coulombic Fission-Negative Droplet-Negative Substrate case as shown in FIG. 16C. The process occurs as follows: (1) The Negative Charged Droplet 3820 approaches a negative charged Substrate 3810; (2) As shown The Destabilized Droplet 3830 polarizes and the field between the substrate and the droplet causes the positive charges in the droplet to move toward the substrate, and the droplet forms a Taylor cone and Electron Emission 3840 occurs. The substrate surface charge decreases locally; and (3) The droplet overcharges above the Raleigh limit and disrupts; and (D) Coulombic Fission-Negative Droplet-Positive Substrate case as shown in FIG. 16D. The process occurs as follows: (1) The negatively charged droplet 3920 approaches a positively charged Substrate 3910; (2) As shown, the destabilized droplet 3930 polarizes and the field between the substrate and the droplet causes the negative charges in the droplet to migrate toward the substrate, and the droplet forms a Taylor cone and Electron Emission 3940 occurs. In this case the emission is located on the side toward the substrate. The substrate surface charge density increases locally, resulting in an increased field on the droplet; and (3) The droplet overcharges above the Raleigh limit and disrupts.

Figure 16E:
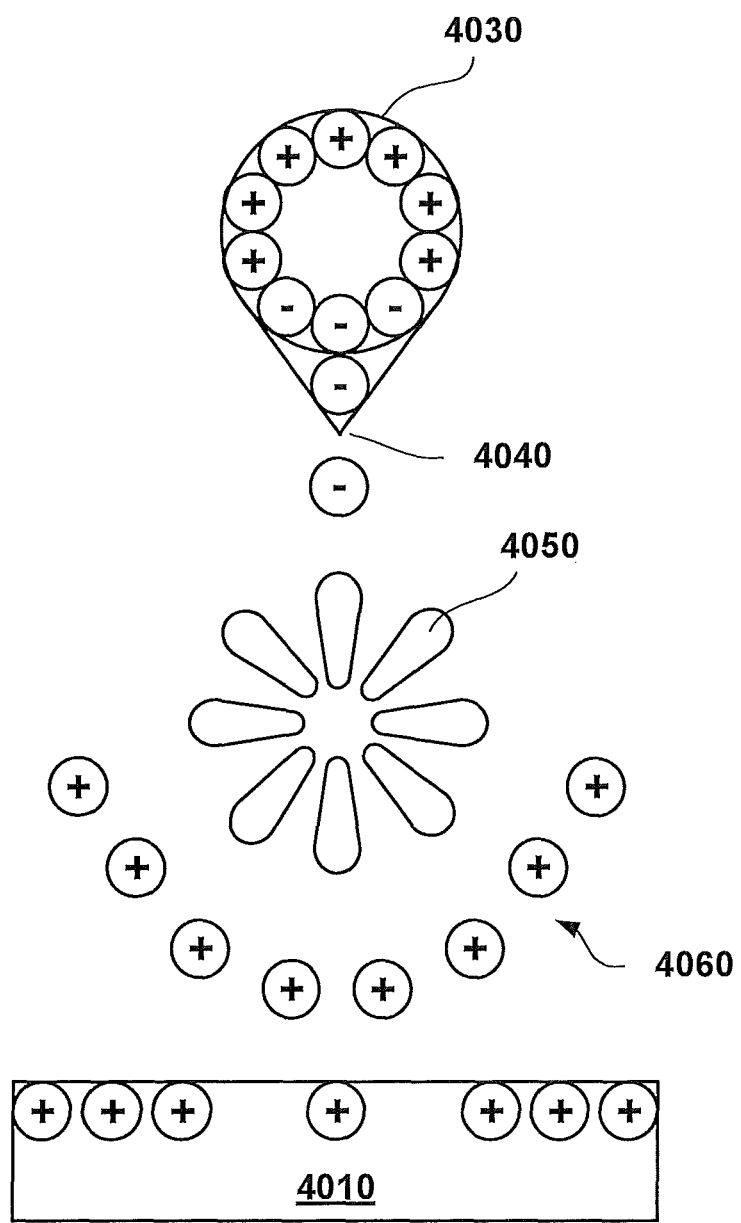
FIG. 16E provides a schematic illustration of droplet disruption during Coulombic fission according to yet another embodiment.

FIG. 16E shows a destabilized (net positive) droplet 4030 that is in the stage of electron emission 4040. The destabilized droplet 4030 is anticipated to be very hot (approximately 1000 degrees above the melt temperature) and thus can emit multiple electrons. The onset and magnitude of emission is controlled by the voltage potential maintained at substrate 4010. Consider the event where the substrate 4010 is pulsed positive 10 s of KV just as the droplet is at the proper range for the disruption event to occur. This voltage pulse can be as short as a few nanoseconds, yet may still be sufficient to significantly change the charge on the droplet. If droplet emitters are configured to be synchronized the arrival of multiple droplets at the zone for disruption, then a single voltage pulse on the substrate may explode as many droplets as there are emitters. This droplet 4050 separates, exploding symmetrically as reasonably expected if the event is rapid. The droplet fragments 4060 then continue to the substrate where they add to the growing workpiece surface. This method allows a workpiece surface to be grown using droplets on the order of ~20 microns in diameter, using a starting (pre-exploded) droplet in the range of approximately 100-150 microns in diameter. This enables a single emitter to increase material delivery by 100-300 times and achieve delivery of as much as 5 kg/hr from a single droplet emitter. This improves throughput to enable the manufacture of large industrial parts, such as automotive and aerospace structures.

In other embodiments, multiple droplet emitters in a cluster may be used to: increase deposition rate; deposit multiple materials and the enable ability to make a structure of one material inside a second material or, more generally, multiple materials nested or otherwise integrated into other materials; utilize both large and small droplets in the same workpiece.

In other embodiments, droplet fission methods may enable high deposition rates through: emission charging-pulsed substrate; laser heating; and electron beam charging.

In other embodiments, the techniques described herein may be employed to supercharge high levels of droplet fission and generating high rate semiconductor deposition processes with rates applicable to fine machine parts.

In other embodiments, the techniques described herein may be employed to make amorphous metals with Droplet Direct Deposition Additive Manufacturing (D3AM), in which the droplet size may be varied to yield: net shaped Hard magnet materials; net shaped Soft magnetic material; Motor-rotors and stators; Transformer Cores; Sensors; Pole pieces for particle accelerators; and Magnetostrictive materials suitably annealed to an optimum phase.

In other embodiments, the techniques described herein may be employed for the in situ annealing of a second material phase to the growing structure of a first material phase. This may be continued with more phases and more structures.

In other embodiments, droplets may be superheated to supply sufficient energy to enable solid density materials.

In other embodiments, the techniques described herein may be employed to make cavities with Droplet Direct Deposition Additive Manufacturing [D3AM].

In the context of Crucible droplet generation, the present invention contemplates: mini crucible designs with cooling to enable a brazed joint; magnetic melt volume vibration; diode heating with quartz barrier to metal vapor; a pointed tip configuration to minimize dribble; crucible designs to measure liquid levels; Microwave heaters; Electron Beam heaters; and Extraction electrode designs configured to operate in high inductive fields and high radiant thermal loads.

In the context of Cone droplet generation, the present invention contemplates: Multi-izone Microwave heating; Diameter sense heat power control; Segmented microwave cavity with electrode stack; Inductive melt volume vibration; Multi-zone Inductive heating; Electromagnetic hydrodynamic heating and pulsed droplet generation; and Electron beams swept over the cone to melt and the timed (e.g., time structured) emission of droplets.

In the context of Measuring Q, M, V and trajectory to determine scan voltages, the present invention contemplates Generalizing to any charged particle system.

In other embodiments, Trajectory correction mechanisms may be positioned soon after droplet formation to improve droplet yield and reliability.

Other embodiments contemplate the repair of a previously built structure by removing (e.g., cutting out) the damaged section along a suitable growth process, measuring to register the cut location in the growth process, and refabricating (e.g., reprinting) the damaged/removed portion of the workpiece.

In other embodiments, the emitter head and/or cluster may be in the form of a particle generator that can be moved as desired within the tool vacuum wall.

In other embodiments, particles that are small enough to be an explosive or fire hazard can be made safely and delivered to the part to be grown due to the fact that such particles need not be exposed to the outside air and exist for short periods of time and in small quantities.

In other embodiments, the workpiece growing process can be paused and resumed at a later time at the point the process was suspended without compromising workpiece integrity.

In other embodiments, the particle droplet cooling rate may be adjusted to thereby enable growing different phases of materials.

In other embodiments, droplet generation may be from a simple wire source or particle source.

In other embodiments, droplets can emit from multiple angles with respect to the growing surface.

In the context of droplet emitters, the present invention contemplates: Wire straightening using an in situ wire straightener; Wire is pre-heated before melting; Emitter has the capacity to aim each particle to place it precisely in an X,Y coordinate system.

The droplet additive manufacturing methods described herein contemplate depositing droplets in a controlled manner to make a weld between two or more parts, where the parts may be of similar or different materials and the added material may be of similar or different material. Where those parts are of dissimilar materials, the added material (e.g., the weld material) may be a material with properties chosen to mate well with both materials. Where those parts are of dissimilar materials, the added material may be a material that is graded from one material to the second.

Where the droplet has a charge error that is corrected by first sensing in a QVMT detector, the droplet may then be charged by passing through an electron emissive tube at a potential that determines the charge on the droplet by transferring electrons to the droplet.

Where the droplet has a charge error that is corrected by first sensing in a QVMT detector, the droplet may then be charged by passing through a non-electron emissive tube at a potential that determines the charge on the droplet by transferring electrons from the non-electron emissive tube to the droplet.

In an embodiment, the droplet after charge correction may be accelerated or decelerated to be in step with the beam of droplets.

In an embodiment, the droplets may be accelerated to a higher velocity to increase distance between the droplets thus making the physical dimension of electrodes more achievable and then decreased to the velocity required for proper impact with the substrate after the droplets are tuned accurately to the proper charge/mass ratio and trajectory.

In an embodiment, the particles (e.g., droplets) are measured in trajectory after the final scan fields have positioned their trajectory to enhance scan accuracy, where the trajectory may be fed back to correct errors in the scan system.

In an embodiment, the droplets may be detected with an QVMT detector and a set of electrodes for correcting the trajectory to be precisely aligned in the beam line.

In an embodiment, the trajectory adjustment may require two or more corrections to achieve precise alignment.

In an embodiment, the droplet trajectory may have an angular momentum requiring multiple corrections to eliminate.

In an embodiment, the droplet trajectory has a combination of trajectory and charge error and needs to be charged accurately to correct the trajectory and/or charge error.

An apparatus is provided for performing additive manufacturing, comprising: a vacuum chamber for fabricating a work piece composed of deposited material; a table positioned within the vacuum chamber, and configured to support fabrication of the workpiece on a substrate; and multiple droplet emitters coupled to the vacuum chamber, and arranged to irradiate the workpiece with a stream of molten material droplets during fabrication.

In an embodiment, each droplet emitter is configured to simultaneously emit droplets, sequentially emit droplets, or simultaneously and sequentially emit droplets, wherein the workpiece is composed of deposited metal, and at least one of the multiple droplet emitters irradiates the workpiece with a stream of molten metal droplets.

In an embodiment, the apparatus further comprises a metal wire supply system coupled to each droplet emitter, and a metal powder supply system coupled to each droplet emitter.

In an embodiment, the metal wire supply system includes a first metal wire supply system configured to supply a first metal to a first droplet emitter, and a second metal wire supply system configured to supply a second metal to a second droplet emitter, the second metal being different than the first metal. The metal powder supply system includes a first powder wire supply system configured to supply a first metal to a first droplet emitter, and a second powder wire supply system configured to supply a second metal to a second droplet emitter, the second metal being different than the first metal. The multiple droplet emitters include a first cluster of droplet emitters for generating droplets of a first size, and a second cluster of droplet emitters for generating droplets of a second size, the second size being different than the first size.

In an embodiment, the multiple droplet emitters or a cluster include some droplet emitters for generating droplets of a first size, and a some droplet emitters for generating droplets of a second size, the second size being different than the first size. The multiple droplet emitters or cluster includes droplet emitters for generating droplets of a first size, and a second cluster of droplet emitters for generating droplets of a one material, the second material being different than the first material. The multiple droplet emitters or cluster may include droplet emitters for generating droplets of variable size mixed with droplet emitters generating droplets of variable size of a different material. The variety limited only by the number of emitters in a cluster.

The apparatus may also include a scanning system coupled to at least one cluster of droplet emitters in the multiple droplet emitters, and configured to steer one or more droplet streams from the cluster of droplet emitters to one or more programmed locations on the workpiece; and a positioning system coupled to at least one cluster of droplet emitters in the multiple droplet emitters, and configured to position the cluster of droplet emitters at a target angle of attack relative to the workpiece.

In an embodiment, at least two or more of the multiple droplet emitters are arranged in a cluster such that a first scan range for a first droplet emitter substantially overlaps with a second scan range for a second droplet emitter, and at least two of the multiple droplet emitters are arranged with different angles of attack relative to a reference point on the workpiece.

In an embodiment, the workpiece is moved relative to at least one droplet emitter in the multiple droplet emitters, or at least one droplet emitter in the multiple droplet emitters is moved relative to the workpiece.

A method of forming a workpiece is also provided, comprising: positioning a first droplet emitter in a vacuum chamber at a first location and first orientation relative to a workpiece; positioning a second droplet emitter in a vacuum chamber at a second location and second orientation relative to a workpiece; and colliding at least one droplet from the first droplet emitter and at least one droplet from the second droplet emitter at a target location on the workpiece, and forming a cavity in the workpiece. The emitters may be moved (stepwise or continuous) during the forming a cavity in the workpiece to maintain a mostly normal impact angle of the droplet stream.

In an embodiment, the droplet emitter is placed looking directly at the end of the cavity cross-section and outlines the cavity, and the emitter is moved to maintain an end-on view of the growing cavity until the cavity closes upon itself, where the droplet emitter: starts away from the cavity wall and moves toward the cavity wall; starts at the cavity wall and moves away from the cavity wall into the solid part; uses large droplets away from the droplet wall and smaller droplets at the cavity edge to enhance surface finish; and/or deposits droplets at the cavity edge of a size to control surface finish to enhance thermal transport in the eventual application of the part, for example.

An apparatus is also provided for performing additive manufacturing, comprising: a droplet emitter configured to be coupled to a vacuum chamber, and arranged to irradiate a workpiece with a stream of molten metal droplets during fabrication of the workpiece; an extraction electrode positioned downstream of the droplet emitter, and configured to extract emitted molten metal droplets; and a droplet sensor assembly arranged downstream of the extraction electrode, and configured to measure at least one property of the stream of emitted molten metal droplets, wherein the droplet sensor assembly is configured to measure a droplet mass, a droplet charge, a droplet velocity, or a droplet trajectory, or a combination of two or more properties thereof.

The apparatus may further include: one or more scan electrodes to which a voltage is applied to direct the stream of emitted molten metal droplets to target locations on the workpiece; an off-specification droplet bin to which an off-specification droplet can be directed; an off-specification droplet bin is located on the growing part substrate; an off-specification droplet bin is configured as a faraday cup to catch and measure the charge of the off-specification droplets; an off-specification droplet bin is lined with fused quartz, ceramic or anodized so that the material deposited does not stick to the wall thus enabling cleanup and recovery of waste material; a method of measuring the mass associated with each of specification droplet and integrating to determine when the bin need to be emptied; a trajectory sensor position in the beam line past the scan electrodes to provide assurance of precise scanning; an emptying system consisting of an exchange of the faraday cup by robot thru a load lock to outside the growth chamber; a measurement system that measures the change and mass of a droplet and changes the charge to achieve a beam of constant charge to mass ratio particles; a measurement system coupled to the scanning electrodes where particles with trajectories that cannot be maintained in the beam line (hit the wall) or cannot be precisely positioned on target are realigned on the beam line; and/or a measurement system coupled to the scan system where the scan voltage is calculated and imposed differently for each particle, thus enabling high on target efficiency.

An apparatus is also provided for performing additive manufacturing, comprising: a droplet emitter configured to be coupled to a vacuum chamber, and arranged to irradiate a workpiece with a stream of molten metal droplets during fabrication of the workpiece; and an annealing system configured to be coupled to the vacuum chamber, and arranged to anneal a select portion of the workpiece; wherein the droplet emitter and the annealing system are arranged and configured to simultaneously or sequentially build and anneal the workpiece during fabrication of the workpiece.

In various embodiments, the annealing system comprises a laser heating system, and the laser heating system includes a pulsed laser heating system.

In an embodiment, the apparatus includes a control system coupled to the droplet emitter and the annealing system, and configured to operate the droplet emitter and the annealing system to achieve a target material phase at programmed locations within the workpiece; and a two color camera that scans the growing surface to accurately determine growth surface temperature.

A method is provided for performing additive manufacturing, the method comprising: irradiating a substrate upon which a workpiece is to be fabricated with molten metal droplets; simultaneously or sequentially annealing a select portion of the workpiece to achieve a target material phase for the select portion of the workpiece; and varying a degree of crystallinity within the workpiece. The method may employ an annealing system comprising a electron beam heating system, and a two color camera that scans the growing surface to accurately determine growth surface temperature; wherein the data of the two-color camera is stored in memory and a predicted thermal history is continuously computed for each minuscule volume of the growing mass to assure the status of crystal growth in each volume and through a predictive control system manage the heating to attain the desired finished crystal state.

An apparatus for performing additive manufacturing, comprising: a droplet emitter configured to be coupled to a vacuum chamber, and arranged to irradiate a workpiece with a stream of molten metal droplets during fabrication of the workpiece, wherein the droplet emitter comprises a crucible having at least one orifice from which molten metal emanates in the form of droplets, a metal source for supplying metal to the crucible, and a heating system for melting the metal in the crucible; and an electromagnetic induction vibration system coupled to the droplet emitter, and configured to magnetically vibrate the melt and intermittently effectuate ejection molten metal through the at least one orifice in the crucible. The electromagnetic induction vibration system comprises: a first coil arranged surrounding a central axis of the crucible; a second coil arranged adjacent the first coil, and surrounding the central axis of the crucible; and an electrical current source coupled to the first coil and the second coil, and configured to flow electrical current through the first coil in a first direction and flow electrical current through the second coil in a second direction opposing the first direction, wherein the electrical current source includes an alternating current (AC) source configured to coupled a first AC current to the first coil and a second AC current to the second coil, the second AC current being out of phase with the first AC current.

The apparatus may also include: a controller coupled to the electromagnetic induction vibration system, and configured to adjustably control a vibration frequency for vibrating the melt in the crucible; a metal wire feed system coupled to the droplet emitter, and configured to supply metal to the crucible; a sensor coupled to the crucible, and configured to measure a level of molten metal in the crucible; an extraction electrode positioned downstream of the droplet emitter, and configured to extract emitted molten metal droplets from the crucible-type droplet emitter; and a precision wire feeding system coupled to the metal wire feed system, and configured to precisely feed metal wire into the crucible in response to measurement of the level of molten metal using the sensor. The sensor may comprise a capacitance level sensor or an inductive level sensor.

An apparatus for performing additive manufacturing, comprising one or more of: a droplet emitter configured to be coupled to a vacuum chamber, and arranged to irradiate a workpiece with a stream of molten metal droplets during fabrication of the workpiece, wherein the droplet emitter comprises a crucible having at least one orifice from which molten metal emanates in the form of droplets, a metal source for supplying metal to the crucible, and a heating system for melting the metal in the crucible; a capacitance level sensor coupled to the crucible, and configured to measure a level of the molten metal in the crucible; a crucible with a removable orifice the can be replaced with wear; a crucible with a removable orifice made of a different material than the body of the crucible; a crucible with a removable orifice that is brazed onto the crucible body; a braze material that is refractory and noble such as platinum;

a crucible with a removable orifice the can be replaced with wear; a crucible with a removable orifice made of a material that is wetted by the liquid metal; a cooling structure upstream of the crucible to remove heat form the wire so that the ceramic crucible can be brazed to a vacuum plumbing fitting to ease exchange of the crucibles; a cooling structure for the feed wire that is fluid cooled; a cooling structure for the ceramic metal seal that is fluid cooled; a cooling structure for the wire that has a radiation shield to reduce direct radiation from the melt to the cooling structure; a crucible that is pressurized with a inert gas to push liquid metal out the orifice; a crucible made of graphite or pyrolytic graphite using a metal o-ring seal; a crucible made of a ceramic with the best compatibility with the liquid metal; a crucible made of a ceramic that is coated by chemical vapor deposition of plasma assisted chemical deposition to attain the best compatibility with the liquid metal; and/or an orifice made of a ceramic or metal that is coated by chemical vapor deposition of plasma assisted chemical deposition to attain the best compatibility with the liquid metal.

An apparatus for performing additive manufacturing, comprising: a droplet emitter configured to be coupled to a chamber, and arranged to irradiate a workpiece with molten metal droplets during fabrication of the workpiece, wherein the droplet emitter comprises: a metal wire feed system coupled to the droplet emitter, and configured to supply metal via a metal wire; and a multi-zone heating system arranged to surround a tip region of the metal wire, and configured to melt the metal wire at the tip region and cause molten metal to flow along a conical surface at the tip region to a tip where droplets form and emanate from the tip.

In various embodiments: the multi-zone heating system includes a multi-zone inductive heating system composed of multiple inductive coils surrounding a central axis; the inductive zones are run a free running oscillators and the frequency of operation is a direct measurement of the diameter of the cone; the inductive coils are probed with a scanning frequency that measures the Q of the system (This data can be calibrated to provide a measurement of the temperature of the tip); the multi-zone heating system includes a multi-zone microwave heating system composed of multiple microwave cavities; the multi-zone heating by a multi-zone microwave heating system measures to diameter at each slice of the cone by detecting changes induced in the resonant frequency of the adjacent microwave cavities; multi-zone microwave heating system composed of multiple microwave cavities each of which detects the temperature of the adjacent conical section by measuring the insertion loss of the conical section but using modulated power waveform; the modulated microwave power waveform is a pulse with a pulse repetition period short compared to the thermal time constant; the calibration of the temperature dependence of resistivity for different materials by measuring against an optical pyrometer; the wire is preheated to minimize the power of the microwave or inductive input and increase the resolution of control; the wire is preheated and the tip is heated with a combination of inductive and microwave resonant cavities; the wire is preheated and the tip is heated by microwave resonant cavities and probed with inductive cavities to provide shape and temperature profiles of the cone; the wire is preheated and the tip is heated with a combination of inductive cavities and probed with inductive cavities; the wire tip counter electrode (extraction electrode) for presenting an electric field at the tip is designed to be formed by thin material with high flow rate cooling fluid through the internal cavities of the electrode; the electrode is built by additive manufacturing to enhance and be able to tune the local heat transfer between metal that is close to the extremely hot tip; the electrode is interrupted as a circular conductor to reduce inductive coupling into the electrode; the voltage on the electrode is pulsed at a frequency where near the droplet frequency predicted by Rayleigh formulas for beak up of an electrostatically drawn jet, and the pulsed voltage stabilizes the frequency of droplet emission as well as the droplet size; and/or the electric field on the tip a the time of droplet separation determines the charge on the droplet the voltage on the extraction electrode as the droplet enters the electrode determines the velocity of the droplet, and Changing the position of the extraction electrode with respect to the tip is used to control charge and velocity of droplets.

An apparatus for performing additive manufacturing, comprising: a droplet emitter configured to be coupled to a chamber, and arranged to irradiate a workpiece with molten metal droplets during fabrication of the workpiece, wherein the droplet emitter comprises: a metal wire feed system coupled to the droplet emitter, and configured to supply metal via a metal wire; and a scanning electron beam heating system arranged to irradiate a tip region of the metal wire, and configured to melt the metal wire at the tip region and cause molten metal to flow along a conical surface at the tip region to a tip where droplets form and emanate from the tip.

In various embodiments: the electron beam is conical electron beam; the electron beam is conical electron beam where the cathode of the electron beams is at some radius of a cone normal to the surface of the wire cone; the electron beam is conical electron beam where the Pierce electrodes, grid, anode electrodes, focus electrodes and scan electrodes are opposing pairs of conical rings aligned along the conical beam line; the electron beam is conical electron beam can be blanked, varied in current, varied in focus and varied in electron beam energy; the electron beam is conical electron beam where the Pierce electrodes, grid, anode electrodes, focus electrodes and scan electrodes are opposing pairs of conical rings aligned along the conical beam line; the electron beam is conical electron beam that is scanned along the conical tip in a scan protocol that heats the tip in a uniform manner as determined by optical camera measurements; the electron beam is conical electron beam that is scanned along the conical tip in a scan protocol that heats the tip in a ring whose width is determined by the scan range; the electron beam is conical electron beam that is scanned along the conical tip in a scan protocol that heats the tip in a ring around the wire cone tip; the electron beam heated ring around the conical tip is in a liquid state and is forced down the conical tip to the point by electrostatic force supplied by the potential between the extraction electrode and the wire tip cone; the electrostatic force is constant in time and the modulation is supplied by the melting; where the melting is constant in time and the electrostatic force is modulated; the both the melting and the electrostatic force are modulated; the electron beam is conical electron beam that is scanned along the conical tip in a scan protocol that heats the tip in a pattern of a multiple of rings; the electron beam is conical electron beam that is scanned along the conical tip in a scan protocol that heats the tip in a pattern of a multiple of rings that move down the conical tip at a rate equal to the droplet emission rate; the electron beam is conical electron beam that is scanned along the conical tip in a scan protocol that heats the tip in a pattern of a multiple of rings where each ring has a precise amount of liquid generated that is greater than or approximately equal to the liquid volume in a individual droplet resulting in a pulsating flow; the electron beam is supplied by of multiple (n)

electron beam guns; each electron beam gun is aligned equal space at some radius of a cone normal to the surface of the wire cone; each electron beam gun incorporated Pierce electrodes, grid, anode electrodes, focus electrodes and scan electrodes; each electron beam can be blanked, varied in current, scanned over the tip of the wire, varied in focus and varied in electron beam energy; the electron beams can be scanned in identical patterns over each 1/n of the conical tip of the wire; the electron beams can be scanned at speeds fast compared to thermal time constant of the thin melt layer; the each electron beam is scanned along its portion of the conical tip in a scan protocol that heats the tip in a uniform manner as determined by optical camera measurements; each electron beam is scanned along its portion of the conical tip in a scan protocol that heats the tip in a ring whose width is determined by the scan range; each electron beam is isolated form the adjoining electron beam area by a wall. The edge of that wall next to the wire is tailored into a shape and biased to control the electric field between the extraction electrode and the cone to be more tangential to the cone thus reducing radial electric field.

In various embodiments: each extraction electrode has wall as well aligned with the foregoing wall; each electron beam is scanned along its portion the conical tip in a scan protocol that heats the tip in a ring around the wire cone tip; the electron beam heated ring around the conical tip is in a liquid state and is forced down the conical tip to the point by electrostatic force supplied by the potential between the extraction electrode and the wire tip cone; the electrostatic force is constant in time and the modulation is supplied by the melting; the melting is constant in time and the electrostatic force is modulated; the both the melting and the electrostatic force are modulated; each electron beam is scanned along it portion of the conical tip in a scan protocol that heats the tip in a pattern of a multiple of rings; each electron beam is scanned along its portion of the conical tip in a scan protocol that heats the tip in a pattern of a multiple of rings that move down the conical tip at a rate equal to the droplet emission rate; each electron beam is scanned along its portion of the conical tip in a scan protocol that heats the tip in a pattern of a multiple of rings where each ring has a precise amount of liquid generated that is greater than or approximately equal to the liquid volume in a individual droplet resulting in a pulsating flow; each electron beam has sufficient power to heat the tip to operational temperature in a time comparable to the cooling time from operation to solid, where this time is the start up and shut down time <1 ms; each wall electrode is divided axially into a multiple of electrode to improve the tailoring of the electric field and its attraction on the liquid cone; each wall electrode is divided into individual electrodes whose count equals the number of electron guns to dynamically adjust the force on the cone to eliminate instabilities that are measured by a the camera or SEM; and/or each electron beam chamber is comprised of the electrodes/walls divide the electron guns and the flanges that mount the divider electrodes. One these surfaces are placed multiple secondary electron detectors that measure the dynamic shape of the tip.

A faraday electron sensor that is comprised to two conductors insulated from each other, where the inside electrode is essentially the same shape but slightly smaller than the outside electrode and is biased positively to attract secondary electrons, and the pattern of slots or holes with a dimension between 0.25 and 0.95 the diameter of the electron beam enables the sensor to measure beam profile as well as position.

In various embodiments: the holes and slots together with the can profile provide a signal that provides unique location data; various diameter or widths of slots provide measurement of beam diameters at various positions in the scan area; the conductive area of the inner electrode is broken into sections again to provide unique data as to location of the beam and to decrease capacitance of each circuit thus increasing response time of the sensor; and/or the conductive area of the inner electrode is close to the outer electrode only at the tip reducing the capacitance and hence increasing the speed of scan that can be correctly analyzed.

An apparatus for performing additive manufacturing, comprising: a droplet emitter configured to be coupled to a chamber, and arranged to irradiate a workpiece with molten metal droplets during fabrication of the workpiece; and a droplet super-heater positioned downstream of the droplet emitter, and configured to super-heat emitted droplets to temperatures that melt portions of the workpiece upon impact and generate full density material.

In various embodiments: the super-heater comprising: a heated tube through which the particle travel and become heater by radiative heat transfer; the super-heater comprising: of a tube that is controlled to be the potential of the droplets that travel through it; the super-heater comprising: where the tube is controlled to a different potential as the droplets that flow travel through it to adjust and attain consistent charge on all particles; the super-heater comprising: where the tube segmented where into a longer section that heats the particles and a shorter section that tunes the potential on the droplets in accordance to measurements of mass previously in the beam line; the super-heater comprising: where the tube is heated by resistive elements in close proximity to the tube; the super-heater comprising: where the tube is heated by electron impact from a cathode situated close to the outside diameter of the tube; the super-heater comprising: where that cathode is a tube; the super-heater comprising: where that cathode is a filament. In the super-heater, the cathode is backed by a second conductive tube that reflects electrons to the primary heater tube to improve electron heating efficiency, where the assembly is further enclosed in a insulating material to improve thermal efficiency, and a pyrometer measures the temperature of the droplets as they exit the super heater. This measurement is used to control the heater.

In various embodiments: the heater tube is followed closely in the beam line with Q, M, V analysis section that determines the post heating charge and mass and determines if the droplet exploded during heating.

A method of performing additive manufacturing, the method comprising: irradiating a substrate upon which a workpiece is to be fabricated with molten metal droplets; and prior to impact of the metal droplets on the workpiece, super-heating the metal droplets to a droplet temperature sufficient to melt an impacted portion of the workpiece.

In various embodiments: the super-heater comprising: where the temperature of the droplet is determined by inspecting the impact site of the droplet; the super-heater comprising: where the temperature of the substrate is kept just below a temperature where the material will grow crystals in the grown volume as predicted by software; the super-heater comprising: where the charge is adjusted through adjusting the potential on the superheater tube; the super-heater comprising: where inspecting the impact site of the droplet to determine the wetting of the impact site by the droplet; the super-heater comprising: where the multiple impact sites are inspected for voids; the super-heater comprising: where the multiple impact sites are inspected for surface finish of the wall section; the super-heater comprising: where the potential on the tube is adjusted to achieve a charge on the droplet that is stable against Coulombic fission as described approximately by the Rayleigh Limit which predicts a lower charge with increased temperature due to reduced surface tension; and/or the super-heater comprising: where the initial charge on the droplet is tuned to be stable after heating.

An apparatus for performing additive manufacturing, comprising: a droplet emitter configured to be coupled to a chamber, and arranged to irradiate a workpiece with molten metal droplets during fabrication of the workpiece; a droplet charging system arranged downstream of the droplet emitter, and configured to charge the emitted metal droplets; and a substrate charging system configured to differentially charge the workpiece relative to the metal droplets, wherein the differential charge is adjustable to cause Coulombic fission of incident metal droplets immediately prior to impact on the workpiece.

In various embodiments: the rapid charging of droplets above the Rayleigh limit involves; the application of a pulse on the substrate when the droplet is in close proximity sufficient to generate enough electric field to draw electrons off the droplet sufficient to cause Coulombic fission; rapid charging of droplets above the Rayleigh limit involves the application of an electron beam to the droplet to supply enough charge quickly and cause Coulombic fission; the rapid charging of droplets above the Rayleigh limit involves the application of an ion beam to the droplet to supply enough charge quickly and cause Coulombic fission; and/or the rapid charging of droplets above the Rayleigh limit involves the application of a laser beam to the droplet to supply enough heat to explode the droplet charge quickly and cause fission.

An apparatus for performing additive manufacturing, comprising: a droplet emitter configured to be coupled to a chamber, and arranged to irradiate a workpiece with molten metal droplets having a size less than 20 microns during fabrication of the workpiece; an extraction electrode positioned downstream of the droplet emitter, and configured to extract and charge emitted molten metal droplets; and a droplet sensor assembly arranged downstream of the extraction electrode, and configured to measure at least one property of the stream of emitted molten metal droplets.

In various embodiments: the droplet size is in the range of about 0.5 to 3 microns, and preferably about 1 micron; the droplet size is in the range of 1- to 250 microns, and preferably about 100 microns; the droplet size is continuously variable from about 1 to about 100 microns. Various methods of operating the foregoing apparatus involve varying the droplet size is varied by a controlling extraction electrode, a field shaping electrode, heating scan both power and scan protocol, and tip pulsation either inductive, melt pulsations and/or extraction voltage.

A method for performing additive manufacturing, comprising: generating continuous molten droplets of variable and controlled sizes from metal, alloy, or other material; and growing a workpiece by directing the molten droplets according to computer aided design to produce a workpiece of a target shape, size, and degree of complexity.

Various embodiments involve: growing the workpiece having one of: an amorphous phase; a crystalline phase; and a mixed amorphous-crystalline phase; creating closed-form or closed cellular structures from the molten droplets; creating a solid structure, a mesh structure, a porous structure, or a foam structure, or any combination of two or more thereof from the molten droplets; interrupting the growing; and/or scanning a laser beam and/or electron beam across at least a portion of the workpiece to alter heating or cooling rates and control the degree of crystallization or crystal phase formation.

In various embodiments: concurrent with the growing, scanning a laser beam and/or electron beam across at least a portion of the workpiece to alter heating or cooling rates and control the degree of crystallization or crystal phase formation; generating a vacuum environment surrounding the workpiece during the directing; growing the workpiece by directing multiple streams of molten droplets; varying at least one property of the molten droplets emanating from different streams of molten droplets (wherein the at least one property includes a magnetic property, an electric property, a mechanical property, a thermal property, or an optical property, or any combination of two or more thereof); selectively turning on and off different streams of molten droplets to create a workpiece having homogeneous or heterogeneous properties; fabricating a generic or patient-specific medical device or implant from the stream of molten droplets; and/or fabricating a an aerospace, an aeronautical, or an automotive structure from the stream of molten droplets.

A method of performing additive manufacturing, comprising: growing columnar grains or grain structure having a grain size in excess of 1 mm by molten metal droplet emission and epitaxial growth on an appropriately annealed or heat-treated starter plate to produce continuous and complex internal geometries maintaining this columnar structure for complex internal geometries.

In various embodiments: the starter plate includes a single crystal starter plate having a selected crystal orientation for epitaxially growing single crystal components from molten metal droplet emission; the starter plate includes selected, large grains of preferred orientations or textures or ratios of these, to grow columnar, preferred, directional orientations of epitaxial grains over the complete length of said product to be fabricated; and/or the starter plate is a single crystal with or without organized arrays of precipitates, or directional microdendritic structures, to grow epitaxial single crystal overgrowths extending the full length of said product or component to be fabricated.

A method of making multimaterial, multi-head (cluster) arrays for build capabilities will alloy component, hybrid device integration and 3D electronic device fabrication involving semiconductor-metal-insulator and other materials arrays, wherein: multicomponent, and multifunctional devices, including MEMS (micro-electro-mechanical systems) are integrated into multi-complex products; NEMS (nano-electro-mechanical systems) devices are fabricated and integrated into complex, multifunctional devices; the NEMS devices are possible by controlling deposition thermo-kinetics; cooling rates and subsequent product/component heat treatment using auxiliary laser or electron beam scanning; multiple materials deposition affords the ability to create complex structures and architectures, including complex arrays of shapes conducive to special properties and performance impossible to fabricate by conventional manufacturing; horizontally and vertically oriented composite and other oriented structures are possible as well as alternating patterns and orientations; alternating arrays of superconductors are embedded in conducting matrices, including device structures and large-scale transmission and storage structures and devices; a variety of closed-cell structures not possible by powder additive manufacturing technologies can be created; corresponding structures will have correspondingly higher strength, crushing resistance, energy absorption, etc. than open-cellular structures, especially foams; there is no unmelted powder to remove from the internal, closed cell structures; large, columnar grain and single crystal turbine components are fabricated with complex, internal cooling arrays/channels not possible by any conventional manufacturing processes; the creep life is extended as a consequence of the cooling efficiency obtained; the high temperature performance of contemporary superalloys in fabricating turbine components is extended; and/or the large working area or build volume can be expanded to large scale manufacturing arenas, including inert gas or vacuum environments, to allow refurbishing or worn or degraded products or components through resurfacing or rebuilding the worn surfaces.

Various embodiments involve: supplementing for conventional spray technologies or surface weld or resurfacing weld technologies for a variety of large-scale applications; developing complex, internal cooling structures for heat exchanger systems, closed-cell and related closed, complex structures for creating strong, very light weight structures having a variety of applications, closed-cell and related closed, complex structures for that are engineered with varying cell sizes and varying wall thickness depending upon load stresses expected a various locations in a part.

Various embodiments involve: a method of incorporating fine, oriented fibers into the feed wire for single and multiple droplet generators in order to create complex, composite arrays and structures with unusual properties; a method to insitu anneal the growing structure of one material phase to create a second more crystalline material phase; a composite of material phases that are engineered to enhance material performance; Superheating droplets to a temperature to supply sufficient energy to enable formation of solid density material; repair of a previously built structure by simply cutting out the damaged section along a suitable growth process, measuring to register the cut location in the growth process and reprinting it.

A method to produce an additive manufactured part that by other methods would require particles that are small enough to be an explosive-fire hazard. These parts can be made safely and delivered to the part to be grown due to the fact that particles are never handled in air and exist only for short periods of time and in small quantities in a state of high surface area to mass ration that pose a hazard. Part growing process can be paused and resumed at a later time at the exact point of process without issue.

A method to grow parts of materials that have a strong tendency to grow crystalline using smaller diameter droplets that cool more quickly and be deposited less crystalline.

A method to grow parts where smaller droplets are used in areas close to surfaces are used to improve surface finish.

A method to grow parts where smaller droplets are used in areas closest to surfaces to provide a significant material change to a less crystalline phase that inhibits fracture.

Although only certain embodiments of this invention have been described in detail above, those skilled in the art will readily appreciate that many modifications are possible in the embodiments without materially departing from the novel teachings and advantages of the various inventions described herein, and all such modifications are contemplated hereby.

The invention claimed is:

1. An apparatus for depositing metal onto a workpiece during additive manufacturing, the apparatus comprising:
a crucible having a top portion configured to receive a continuous supply of wire material, and a bottom portion including an orifice;
a droplet generator configured to convert the wire material into a stream of metal droplets emitted from the orifice in the presence of an electromagnetic field;
a droplet sensor configured to measure respective indicia of the charge and velocity of each droplet;
a droplet scanner configured to direct each droplet to a predetermined location on the workpiece; and
a processor configured to dynamically modulate the scanner for each droplet based on the measured charge and measured velocity of that droplet;
wherein:
the droplet sensor is further configured to measure indicia of the trajectory of each droplet; and
the processor is further configured to dynamically modulate the scanner based on the trajectory of each droplet.

2. The apparatus of claim 1, wherein the droplet generator comprises an inductive heating coil configured to melt the wire material.

3. The apparatus of claim 2, wherein the inductive heating coil is configured to generate the electromagnetic field.

4. The apparatus of claim 3, wherein the inductive heating coil is configured to tune a component of the electromagnetic field to a frequency in the range of the droplet emission rate instability.

5. The apparatus of claim 4, wherein the inductive heating coil is configured to tune a component of the electromagnetic field to provide a regular vibration to the melted wire material.

6. The apparatus of claim 2, wherein the droplet generator includes a heater comprising one of an LED/laser diode, a microwave generator, and an electron beam.

7. The apparatus of claim 1, wherein the crucible comprises a ceramic material including at least one of alumina, mullite, steatite, lava, forsterite, quartz, silica, magnesia, silicon carbide, zirconia, yttria, cordierite, alumina titanate, fused silica, sillimanite, and corundum.

8. The apparatus of claim 1, wherein:
the droplet sensor comprises a stack of differential sensing electrodes, and is configured to transmit a unique control signal to the processor for each droplet representing that droplet's velocity, charge, and trajectory values;
the droplet scanner comprises a scan voltage generator configured to apply a control voltage to a low capacitance scan electrode; and
the controller is configured to adjust the control voltage applied to the low capacitance scan electrode for each droplet based on that droplet's control signal.

9. The apparatus of claim 1, wherein the droplet scanner is further configured to discard droplets having a velocity, charge, or trajectory outside of a corresponding target range.

10. An apparatus for depositing metal onto a workpiece during additive manufacturing, the apparatus comprising:
a crucible having a top portion configured to receive a continuous su of wire material, and a bottom portion including an orifice;
a droplet generator configured to convert the wire material into a stream of metal droplets emitted from the orifice in the presence of an electromagnetic field;
a droplet sensor configured to measure respective indicia of the charge and velocity of each droplet;
a droplet scanner configured to direct each droplet to a predetermined location on the workpiece; and
a processor configured to dynamically modulate the Scanner for each droplet based on the measured charge and measured velocity of that droplet;

wherein the droplet sensor comprises a ring electrode including four arcuate segments.

11. The apparatus of claim 1, wherein the droplet generator comprises an extraction electrode configured to apply the electromagnetic field to thereby produce a Taylor cone of molten metal proximate the orifice.

12. The apparatus of claim 11, wherein the extraction electrode is configured to charge the droplets to facilitate extracting the droplets from the Taylor cone.

13. The apparatus of claim 12, wherein the droplet scanner is configured to operate at a frequency constructive to the natural frequency of droplet emission from the Taylor cone to thereby impart a piezo-electric vibration to the Taylor cone.

14. A method of depositing metal onto a workpiece in an additive manufacturing process, the method comprising:
- melting a wire in a crucible having an orifice disposed in a generally semi-spherical bottom region;
- emitting a stream of metal droplets from the orifice in the presence of an electromagnetic field;
- determining the charge, velocity, mass, and trajectory of each droplet;
- directing each droplet to a specific location on the workpiece if the charge, velocity, mass, and trajectory of the droplet are within predetermined ranges; and
- directing the droplet away from the workpiece if the charge, velocity, mass, or trajectory of the droplet are outside the predetermined ranges.

15. The method of claim 14, wherein directing each droplet to a specific location comprises correcting the trajectory of each droplet into alignment with a desired droplet beam axis using a segmented ring electrode.

16. The method of claim 15, wherein correcting comprises selectively increasing or decreasing the electrostatic charge on a droplet.

17. The method of claim 14, wherein:
- melting comprises heating the wire using an inductive coil;
- emitting the stream of metal droplets comprises using the inductive coil to generate the electromagnetic field at a frequency having a component corresponding to the droplet emission rate instability.

18. The method of claim 14, wherein melting comprises using one of an LED/laser diode, a microwave generator, and an electron beam to melt the wire.

19. The method of claim 14, wherein the cross section of the orifice is in the range of about 5% to 75% of the diameter of the droplets, and further wherein emitting the stream of metal droplets comprises extracting the droplets at a velocity in the range of about 10 to 30 meters per second.

* * * * *